United States Patent [19]
Kalt et al.

[11] Patent Number: 5,519,565
[45] Date of Patent: May 21, 1996

[54] ELECTROMAGNETIC-WAVE MODULATING, MOVABLE ELECTRODE, CAPACITOR ELEMENTS

[76] Inventors: Charles G. Kalt, P.O. Box 72, North Adams, Mass. 01247; Mark S. Slater, 20 Friend St., Adams, Mass. 01220

[21] Appl. No.: 66,949

[22] Filed: May 24, 1993

Related U.S. Application Data

[63] Continuation-in-part of Ser. No. 887,714, May 22, 1992, Pat. No. 5,231,559.

[51] Int. Cl.⁶ .............................. H01G 7/00; G01P 15/08
[52] U.S. Cl. ........................................ 361/280; 73/514.32
[58] Field of Search ...................................... 361/280, 281, 361/283; 359/230, 223, 291, 231; 73/514, 517 R, 518; 345/48, 84, 85

[56] References Cited

U.S. PATENT DOCUMENTS 3,989,357  11/1976  Kalt .......................................... 340/719
4,266,339   5/1981  Kalt .......................................... 264/104
5,231,559   7/1993  Kalt et al. ................................. 361/301
5,233,459   8/1993  Bozler ...................................... 359/230

OTHER PUBLICATIONS

Gary Stix, Micron Machinations, Nov. 1992, pp. 107–117 Scientific American.

Primary Examiner—Bot L. Ledynh
Attorney, Agent, or Firm—Handal & Morofsky

[57] ABSTRACT

Inventive electromagnetic-wave-modulating capacitors with movable electrodes are low-cost, low-energy, reliable and fast-acting elements for employment in highly transparent, conductive fixed electrodes and are incorporated, among others, in reflective display pixels for large and small-scale video displays, including full-color displays where multiple such capacitors are aligned in a single pixel. Further embodiments, not necessarily with a transparent electrode, are assemblable into array antennas deployable in outer space; provide digitally controllable or responsive such variable capacitors; and in mechanically active applications can be constituted as accelerometers, or in microrobotics. Constructions with ultra-thin electrodes have special advantages.

31 Claims, 34 Drawing Sheets

FIGURE 29

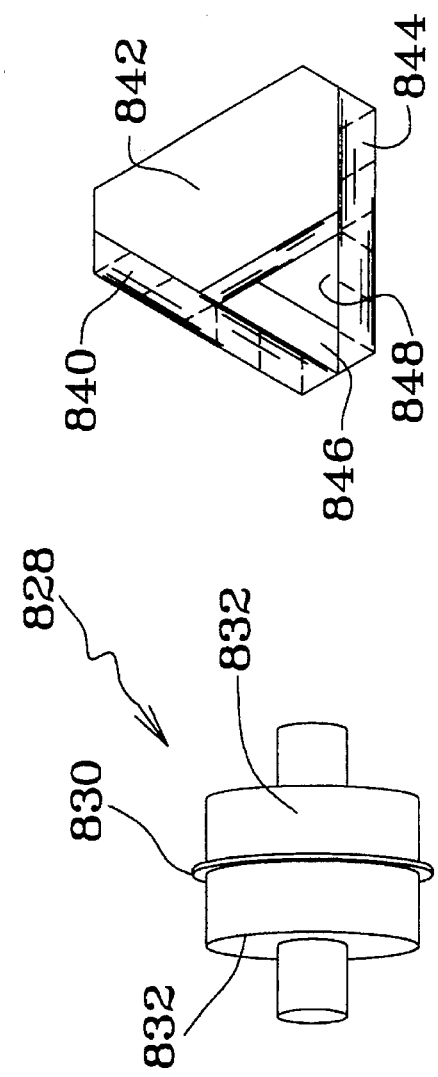
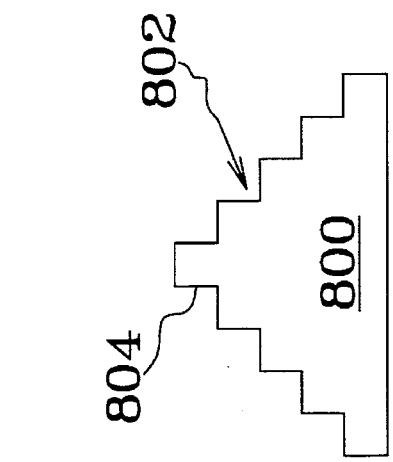
FIGURE 46
FIGURE 45
FIGURE 42

5,519,565

ELECTROMAGNETIC-WAVE MODULATING, MOVABLE ELECTRODE, CAPACITOR ELEMENTS

CROSS-REFERENCE TO A RELATED APPLICATION

This application is a continuation-in-part of application Ser. No. 07/887,714 filed May 22, 1992, now U.S. Pat. No. 5,231,559 dated Jul. 27, 1993.

TECHNICAL FIELD

The present invention relates to electromagnetic-wave modulating, movable electrode, capacitor elements. Preferred embodiments provide a reflective full color light modulating capacitor pixel for full-color displays, especially reflective displays.

BACKGROUND

Almost from the dawn of the industrial age, scientists were fascinated with the possibility of communication between remote points in coded, audio and visual formats. In France even as early as the late 1700's, elaborate semaphore systems enjoyed substantially widespread use. While such systems achieved their maximum readability during the darkness, and relied, to a large extent, on a subjective evaluation of a signal by the human eye in a sometimes noisy environment, the same represented a dynamic leap of progress over previously employed communications systems.

The invention of the telegraph by Morse in the early 1800's provided a means for rapid communication which effectively addressed virtually all the perceived limitations of semaphore communication. While the telegraph did require the installation of a telegraph wire hundreds and, ultimately, thousands of miles long, the telegraph insulated its users from dependence on good visibility conditions, fog, rain, atmospheric conditions and high levels of skylight due to natural and/or artificial causes.

Even before the invention of the telephone by Bell in 1876, it was recognized that electrical wires could be used to transmit video signals from a transmission point to a remote location. At least as early as the 1860's, French scientists proposed the possibility of scanning an object illuminated by candlelight using a Nipkow disk, reading the reflected light using a photoelectric device, and transmitting the signal over a wire to a remote point for viewing.

The weak point in that system (as well as in all modern video systems) was the display. Their proposed solution was to scan a sheet of paper mounted on a drum and impregnated with gunpowder with a high voltage ignition spark which burned in the image scanned by the Nipkow disk. While those familiar only with current state-of-the-art display technology might view such a technique as impractical, it was exactly this display technology which was employed by the great international news services during the first half of the 20th century to transmit photographs by wire.

Although this system had many inherent limitations, it had a number of virtues which no other widely employed display technology has succeeded in matching. For example, the system used very low power and produced very clear sharp images. Unlike liquid crystals, received pictures were visible over a wide angle of view. Unlike cathode ray tube images, images produced by this system enjoyed superb readability even under intense illumination. Still yet another advantage of this system was its extremely low cost.

Of course, such a system could only have limited application because of the exhaustion of the display member by a single frame of transmitted information.

While, during this early period in the history of video display technology, researchers working in the field may have entertained the possibility of a transient reflective mosaic as a video display, a transient controllable light source probably appeared to be a much greater possibility given the number of candidates which included, even at the turn of the century, the incandescent lamp, the neon lamp, and, of course, the cathode ray tube. The earliest employed "video" displays were signs, the most notable being so-called "neon" signs and incandescent bulb matrix arrays, such as those found on theater marquees.

However, with the rapid development of vacuum technology in the period surrounding World War I, the cathode ray tube became a practical solution, insofar as it relied upon plate, vacuum and grid technologies, all of which had been developed for other purposes.

Notwithstanding the limitations of the cathode ray tube, which included poor readability in sunlight, cumbersome size, excessively high voltage, the possibility of X-radiation, and so forth, researchers adopted what must now be considered a low-tech solution and proceeded instead to develop camera technology. Thus, even today, the cathode ray tube in a form substantially unchanged from its earliest embodiments remains the display standard, nearly a century after it was proposed.

When the time came to select a standard format for color television, a purely electronic display system was again selected. While some consideration was given to a rotating color filter wheel system developed by the Columbia Broadcasting System, the officials responsible for selection of a national color television standard were uncertain whether we would ever have the technology to reliably mechanically control a video display and thus opted in favor of what would also come to be recognized as a problematic approach, namely, the shadow mask cathode ray tube.

Nearly a half century later, however, the inherent limitations of the cathode ray tube have become painfully apparent. So-called "large screen" televisions can only be achieved by using small tubes and clumsy projection optics. Resulting pictures are of such low intensity that acceptable viewing can only be had in the dark. Stray light creates general deterioration in image resolution both by decreasing the signal-to-noise ratio in the display picture and reducing the chrominance content of the projected picture. The end result is a physically large, high voltage and high power system which produces a poor dim picture. Finally, there is a growing concern over CRT radiation output, above and beyond the X-band radiation problem which was substantially solved in the 1970's.

In an attempt to address these problems, manufacturers have turned to liquid crystal display technology. While such display technology may lend itself to relatively large flat displays which will operate at relatively low voltage, such displays are very expensive to manufacture and have poor visibility when viewed within the ideal angle of view and are substantially unreadable outside that angle of view. Likewise, color in LCD systems is of extremely poor quality.

A most promising candidate for the solution of the above problems is the LMC or light modulating capacitor. These devices come in a wide range of structures and include reflective as well as transmissive devices.

Generally, light modulating capacitors comprise at least one fixed electrode and an active electrode made of metallized plastic film. Modulation of light is achieved by physical displacement of the active electrode with respect to the fixed electrode, changing the reflective and/or transmission characteristics of the device. Actuation of the active electrode is accomplished by electrostatically attracting or repelling the variable electrode to a desired position. In the case of an active electrode made of metallized Mylar brand polyester film, the electrode is extremely light, may be prestressed to increase the range of configuration possibilities, and requires extremely low power and low voltage to operate effectively and quickly.

When I first proposed such a device in the early 1970's, the active electrode generally had the shape of a flapper which was electrostatically driven from one position to another, typically in a two color grove having a V shaped cross-section, much like a pair of differently colored pages in a half-opened book. Because the flapper is highly reflective, when it is in a first position, it reflects the color of the inside of the groove on the side of the groove opposite that on which it is resting. Thus, with each side of the groove is given a different color, the groove appears be to completely the color of the side opposite the active electrode. Because this could be a reflective device, it operated well in ambient light and with only the smallest consumption of electricity insofar as the light modulating capacitor would only pass enough current to charge its internal capacitance.

I have previously proposed the possibility of a prestressed metallized Mylar electrode which, in its relaxed state comprised a tightly coiled active electrode which would be electrostatically unrolled over a flat panel, thus changing the color of the flat panel to the color of the active electrode with the device configured as a light reflecting capacitor. I have also suggested the possibility of a light transmitting window where the device might be backlit and the active electrode used to control the transmission of light through the device.

Similarly, I have proposed the possibility of a large matrix of light modulating capacitors being manufactured in a mass production operation and comprising a single multi-pixel module. In this system, the pixel took the configuration of a V profile flapper-type device.

My prior U.S. Pat. No. 3,989,357 discloses various light-modulating movable electrodes cooperative with a reflective backdrop to provide a reflectance zone whose reflectance properties can be controlled by appropriate selection of the reflectances of a viewer-facing electrode surface and of the backdrop. In this manner, simple messages, message elements or color pixels can be displayed by providing different areas of different reflectances in the reflectance zone. The position, or extent of excursion, of the movable element determines the relative sizes of the different areas. The reflectance of the movable element can be selected by giving it a highly reflective, viewer-facing surface (column 5, lines 25–30). The backdrop is generally opaque, being constituted in many embodiments either by an insulator, or if the insulator is transparent, by a fixed conductor which is generally metallic. Though useful for simple indications and for high contrast monochrome renditions of messages or images, the capabilities of the combination of reflectances that can be produced by this system is inadequate to meet more sophisticated requirements, for example, the demands of a full-color display.

To overcome this problem, one embodiment of my U.S. Pat. No. 3,989,357 (FIGS. 13–14, column 4, lines 44–68), proposes a display incorporating each of three primary colors juxtaposed to be visually mixed (presumably by a distant viewer). The arrangement shown employs colored, metal-foil, movable electrodes arranged in parallel layers on what are presumably opaque fixed-electrode-insulator assemblies. The colored tips of the movable electrodes are exposed to view but are not in a common well-defined reflectance zone, and are not presented perpendicularly to, or nearly perpendicularly to a light path to the observer. Indeed, the construction of the embodiment of FIGS. 13–14 in addition to providing only a weak visual appearance, is too cumbersome to be readily employed as a pixel construction in an array comprising hundreds of pixels.

While providing the possibility of some limited-range color blends, this device is still not adequate for the needs of a full-range, or multi-color display, especially a pixellated, continually variable display. The teaching of my prior patent provides inadequate brightness and insufficient variability of reflectance within a well defined pixel area transverse to a light path to a viewer.

The embodiment of FIG. 5 of my U.S. Pat. No. 3,989,357 (column 5, line 60 to column 6, line 10) employs a transparent insulator together with a somewhat transparent fixed electrode (see column 4, lines 61–65) in a transmissive mode in which light from a lamp is gated by a movable electrode. The discussion of the transparency of aluminum, which has to be balanced against its conductivity, suggests such a transparent fixed electrode would not be suitable for use in a reflective mode in which an incident light beam, passing through a transparent insulator and transparent or translucent fixed electrode, is reflected back to an observer from a backdrop of selected reflectance.

My U.S. Pat. No. 4,266,339 discloses various methods for manufacturing rolling electrodes for electrostatic devices. Disclosed is the fact that leaves of metallized plastic film, such as MYLAR (trademark DuPont) will curl in an oven to provide prestressed movable electrode elements. The disclosed methods include (column 3, lines 34 et seq.) cutting or punching U-shaped incisions through a metallized sheet, masking areas between the U-shaped cutouts and heating the punched, masked sheet in an oven, then cooling, to cause the unmasked pieces of sheet to curl up into tight rolls. Some drawbacks to this method arise from the need for a mask and difficulties in controlling the cutouts before they roll up.

SUMMARY OF THE INVENTION

The invention, as claimed, is intended to provide a solution to the problem of achieving a full color display in a flat multi-pixel video display device. It does this while at the same time providing low manufacturing costs, low operating voltage, versatile pixel area and small panel thickness. At the same time, the display achieves full color brilliance and/or levels of darkness under a wide range of ambient lighting conditions including sunlight. Power consumption is also extremely economical and radiation as a health hazard is virtually eliminated. Finally display flicker is virtually eliminated, allowing narrow bandwidth transmissions in many applications.

In one aspect the invention provides a reflective display pixel for a reflective display constituted by a matrix of said reflective display pixels, said reflective display pixel having:
i) a reflectance-controlled pixel area extending across a light path to a viewer;
ii) a light-modulating capacitor comprising:
    a) a transparent dielectric member having opposed faces and extending across and throughout said pixel area;

b) a transparent electrode extending across one face of said dielectric member throughout said display area, said transparent electrode having a light transmissivity of at least 80 percent and a conductivity expressed as a resistivity of not more than 100 ohms per square;

c) an active, light-modulating electrode movable to and from a position extending into said pixel area on the other face of said dielectric member;

said active, light-modulating electrode being movable in response to changes in an electric potential difference applied between said active movable electrode and said transparent electrode to extend across said light path and modulate light traveling therealong; and iii) reflectance means extending across said light path in said pixel area on an opposite side of said light-modulating capacitor remote from said viewer said reflectance means being visually related to said light-modulating active movable electrode for reflectance control of said pixel area;

wherein the appearance of said pixel area to said viewer can be selectively comprised by said light-modulating electrode in combination with said reflectance means, and wherein light reflected from said reflectance means traverses said transparent electrode two times, traveling therethrough on both an incident and a reflected path.

In another aspect, the invention provides a light-modulating capacitor capable of displaying at least three visually distinct color states each said color state being selected from chromatic and achromatic colors, said capacitor comprising a plurality of capacitor elements each capacitor element comprising:

a) a laminar translucent dielectric member having opposed first and second surfaces;

b) a fixed electrode engaged with one of said surfaces; and c) a movable light-modulating electrode;

wave and having a relaxed condition in which said potential difference is not applied, said movable electrode is retracted away from said electromagnetic wave path and said electromagnetic wave is not so modulated, wherein at least one of said electrodes has at least one lateral edge which is stepped to taper in a direction away from said retracted position to be digitally responsive to changes in said applied potential difference.

In a still further aspect, the invention provides a low-cost, sensitive, reliable accelerometer for sensing acceleration and providing an electrical output, said accelerometer comprising a variable capacitative element having:

a) a laminar dielectric member having opposed first and second surfaces;

b) a control electrode capacitatively engaged with said first dielectric member surface in activated condition of said capacitative element; and c) an active, movable, electrode, having a conductor surface capacitatively engageable with said second dielectric member surface in response to an activation potential difference applied between said electrodes;

said accelerometer being disposed in a movable or moving system to sense acceleration of said system, and being coupled in electric circuit to provide a control output responsive to a desired acceleration.

In to a still further aspect, the invention provides a variable capacitative element comprising:

a) a laminar dielectric member having opposed first and second surfaces;

b) a control electrode capacitatively engaged with said first dielectric member surface in activated condition of said capacitative element; and c) an active, movable, electrode, having a conductor surface capacitatively engageable with said second dielectric member surface in response to an activation potential difference applied between said electrodes;

said active, movable electrode being selectively movable between an extended position for electromagnetic wave modulation and a retracted position and being formed of a flexible plastic material having a thin, metallized conductor surface, being said surface capacitatively engageable with said dielectric member, said active movable electrode being prestressed to adopt said retracted position in a relaxed state, and having a thickness not exceeding about 2 microns.

In yet another aspect, the invention provides a method of manufacturing a video display matrixed from a plurality of light-modulating, capacitative pixels each having a light-modulating, movable active electrode, said method comprising:

a) assembling a plurality of sheet-like layered materials into a laminated structure, said sheet-like layered materials including:

i) a fixed electrode layer;

ii) a dielectric layer capacitatively engaging said dielectric layer; and iii) an active, light-modulating, movable electrode layer having a plurality of adjacent, active electrodes each said active, movable electrode being prestressed to adopt a retracted, inactive configuration, said active movable electrodes being advanceable from said retracted position by application of a potential difference between said fixed electrode and said metallization;

and:

b) forming said active, light-modulating, movable electrode layer from a sheet of metallized plastic material supported on said laminated structure with said metallization toward said structure and said plastic material exposed outwardly, by:

iv) cutting partial outlines of said movable electrodes in said metallized plastic sheet in a pattern providing a movable portion and a fixed portion of each said active, movable electrode, said cutting being only a partial incision along the cut outline, whereby the movable electrode portions of said sheet remains in place during said cutting step, and said cut outlines including a common outline between adjacent movable electrode portions,; and v) curing said laminated structure with said metallized plastic sheet bearing said cut electrode outlines exposed outwardly to be heated, in an oven to cause said plastic material in said movable electrode portions to shrink and break away along said outlines;

whereby, on cooling, said movable electrodes adopt said retracted configuration.

In order for a video display to be effective, it must have the capability of going from a condition of reflecting all colors equally (white) to a condition of absorbing all color equally and to a substantially complete extent (black). It should also be capable of modulation in intensity for all values of light intensity between black and 100% reflection. This set of characteristics alone would provide the required performance for accurate definition of the luminance component of, for example, a broadcast color television signal. Chrominance control, however, requires similar control over, in the case of a light reflective display, the operation of three light absorbing mechanisms. The mechanisms could be not unlike that of a so-called four color printing system where small light panels of three primary printing colors and black are printed on a white sheet, with the black dots swelling to cover the entire surface when one desires to print the color black, and all of the dots shrinking to zero when one desires the surface to appear white. In between, the ratio of the areas of the ink spots in the three primary colors are adjusted to give the desired tint while the ratio of black and white to colored printed space is adjusted to provide the desired color saturation. The overall reflectivity of the system defines its luminance.

As has been shown in the case of so-called "color" LCD television displays, a wide range of compromises may be made while still achieving a display which conveys desired luminance and chrominance information. The challenge of a high quality display is to achieve a close approximation of the perfect luminance dynamic range extending between complete absorption and complete reflection and a peak chrominance exhibiting sufficient color saturation for a realistic depiction of a wide range of subjects. In principle, it has also been discovered, in accordance with the present invention, that a color neutral black is of primary importance, that bright whites are of importance and that under many circumstances, poor color saturation range may not produce any detectably bad result.

In accordance with one embodiment of the invention, means are provided for almost perfect control of luminance tint and saturation in a single pixel. A matrix of the inventive devices is thus capable of appearing completely reflective, completely absorptive, and of having any degree of reflection therebetween with a substantially infinitely adjustable chrominance characteristic, both as regards to tint and color saturation.

BRIEF DESCRIPTION OF THE DRAWINGS

One way of carrying out the invention is described in detail below with reference to drawings in which dimensions and proportions have been exaggerated for purposes of clarity of illustration, and in which:

FIG. 28 represents a method of preventing uneven re-rolling of an electrode through the use of a ribbed or FIG. 29 is a diagram showing color assignments to electrodes in a matrix constructed in accordance with the present invention;

FIG. 42 is a plan view, similar to FIG. 7, of an alternative embodiment of an active electrode useful in practicing the invention which electrode is constructed to be digitally controllable;

FIG. 45 is a perspective view of a scoring tool useful in the method described with reference to FIG. 43;

FIG. 46 is a plan view of another embodiment of light-modulating capacitor pixel employing a multi-layer arrangement of sets of three movable elements arranged in a triangular disposition;

BEST MODE FOR CARRYING OUT THE INVENTION

Figure 1:
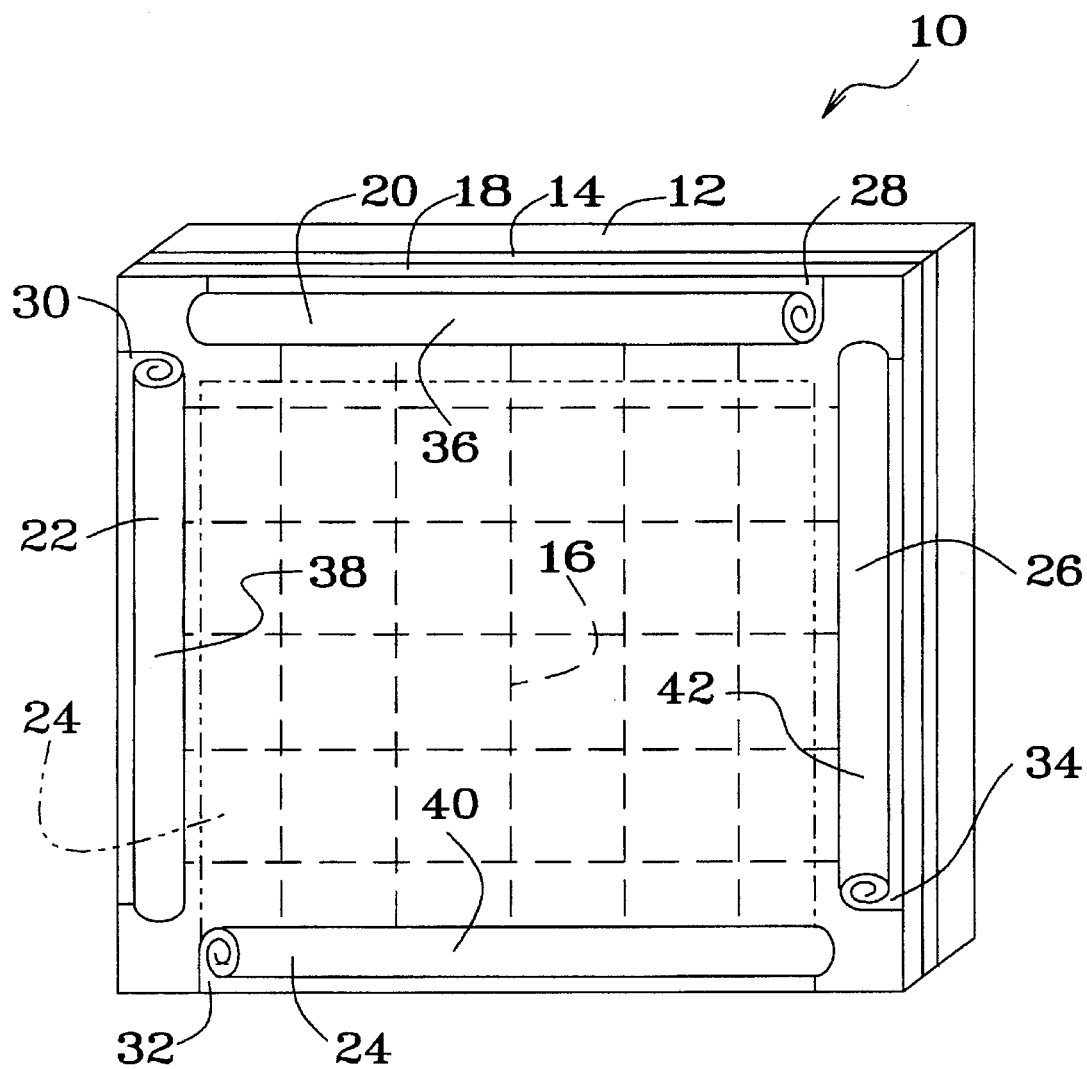
FIG. 1 is a four active electrode light modulating capacitor constructed in accordance with the present invention illustrated in diagrammatic form.

Referring to FIG. 1, a four color reflective light modulating capacitor 10, which may function as a pixel in an array forming a highway sign or the like, is illustrated. Light modulating capacitor 10 may be of the reflective type and is built on a substrate 12. Substrate 12 supports a layer of transparent material 14 which may be made of any known transparent conductive material, such as indium tin oxide (ITO) or any other suitable material. ITO is deposited in extremely thin layers (1000 to 10,000 ohms per square) in order to minimize the impact of heat during the deposition process on the integrity of the substrate.

In the event that extremely large areas are required and the resistance of the layer of transparent conductive material 14 is large, the material may be maintained substantially transparent but more highly conductive over large areas by deposition of an extremely fine metal grid 16 over material 14, as illustrated in FIG. 1. The number of conductors per inch in grid 16 would be a function of the area and conductivity of the transparent conductive material 14. The thickness and width of the conductors in grid 16 are a function of the length and width of the pixel and, in an array, the length and width of the array. However, present information suggests strongly that such grids are not necessary for presently envisioned applications.

Material 14 is, in turn, covered by a dielectric layer 18. The structure is completed by four facing active light modulating capacitor electrodes 20, 22, 24 and 26. Active electrodes 20–26 are made of a plastic material having a thickness of about 2.5 microns and covered with an extremely thin layer of conductive material (typically aluminum having a thickness on the order of about 2.5 millionths of a centimeter. Thus, one side of the flat planar material of which electrodes 20–26 are made is plastic and the other side is a conductor. In the embodiment illustrated in FIG. 1, the plastic sides 28–34 are exposed toward the front of the device while the metal sides 36–42 of electrodes 20–26 lie on the underside of the electrodes when the electrodes are completely uncoiled from the position illustrated in FIG. 1. Thus, metal sides 36–42 appear as indicated in FIG. 1.

As can be seen from FIG. 1, if any one of the electrodes, such as electrode 24, is unfurled, as is illustrated in phantom lines in FIG. 1, the plastic side (in the case of electrode 24, plastic side 32) is exposed to view. In accordance with the present invention the plastic sides of the electrodes, such as plastic side 32, are covered with a very thin layer of four different reflective colored materials 44. This gives the light modulating capacitor the possibility of four different display colors.

Figure 2:
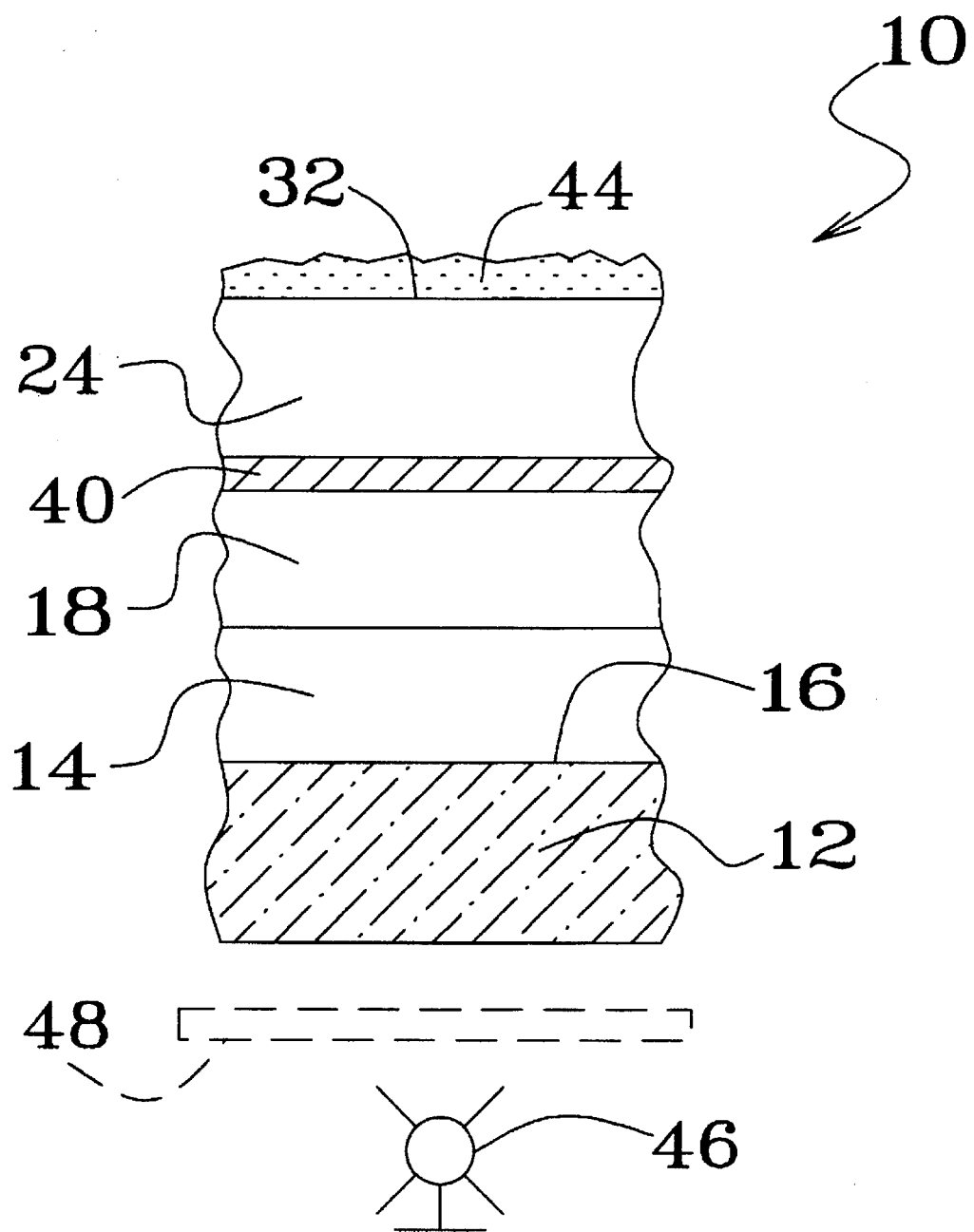
FIG. 2 is a cross-sectional representation of the light modulating capacitor of FIG. 1 illustrating the various operative members.

FIG. 2 is a view in cross-section of the device of FIG. 1 with electrode 24 unfurled, illustrating the multi-layer construction of the device more clearly. Because substrate 12 and material 14 are transparent, LMC 10 may be backlit by a source of illumination 46. Alternatively, a background color element 48 could be added in order to show a fifth color.

During operation, if it is desired to unfurl any of the active electrodes, the same may be readily achieved. The active electrodes are pre-stressed to form a tightly coiled roll, as illustrated in FIG. 1. Thus, in the absence of any external force, the active electrodes form the illustrated small recoiled coiled-up member. However, in the event that one desires to unfurl one of these coiled up members, it is merely necessary to apply a voltage difference between the metallized layer on the particular active electrode and the transparent conductive substrate which it overlies when unfurled or unrolled. The result will be attraction causing the active member to unroll to a substantially flat shape in which configuration it is at its maximum capacitance.

For example, it is also possible that by varying the shape of the overlapping areas of metallized layer on the active electrode and the fixed electrode variable amounts of unfurling may be achieved. More particularly, by varying the length of the edge of the overlapping area of the active electrode as the electrode unrolls, the total amount of force needed to keep the electrode unrolled varies, thus providing for partial control of the electrode. The operating characteristic of voltage versus active electrode area unrolled may be changed to achieve a desired linear or nonlinear characteristic which may be particularly useful depending upon the application involved, as will be described in detail below.

Figure 3:
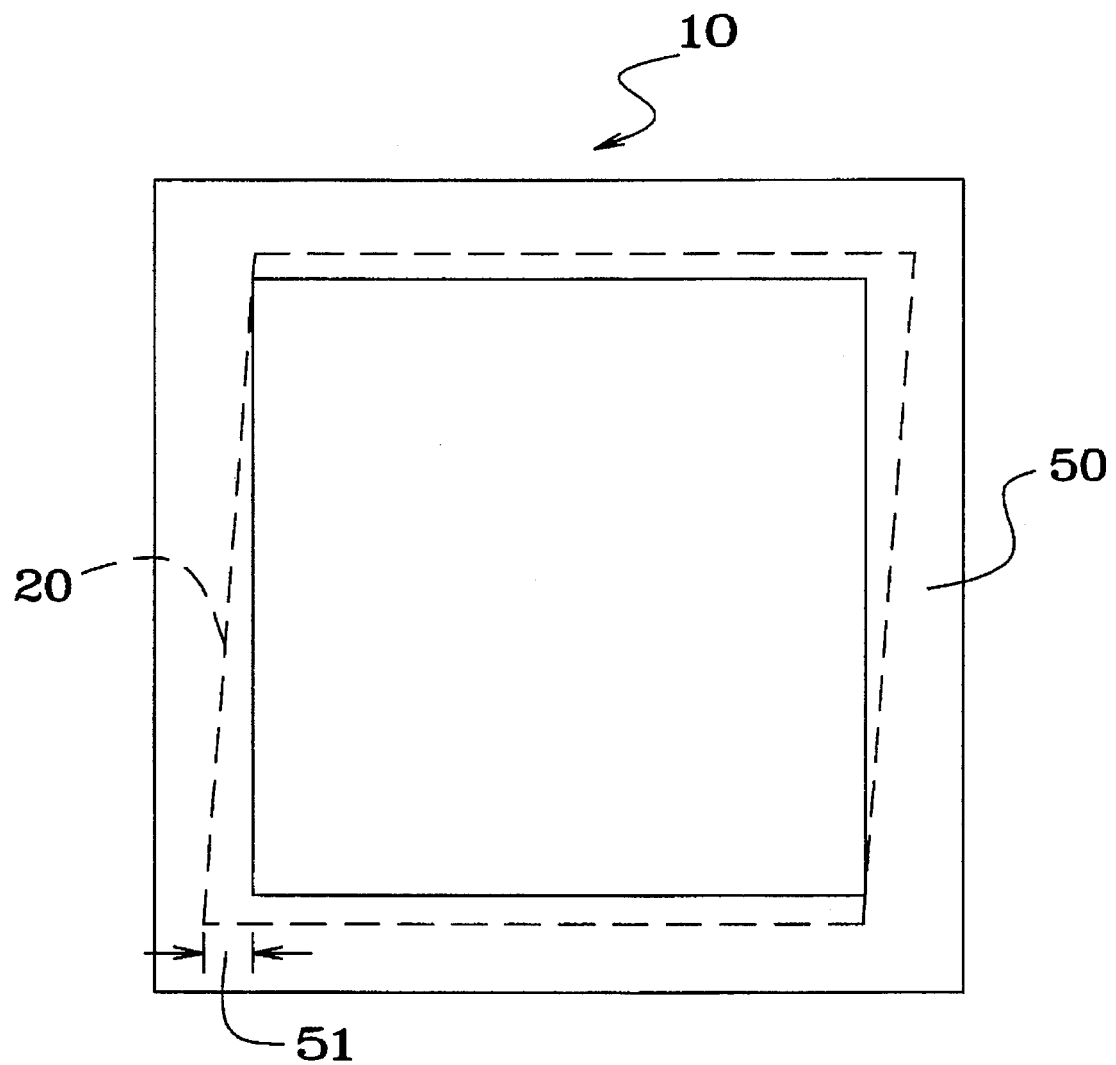
FIG. 3 illustrates a defect which may be caused by irregularities in the manufacturing process or asymmetrical forces present during operation of the inventive light modulating capacitor.

Due to normal manufacturing tolerances, pixel size and configuration may vary. In addition stray forces may cause additional variations in electrode shape. Referring to FIG. 3, in accordance with the present invention, any variation 51 in size and configuration of the active electrodes is compensated for by a mask 50 which extends around the periphery of a pixel formed by a light modulating capacitor 10.

Figure 4:
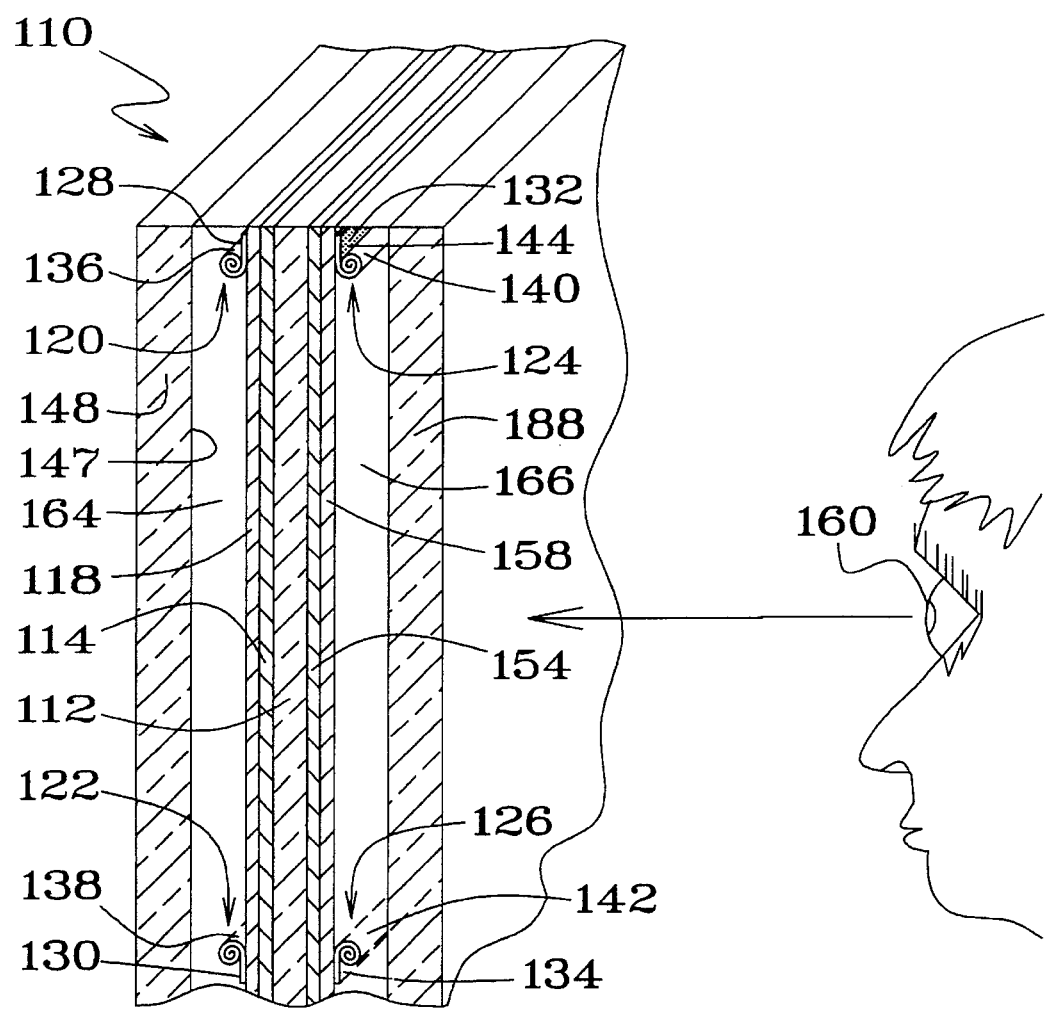
FIG. 4 is a perspective view partially in cross-section illustrating an alternative embodiment of a pixel incorporating four electrodes and a background color and constructed in accordance with the present invention and in which pulse time modulation will provide shades of color.

An alternative embodiment of the invention is illustrated in FIG. 4. Generally, similar parts or parts performing analogous, corresponding or identical functions to those of the FIGS. 1–3 embodiment are numbered herein with numbers which differ from those of the earlier embodiment by multiples of one hundred.

Light modulating capacitor 110 is of the reflective type and because of the configuration of the active electrodes offers the possibility of complete control over luminance over a range of reflectivity from black to white, complete variation of the chrominance of the capacitor including both hue and color saturation. Light modulating capacitor 110 is built on a substrate 112 which may be made of glass, plastic or any suitable transparent material. A thin layer of rigid Mylar plastic is preferred as it is strong in thin layers. Thin layers are desirable in order to minimize parallax. Substrate 112 supports a layer of transparent material 114 which may be made of any known transparent conductive material, such as indium tin oxide (ITO) or any other suitable material and having a thickness of about 300 Angstroms. In the event that extremely large areas and quick response times are required and the resistance of the layer of transparent conductive material 114 is large, the material may be maintained substantially transparent but more highly conductive over large areas by material 114 deposited underneath an extremely fine printed circuit metal grid similar to grid 16, illustrated in phantom lines in FIG. 1. However, it is likely in most applications to be easier to raise the conductivity of the ITO layer.

Material 114 is, in turn, covered by a dielectric layer 118. The back side of the structure includes two active light modulating capacitor electrodes 120 and 122. Active electrodes 120 and 122 are made of a plastic material covered with an extremely thin layer of conductive material such as aluminized polyester plastic having a thickness of 2.5 microns. Thus, one side of the flat planar material of which electrodes 120 and 122 are made is plastic and the other side is a conductor. In the embodiment illustrated in FIG. 4, the plastic sides 128 and 130 are exposed toward the rear of the device while the metal sides 136 and 138 lie on the front of the electrodes when the electrodes are completely uncoiled from the position illustrated in FIG. 4. Thus, metal sides 136 and 138 appear as indicated in FIG. 4.

Figure 5:
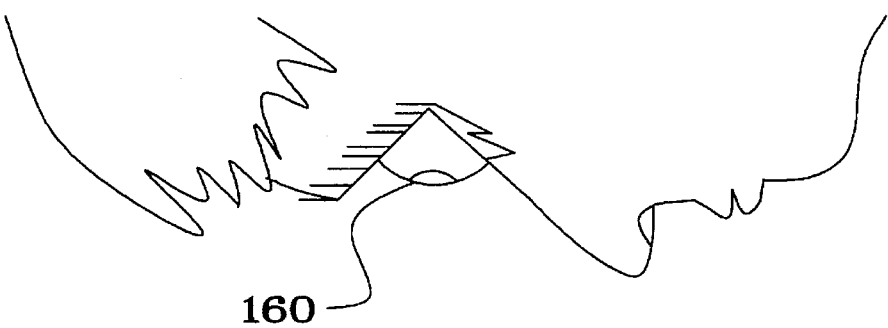
FIG. 5 is a cross-sectional view of the embodiment of FIG. 4.
Figure 5:
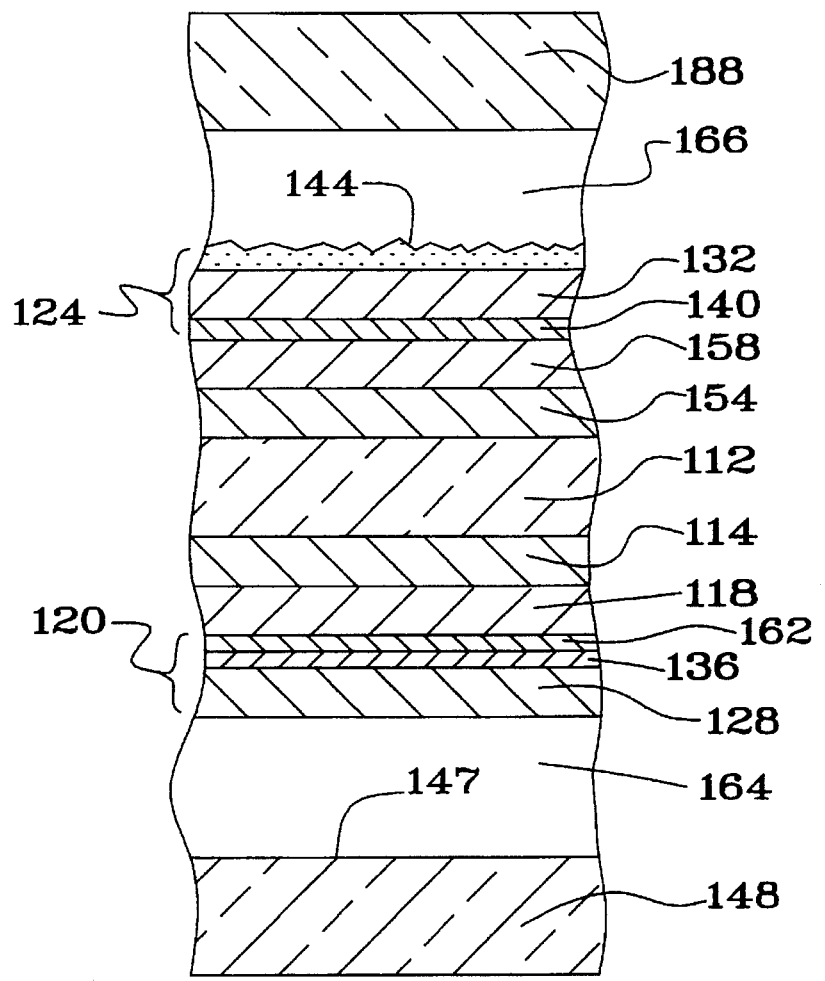

As can be seen from FIG. 4, if any one of the electrodes, such as electrode 124, is unfurled, as is illustrated in phantom lines in FIG. 4, the plastic side (in the case of electrode 124, plastic side 132) is exposed to view. In accordance with the present invention the plastic sides of the electrodes, such as plastic side 132, are covered with a thin layer of reflective colored material 144 which may be made of pigment and a binder. The layer must be thin to avoid damping the operation of the electrode. See FIG. 5 where two electrodes are shown unfurled and in cross-section for purposes of illustration.

Substrate 112 also supports a layer of transparent material 154, which may be composed of any known transparent conductive material, such as indium tin oxide or any other suitable material. In the event that extremely large areas are required and the resistance of the layer of transparent conductive material 154 is large, the material may also be maintained substantially transparent but more highly conductive over large areas by deposition of material 154 under an extremely fine metal grid similar to grid 16, illustrated in phantom lines in FIG. 1.

Material 154 is, in turn, covered by a dielectric layer 158. The front side of the structure includes two active light modulating capacitor electrodes 124 and 126. Active electrodes 124 and 126 are made of a plastic material covered with an extremely thin layer of conductive material. In the embodiment illustrated in FIG. 4, the plastic sides 132 and 134 are exposed toward the front of the device while the metal sides 140 and 142 lie on the rear of the electrodes when the electrodes are completely uncoiled from the position illustrated in FIG. 1. Thus, metal sides 140 and 142 appear as indicated in FIG. 4. The structure is covered in the front by a covering face plate 188.

The fixed electrode formed by conductive material 114 may have substantially the same size and shape as its respective active electrodes. As in the earlier embodiment, in the event that one desires to unfurl one of these coiled up members, it is merely necessary to apply a voltage difference between the metallized layer on the particular active electrode and the transparent conductive substrate which it overlies when unfurled or unrolled. The result will be attraction causing the active member to unroll completely.

A background color is applied to the surface 147 of rear planar housing element 148. Because the metal layer of active electrodes 120 and 122 faces a viewer 160, a conductive color layer 162 must be adhered to the metal. See FIG. 5. Such layer may be a layer of oxidized deposited titanium, $TiO_2$ in a binder such as a very thin layer of acrylic lacquer, extremely fine carbon black, or the like. However, if a non-conductive material is used, it must be very thin so that electrical charges easily migrate to the metal layer it rests on, thus preventing the buildup of triboelectric charges.

During operation, if it is desired to unfurl any of the active electrodes, the same may be readily achieved. The active electrodes are preformed into a tightly coiled roll, as in the embodiment of FIG. 1. Thus, in the absence of any external force, the active electrodes form the illustrated small coiled up member.

Application of a voltage difference between the metallized layer on the particular active electrode and the transparent conductive substrate which it overlies causes it to be unrolled in the spaces 164 and 166 provided for that purpose. Electronic controls should be used to prevent mechanical collisions between electrodes which roll along the same fixed electrode. This also applies to the other embodiments disclosed herein.

Referring to FIGS. 6–23, the substantially complete dynamic range that variable control of the inventive light modulating capacitor can provide over a selectable wide range of luminance, tint and color saturation including substantially complete control over luminance, tint and color saturation is illustrated. The only limitations on this range are the thin black mask 150 which has the result of darkening the display, and the perfection with which the materials can be made to faithfully reflect 1) either 100% of the light, or 2) to absorb 100% of the light, or 3) to faithfully reproduce the cyan, yellow and magenta colors required for full color reflective display capabilities.

In this respect, the inventive system, when incorporated in a matrix of light modulating capacitors, from a color reproduction theory standpoint resembles standard so-called "four color printing" except for the black top surface 168 of mask 150. While the width of mask 150 is greatly exaggerated for purposes of illustration, in a real device, mask 150 is made as small as possible and would likely have an area in the range of about 2–20% of the area of the display. Thus, it would reduce luminance only by about 2–20%, an effect which at the low end would be virtually undetectable. In some cases it may be desirable to use no mask at all.

Figure 7:
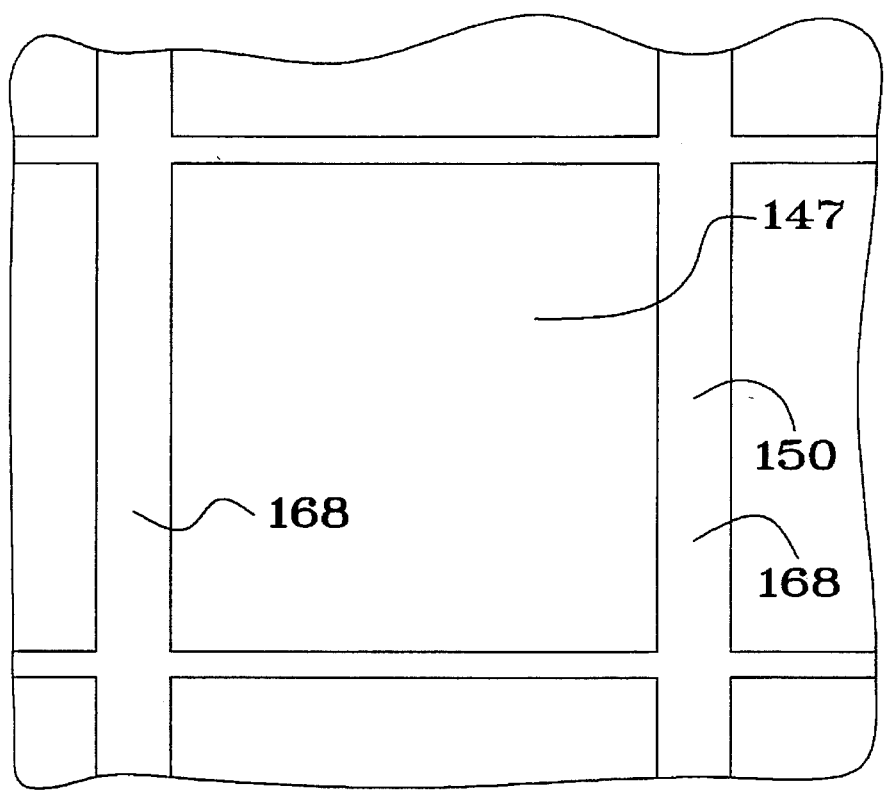
FIGS. 6–25 illustrate the full color capability of a device such as that illustrated in FIG. 4 when provided with a fixed electrode or other mechanism for controlling in analog fashion the amount of unfurling of the variable electrode with odd numbered FIGS. 7–25 representing the views along odd numbered lines 7—7 through 25—25 in plan in cross-sectional views illustrated in even numbered FIGS. 6–24, respectively.
Figure 6:
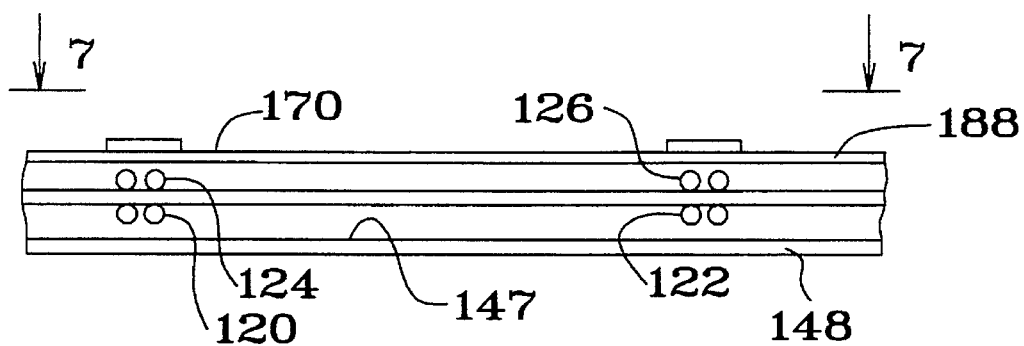

Referring to FIGS. 6 and 7, the principal components of a substantially black appearing pixel in the inventive system are illustrated. In particular, because all active electrodes 120–126 are in their relaxed unactivated states, a viewer looking at the pixel will see only the black coating on surface 147 of rear housing member 148. In connection with this, it is noted that the coatings on substrate 112 are desirably selected for the minimization of polychromatic reflections from the display. Likewise, it may be desirable to coat the outside surface 170 of the housing formed by rear element 148 and front housing member 188, to minimize reflections from these surfaces.

Figure 9:
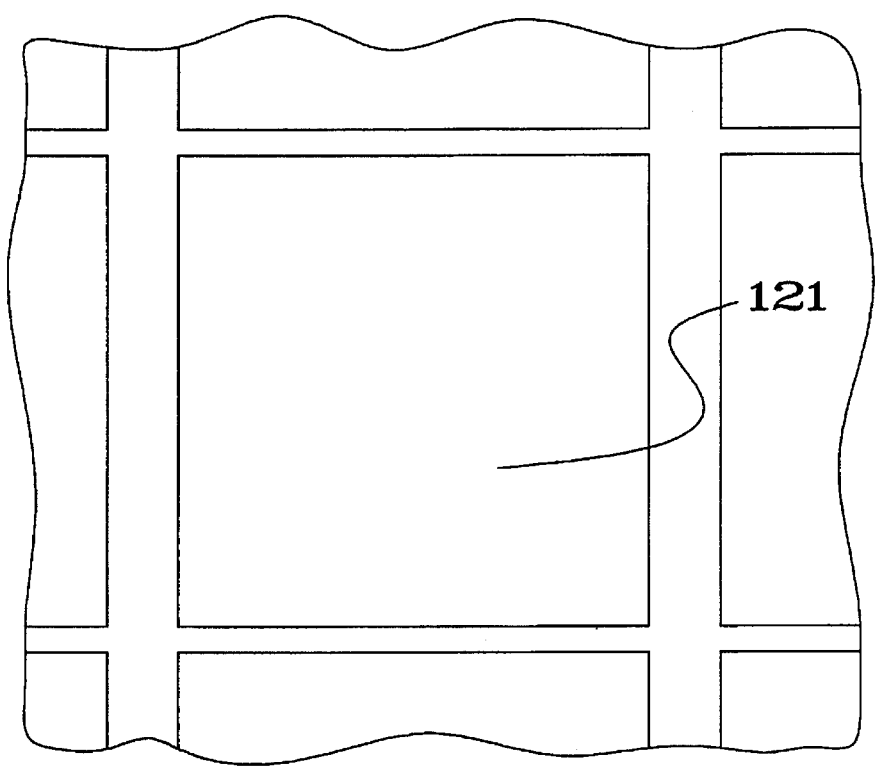
Figure 8:
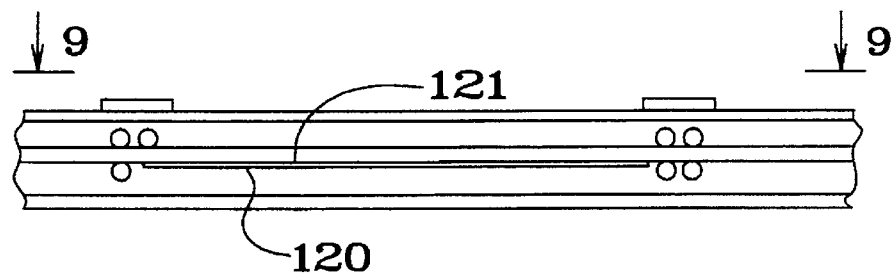

If an all yellow pixel is desired, the inventive system is put in the configuration illustrated in FIGS. 8 and 9. Here only electrode 120 has been unfurled exposing its surface 121 which is colored yellow to view, resulting in the display of yellow surface 121 to a viewer as illustrated in FIG. 9.

Figure 11:
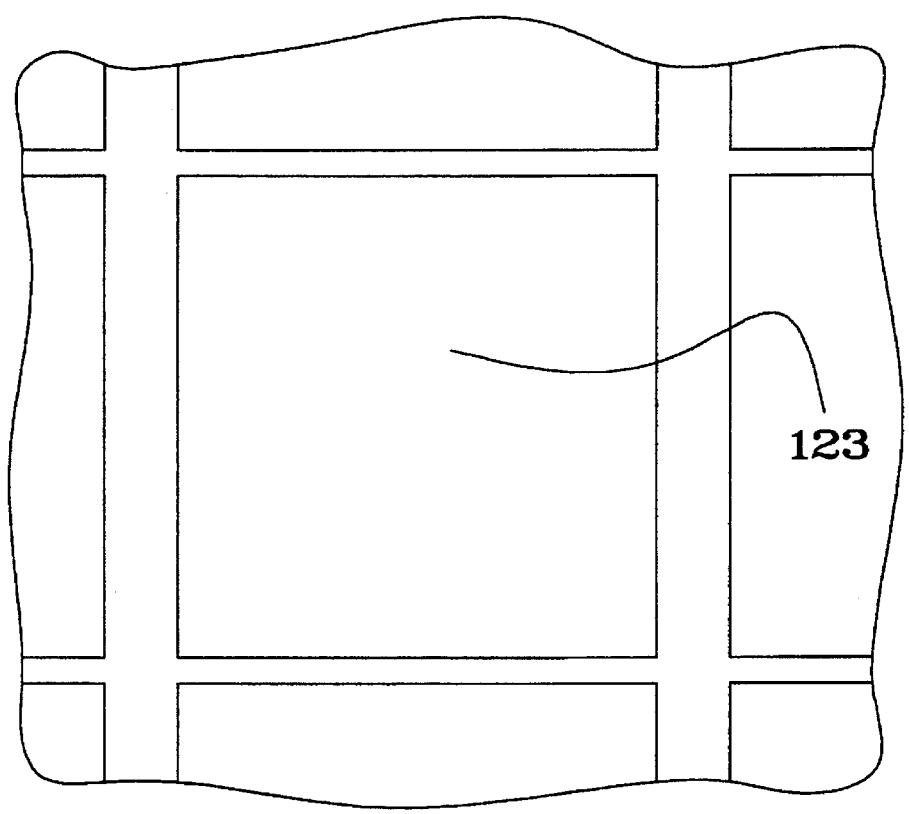
Figure 10:
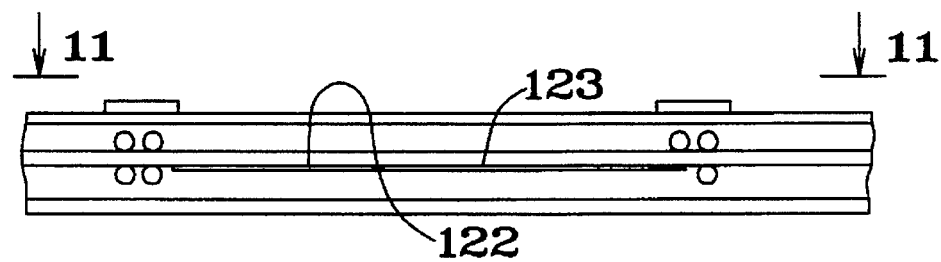

When it is desired to have a completely cyan display, the active electrodes are put in the configuration illustrated in FIGS. 10 and 11. Here only electrode 122 is activated, thus resulting in the display of its cyan face 123 to a viewer as illustrated in FIG. 11, thus resulting in the appearance of a completely cyan pixel.

Figure 13:
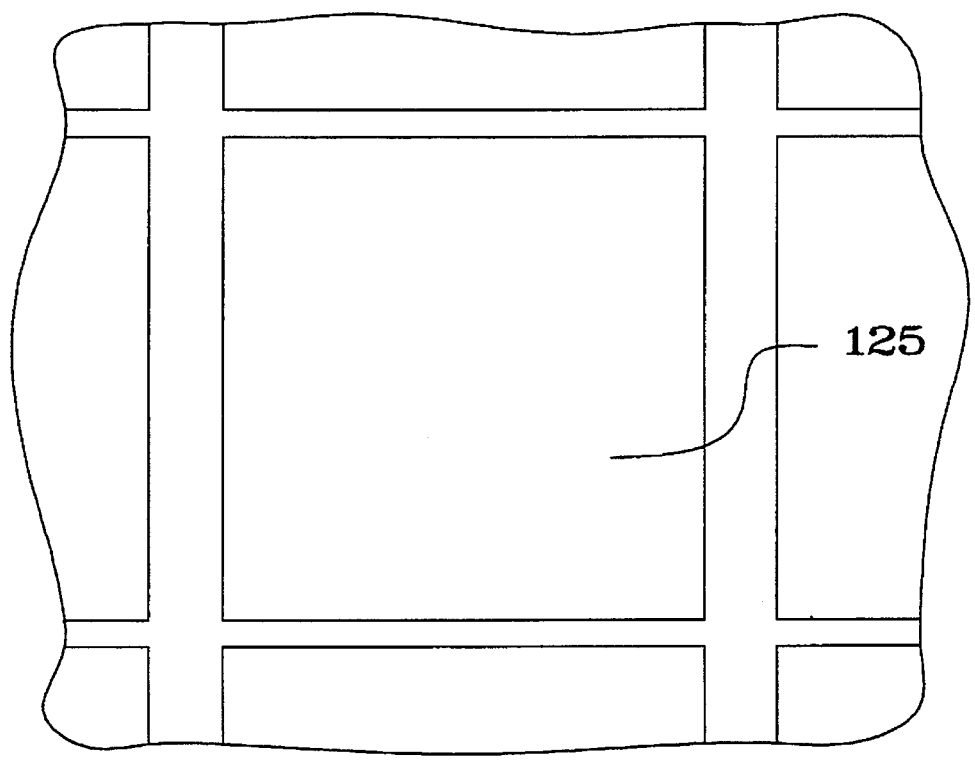
Figure 12:
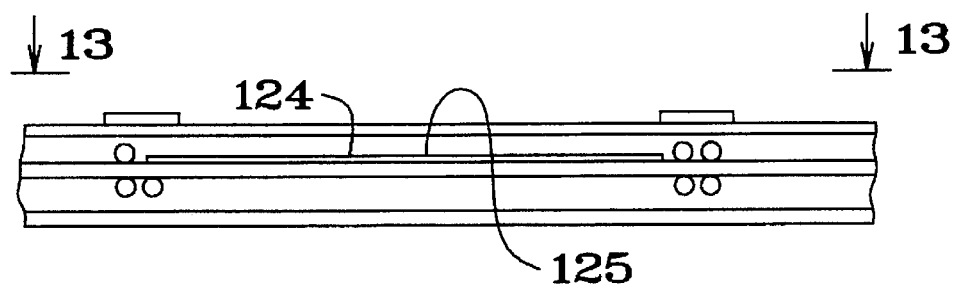

Likewise, magenta may be achieved over the complete face of the pixel with the electrodes in the configuration illustrated in FIG. 12. Here, electrode 124 is the only electrode which is activated thus resulting in the display of its magenta face 125 to the view of an individual looking at the display. It is therefore seen that the display may have either complete yellow, complete cyan or complete magenta as illustrated in FIGS. 9, 11 and 13, thus representing complete color saturation in the three primary printing colors.

Figure 15:
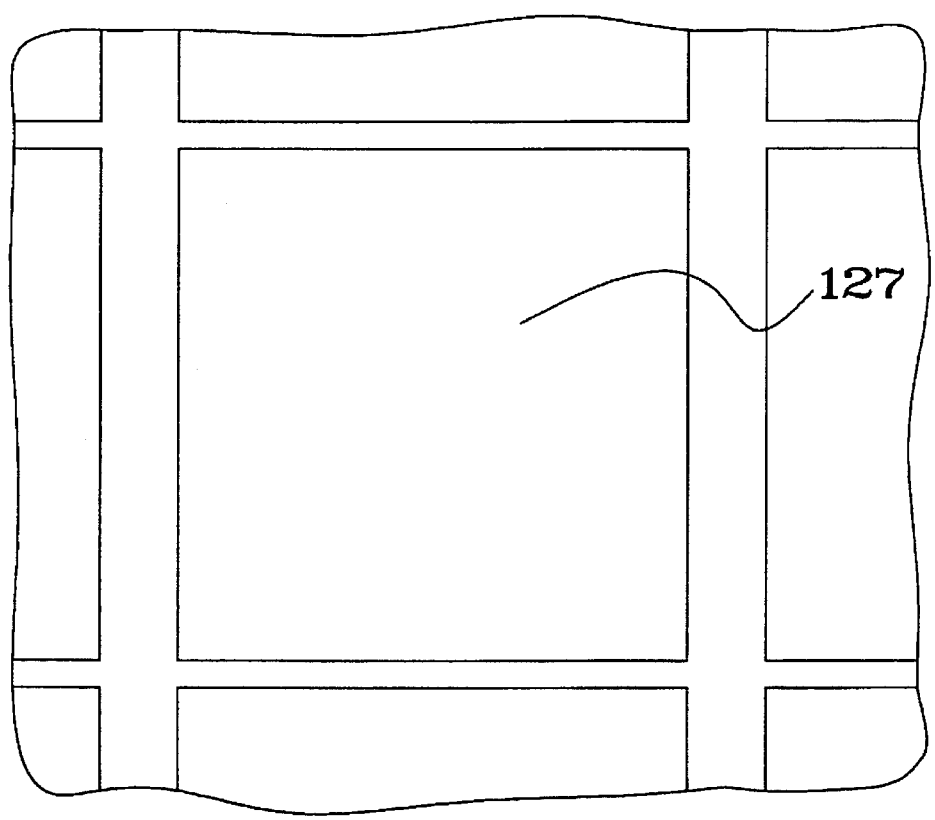
Figure 14:
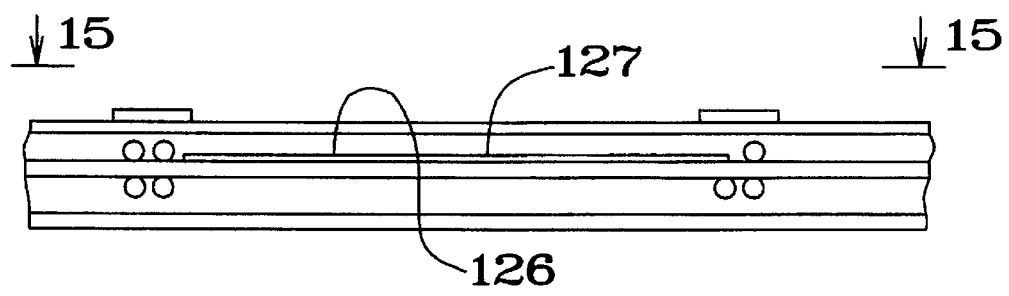
Figure 17:
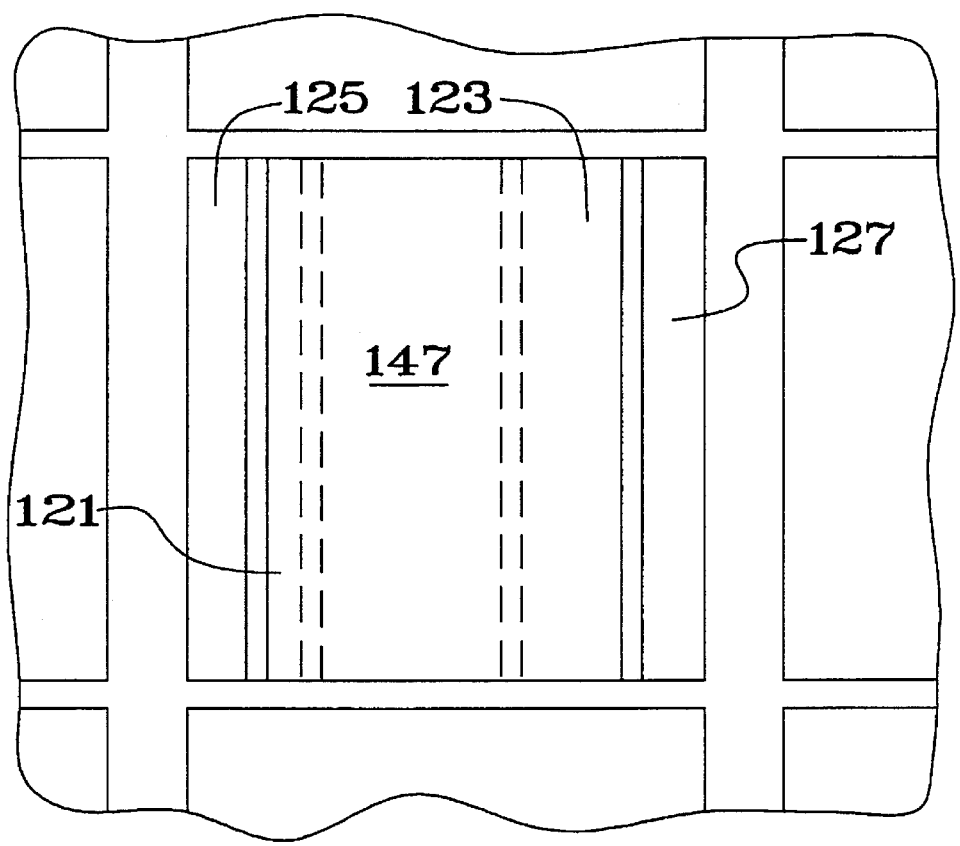
Figure 16:
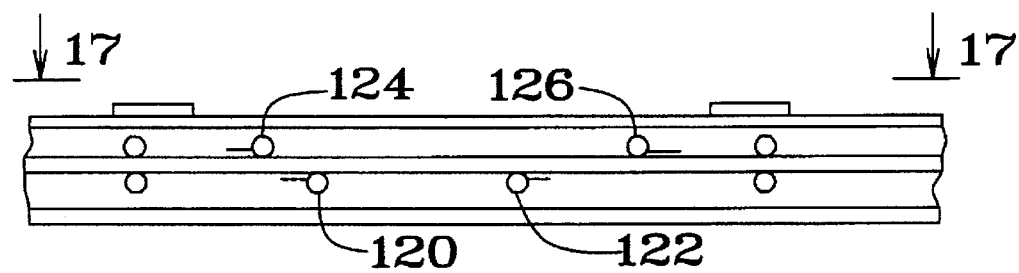

In similar fashion, as illustrated in FIG. 7, complete black can be achieved by the display, or, as illustrated in FIGS. 14 and 15, complete white. In particular, in the configuration illustrated in FIGS. 14 and 15, only electrode 126 is actuated resulting in the display of its white face 127 to the display of a viewer. Thus a surface which is substantially completely reflective may also be achieved.

In accordance with the present invention, it is also possible for any pixel to simulate any percentage of the five colors of a reflective color system. For example, by putting the electrodes in the positions illustrated in FIG. 16, it is possible to have a display which is 58% color neutral comprising a 46% black component formed by background black color 147 and a 12% white component formed by white electrode surface 127. The remaining 42% of the display conveys all the color information including a magenta surface formed by electrode surface 125 which comprises 10% of the display, the yellow surface which comprises 8% of the display and a cyan surface which comprises 24% of the display.

Figure 19:
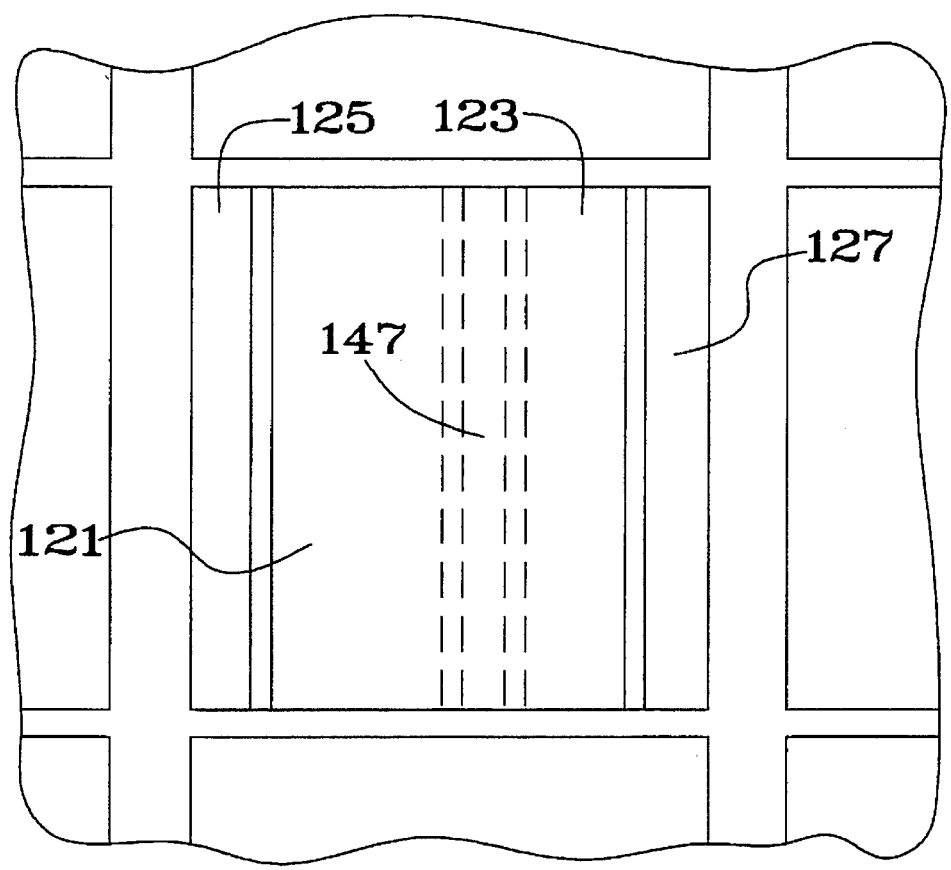
Figure 18:
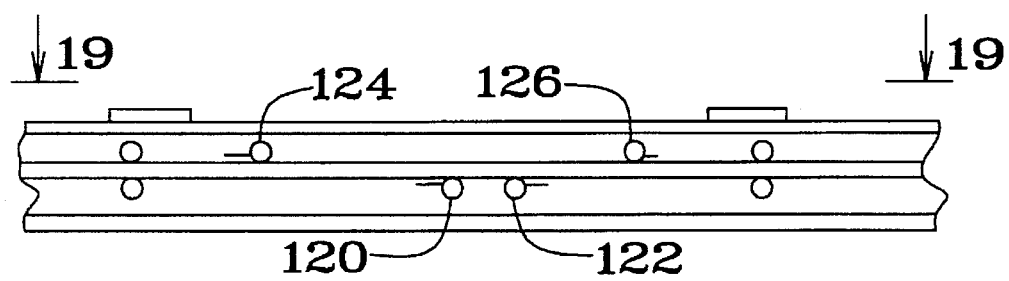

If it is desired to have yellow dominate the display, the system might take the configuration illustrated in FIGS. 18 and 19 where yellow comprises approximately 38% of the display and cyan comprises approximately 21% of it. The remaining portion of the display is comprised of magenta in the amount of 15%, black in the amount of 12% and white in the amount of 14% of the display area.

Figure 21:
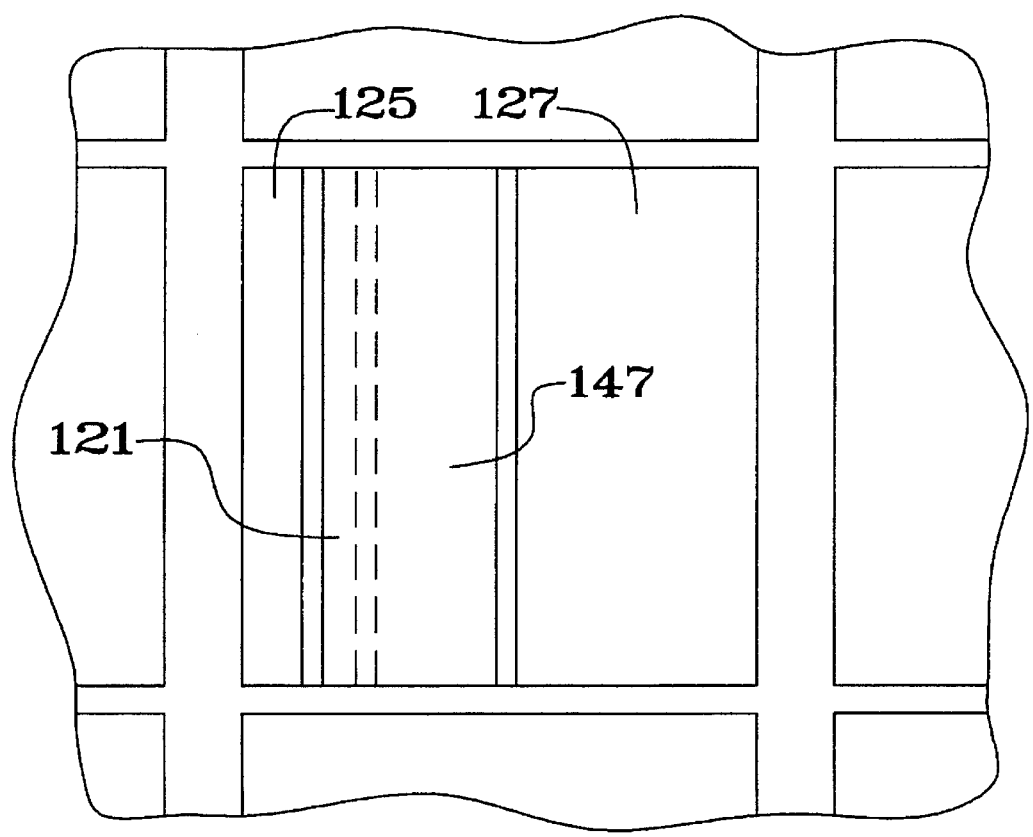
Figure 20:
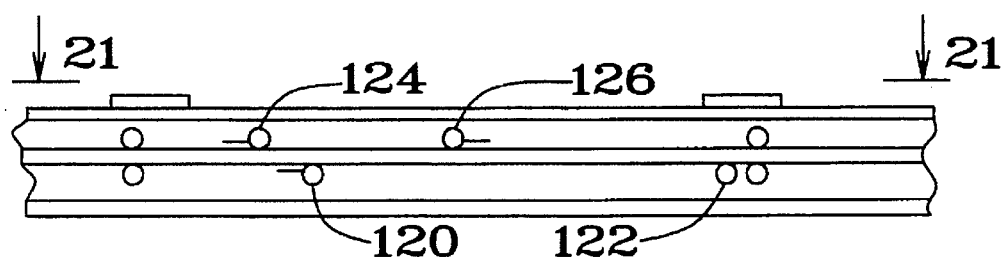

Likewise, it is possible for one of the color components to completely disappear, as is illustrated in FIGS. 20 and 21. With the electrodes in the positions illustrated in FIG. 20, the cyan color completely disappears with the display being dominated by large areas of white and black and smaller areas of magenta and yellow.

Figure 23:
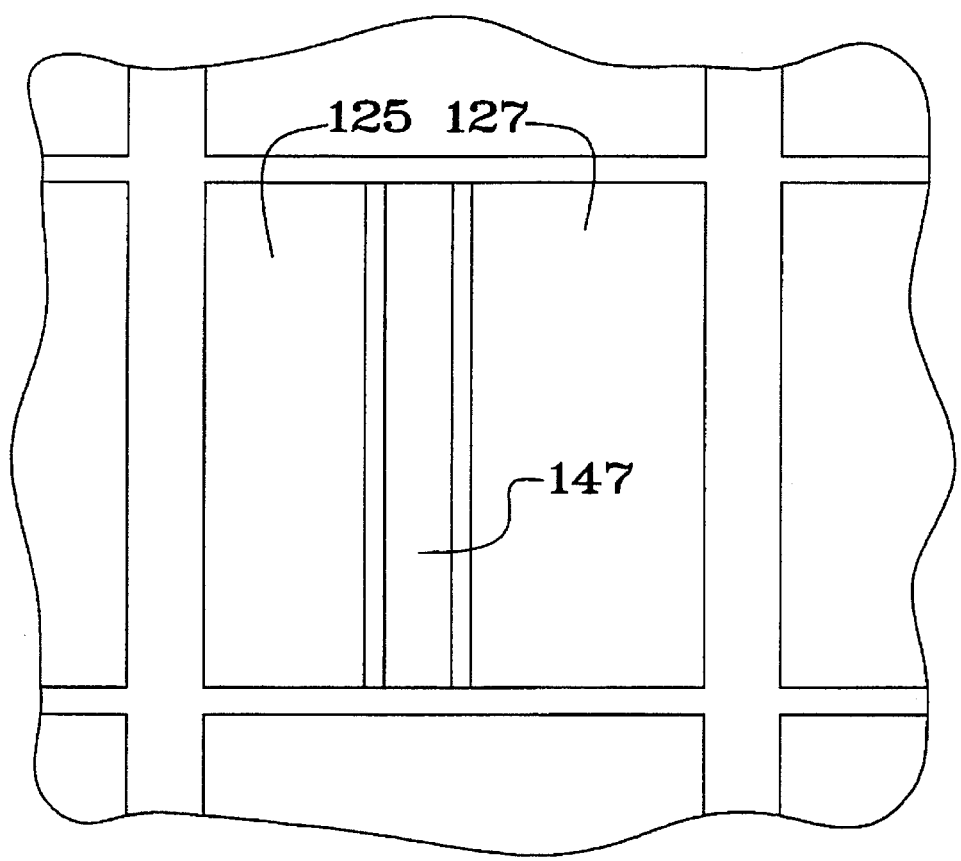
Figure 22:
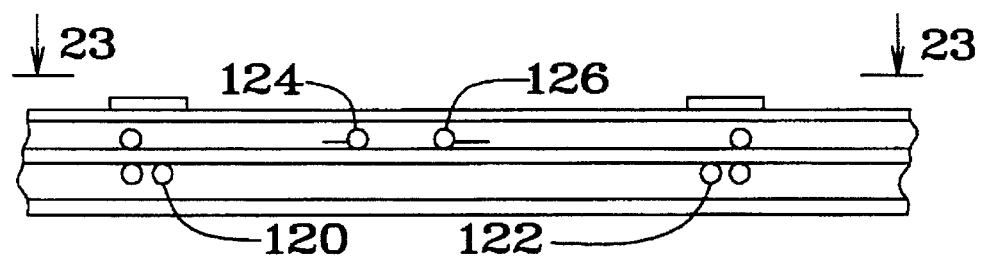

With the electrodes illustrated as shown in FIGS. 22 and 23, two of the color components have disappeared and white dominates the field which includes a small component of black and a relatively large component of magenta, thus giving the display a completely magenta color but with a large color dilution factor created by the white light reflected from surface 127. Nevertheless, the small amount of complete absorption by surface 147 prevents the pixel from reaching an undesired higher level of brilliance.

Figure 25:
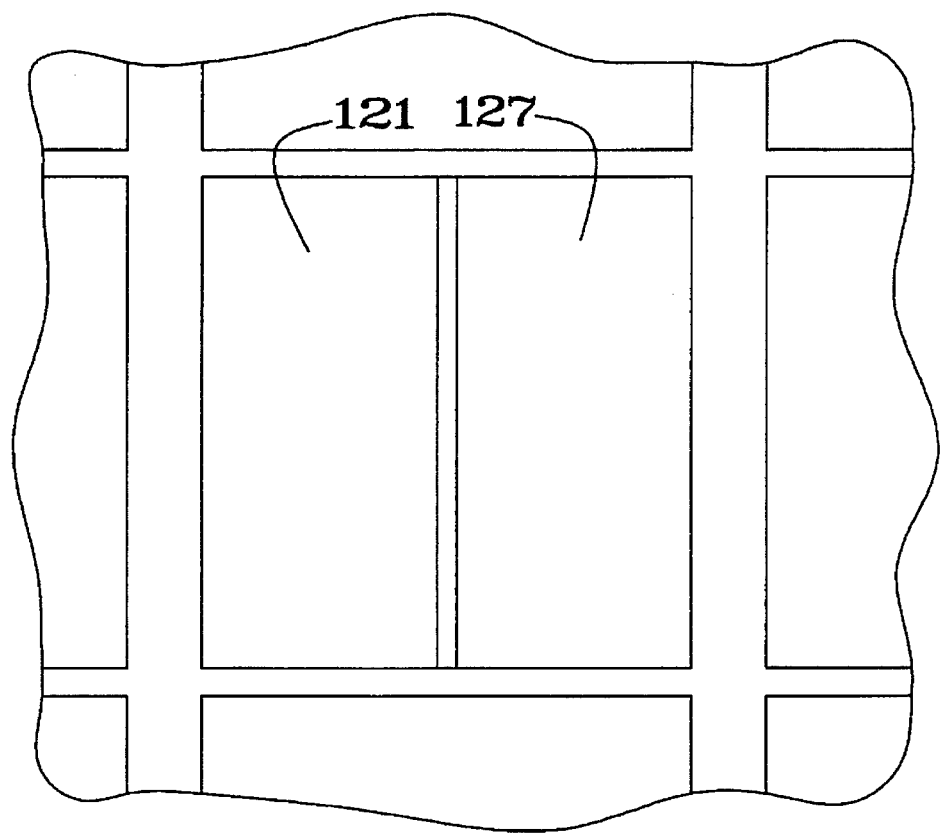
Figure 24:
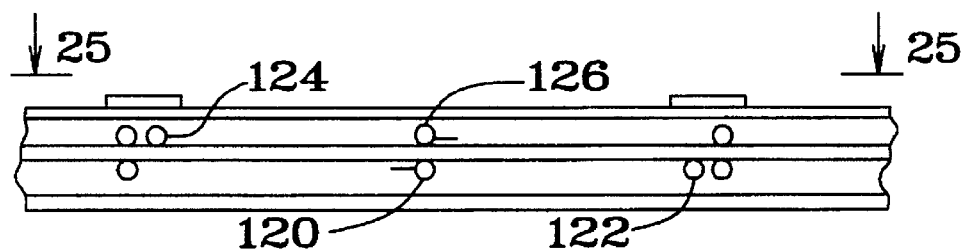

Such brilliance is achieved, however, in the purely yellow hue display illustrated in FIGS. 24 and 25. Here the display includes a yellow surface 121 which comprises approximately 55% of the display area while a white area 127 comprises approximately 45% of the display. In this respect, the yellow color of the display is pure although it is diluted to a large extent and the overall pixel made to appear more brilliant by exposure of a large portion of the white surface 127 of pixel 126.

Figure 26:
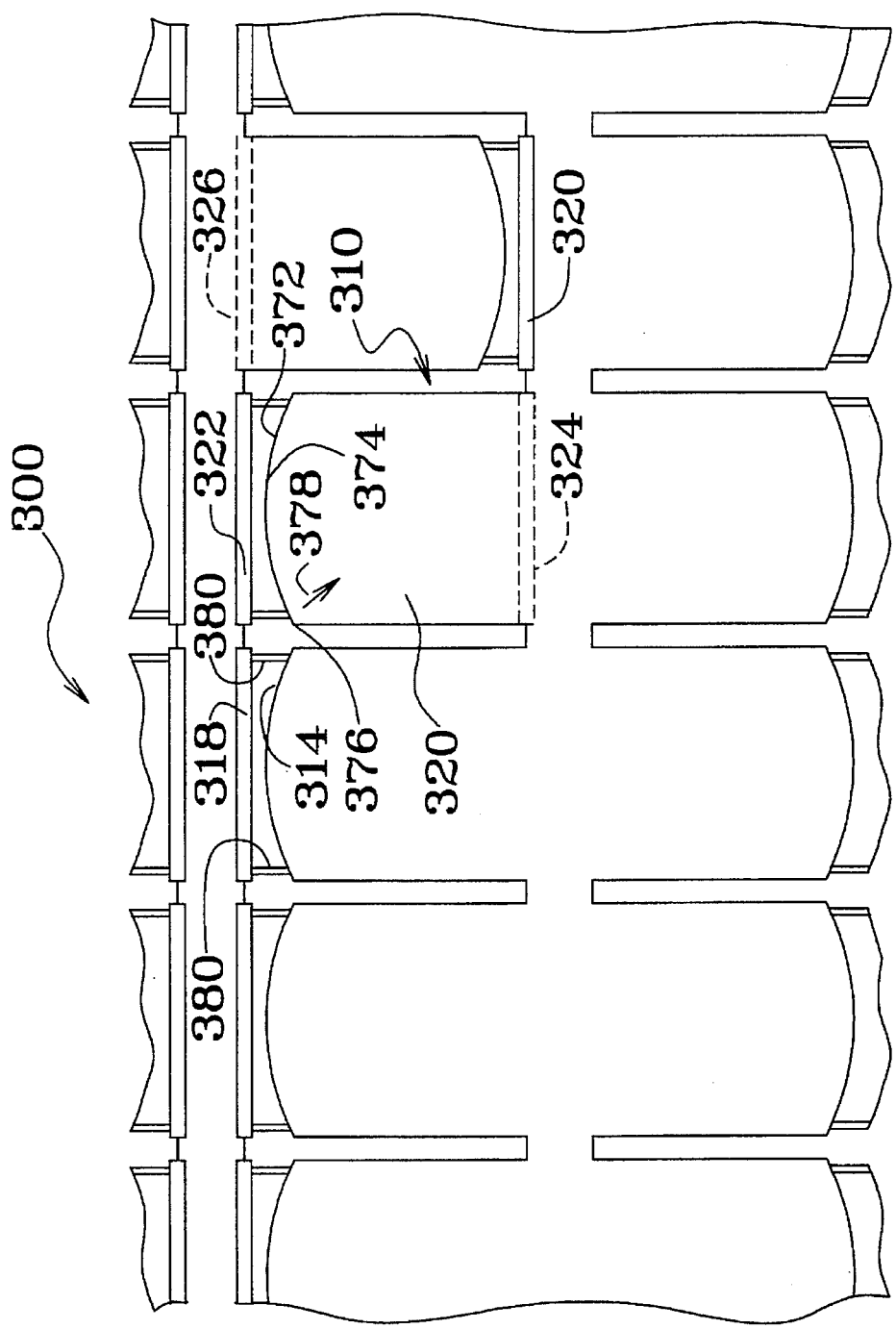
FIG. 26 illustrates a possible matrix construction of inventive pixels.
Figure 27:
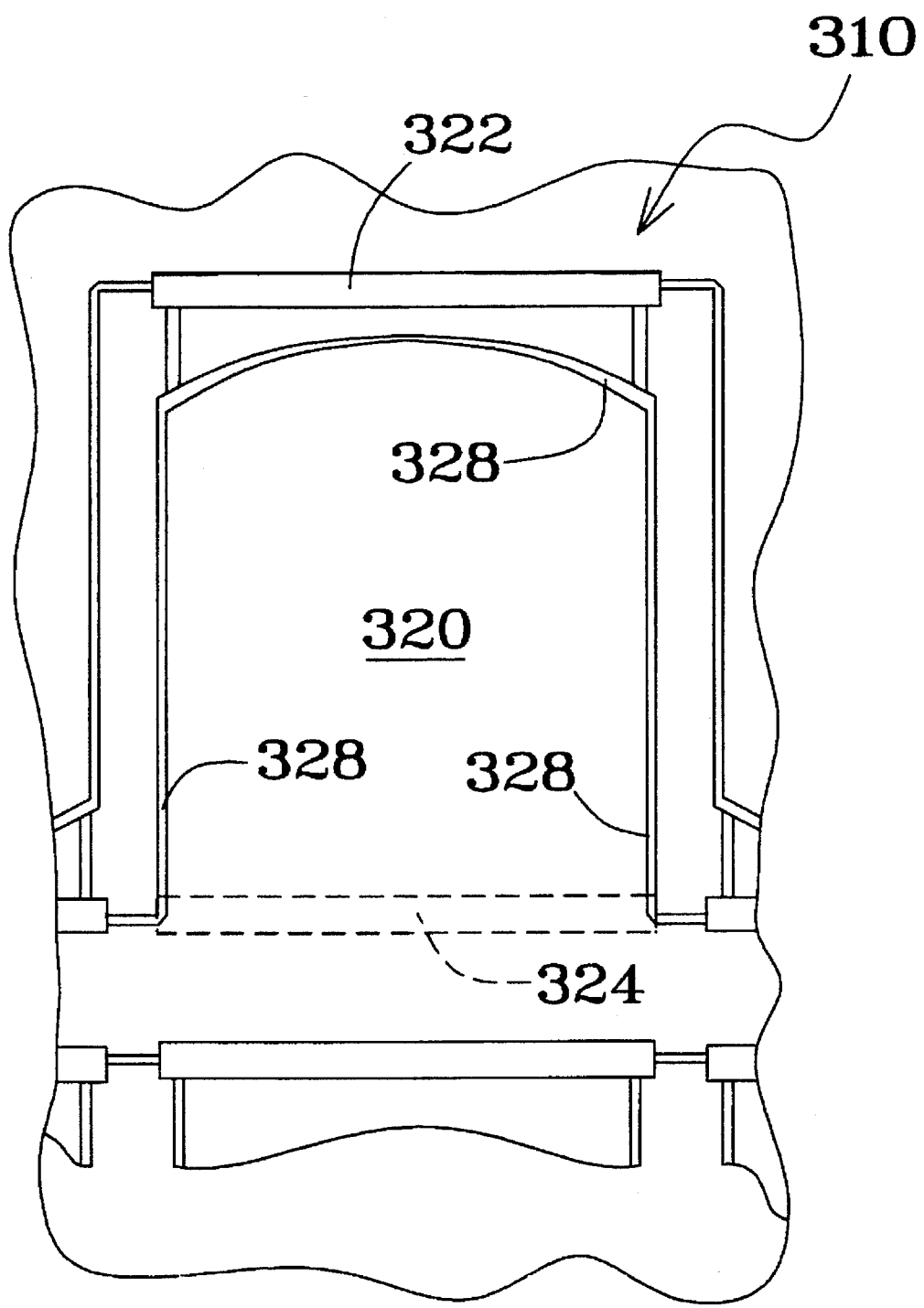
FIG. 27 is a detail of a pixel illustrated in FIG. 26.

The construction of a display 300 comprising a matrix of pixels 310 is illustrated in FIGS. 26–27. Here the active electrodes 320 and 322 are formed with a curved or pointed far edge 372. This is done for the purpose of insuring that rollout will occur at the farthest point 374 on the active electrode thus avoiding the possibility of malfunction through the rolling end of corner 376 in the diagonal direction indicated by arrow 378. The active electrodes 324 and 326 may be located underneath and opposite the electrodes 322 and 320, as illustrated by phantom lines in FIG. 26.

The embodiment of FIG. 26 also includes means for making extremely large matrix displays notwithstanding possible relatively poor conductivities in large expanses of transparent material. More particularly, in accordance with the present invention, it is contemplated that the transparent conductive material which forms the fixed electrodes of the light modulating capacitors is laid out in strips which are driven at their ends. In the event that the strips are long, the conductivity of these strips will become significant over long lengths. Accordingly, underneath transparent dielectric strips 318, a layer of conductive transparent material 314 is deposited over conductive printed circuit strips 380 which may be made of copper or any other suitable material.

Figure 30:
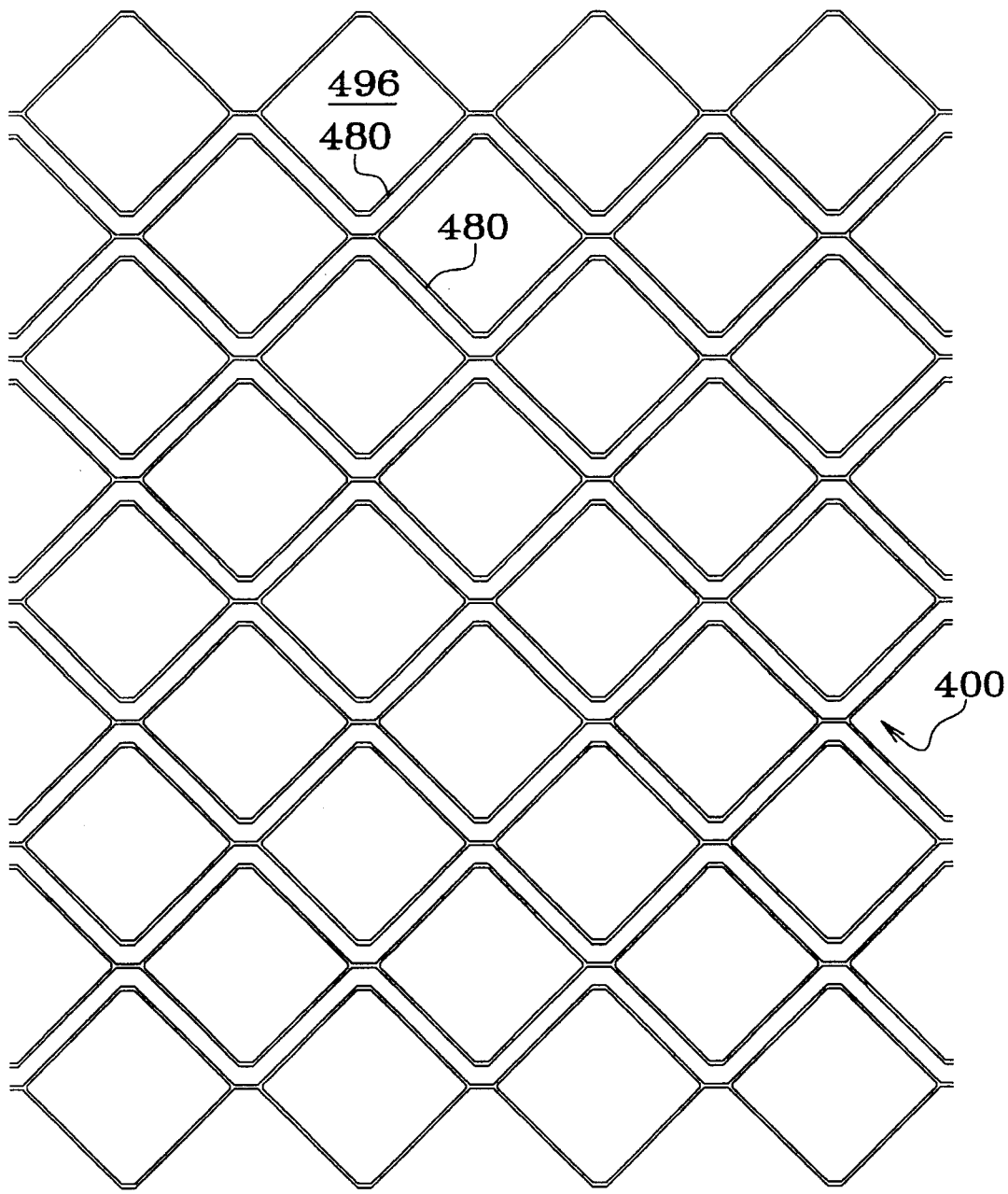
FIG. 30 is a diagram illustrating the configuration of fixed electrodes in a matrix constructed in accordance with the present invention and incorporating triangular active electrodes.
Figure 31:
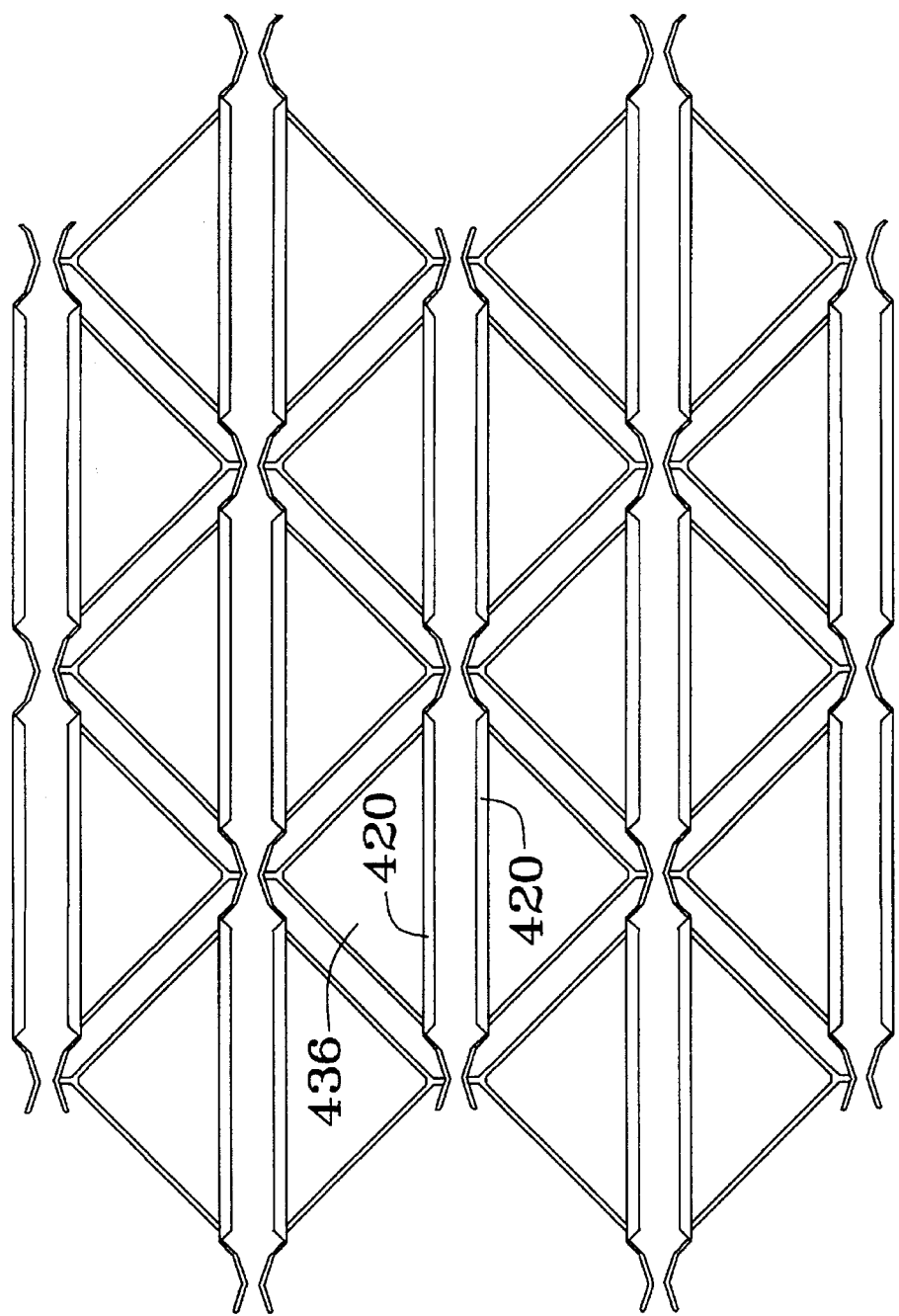
FIG. 31 is a view of a matrix display constructed in accordance with the present invention and incorporating triangle electrodes with all electrodes shown in the open rolled up position.
Figure 32:
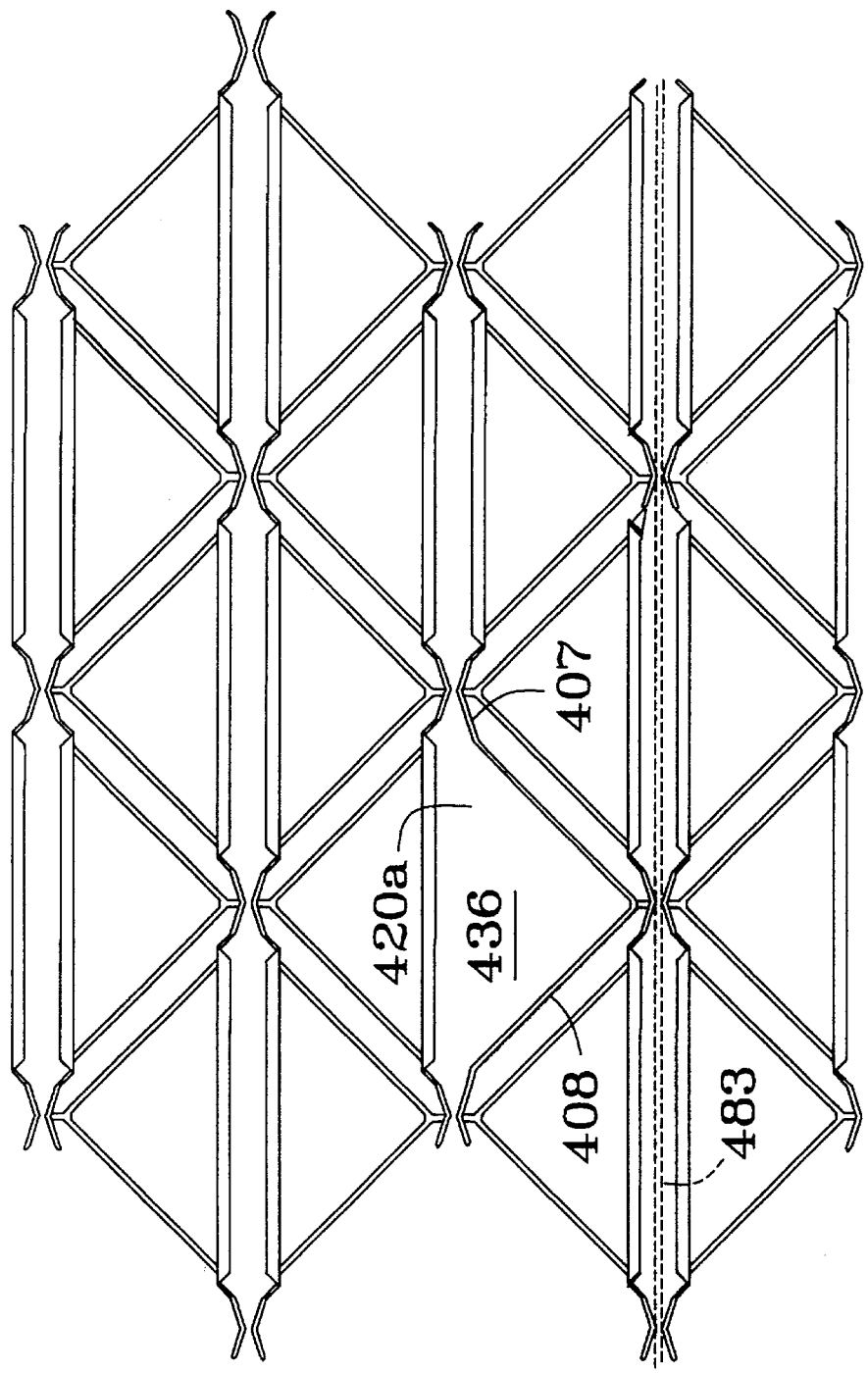
FIG. 32 is a view similar to FIG. 31 showing one of the electrodes unrolled.

FIG. 30 illustrates the deposition of the transparent conductive layer for a triangular shaped electrode. Here the conductive fixed electrodes takes the form of the diamond shaped areas illustrated in FIG. 30 resulting in the formation of a matrix 400. Edge conductors 480 are also provided for the same purpose as the edge conductors in the earlier embodiment, that is, in the event that large areas are required. FIG. 31 illustrates triangular shaped electrodes 420 which as shown in FIG. 32 include metal members 436 which do not extend to the edge of the active electrode, thus resulting in a gap between the edge of the metal and the edge of the plastic portion 428 of the electrode.

In FIG. 31, all electrodes are shown in an unstressed rolled up state. In FIG. 32, one of the electrodes, namely, electrode 420a, has been unfurled illustrating its triangular shape. Electrodes are held in position by glue 483. The triangular shape makes the capacitors particularly immune to asymmetrical rolling in returning to its unstressed state.

While the corners 407 have been shown in a somewhat rounded configuration, of course the same can be made with a flat tip as illustrated in phantom lines by simply using a sufficiently narrow ribbon to form the active electrode. This will make the voltage required for complete unrolling a reasonably low value.

In accordance with yet another alternative embodiment, the edge 594 of the coiled metallized plastic strip may be chemically treated or treated with heat to form a stiff edge which will insure uniform rolling of the active electrode from both corners 576 simultaneously.

Figure 28:
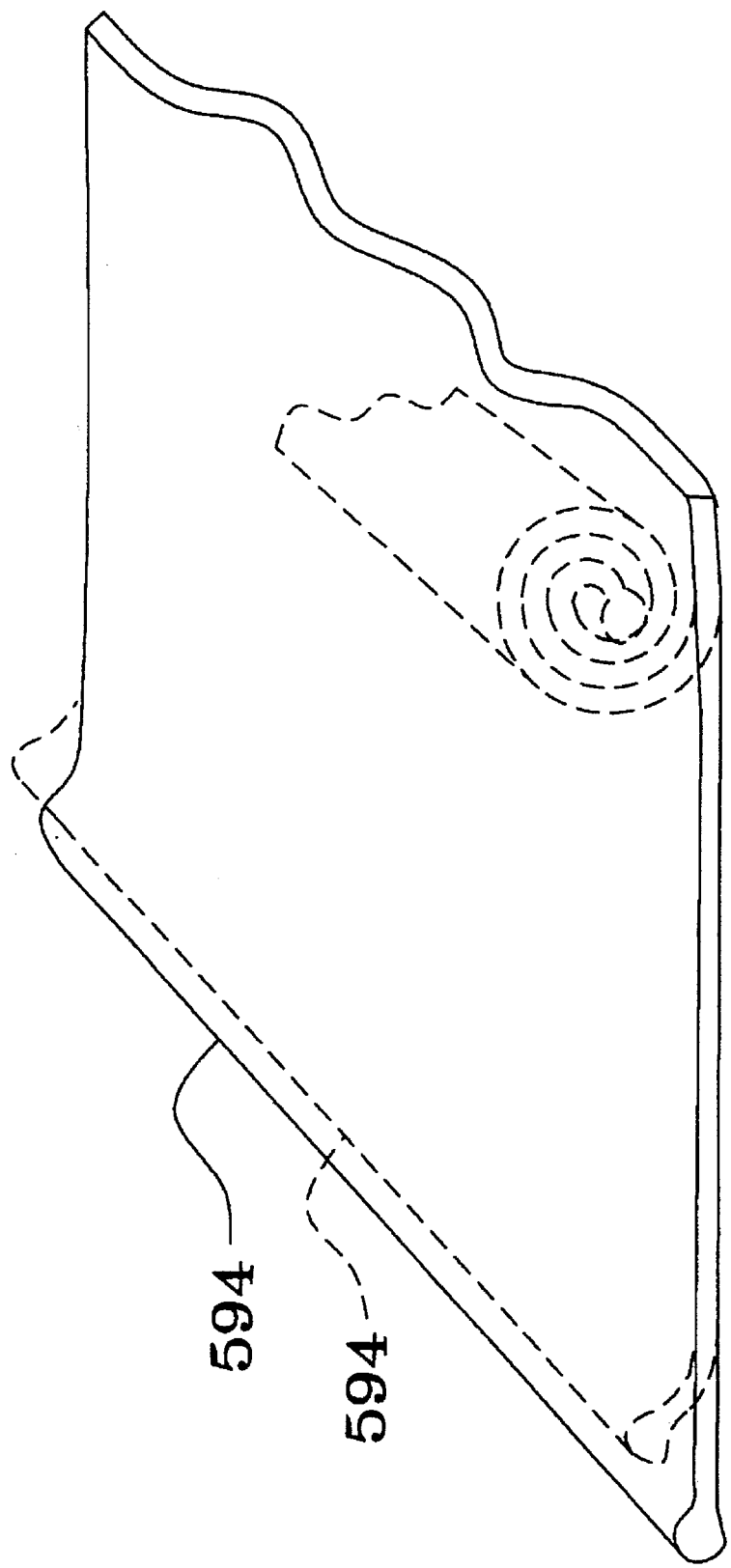

As shown in FIG. 28, the edge 594 of the active electrode is somewhat swelled due to chemical or laser action and thus provides a relatively rigid member which is lifted up substantially along its entire length. Even if the tendency of the active electrode to relax results in picking up only one of its corners, the stiff nature of edge 594 will tend to cause the entire edge to lift up extending to the opposite corner regardless of which corner, begins to rise first and eliminating any tendency to stick at the opposite corner. Thus, the active electrode will reliably and quickly reach its coiled up position illustrated in phantom lines schematically in FIG. 28.

The coloration of plastic is a relatively well-developed art and any conventional technique such as the use of dyes, surface coatings of color and binder, the incorporation of pigments into the plastic material prior to film formation, or the like may be used to achieve desired colors in the plastic portion of the active electrode.

Figure 29:
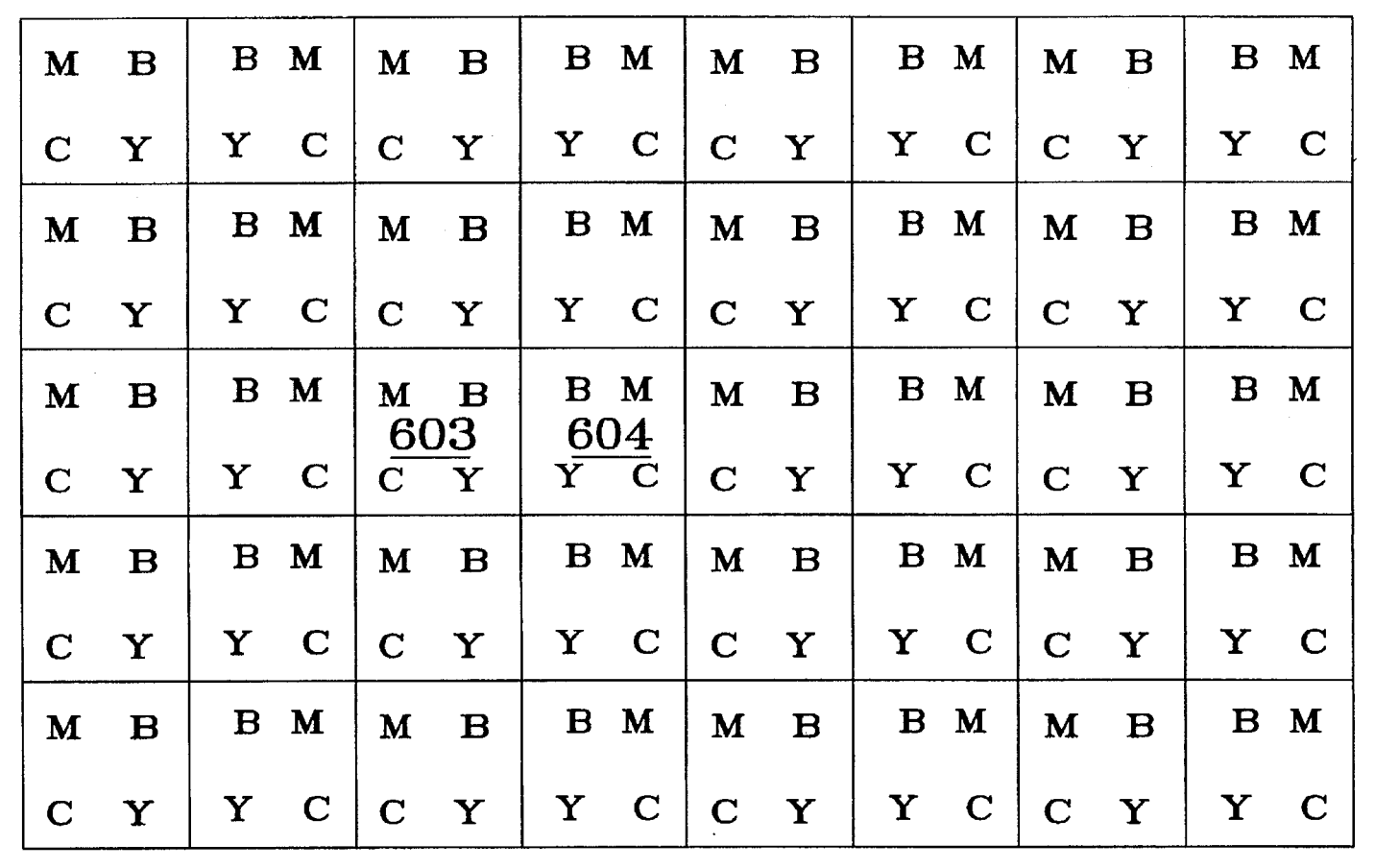

FIG. 29 shows an arrangement of pixels and their color assignments for a full color display using a full color analog pixel of the type constructed in accordance with the invention. More particularly, in pixel 603, for example, the magenta and black electrodes are on opposite edges of the pixel and on the top of the device visible to a viewer. On the other hand, the cyan and yellow electrodes are on the opposite side of the substrate.

Insofar as the electronic bussing arrangement created by the physical configuration illustrated, for example, in FIG. 26 and FIG. 32 necessitates that adjacent electrodes must have opposite configurations, pixel 604 has its black electrode rolling toward a rolled up position on the left on the top while the magenta electrode is on the top and rolls toward a rolled up position on the right, while on the underside of the substrate the yellow electrode rolls toward a rolled up position on the left and the cyan electrode rolls toward a rolled up position on the right. This is the opposite of pixel 603 and facilitated by the inventive structure.

As an alternate possibility, one may also wish to uniformly mix devices in which the colors that appear on the front with devices in which those colors appear on the back of an adjacent device to balance the look of the pixels, whose front colors may be more vivid. Alternatively, for example, cyan may appear as a front electrode color, a rear electrode color and a background color.

Figure 33:
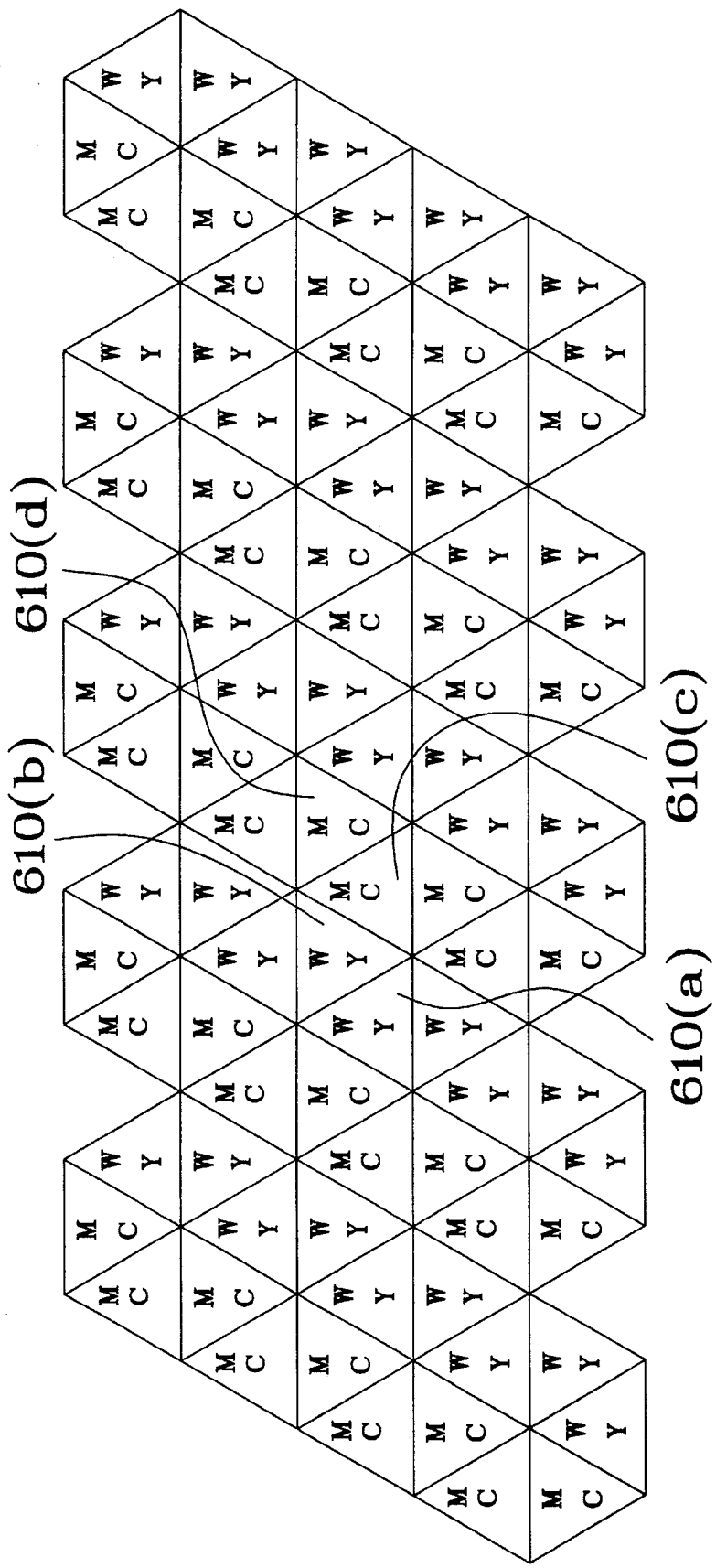
FIG. 33 is a diagram illustrating color assignments in the matrix illustrated in FIG. 32.

The possibility of analog control of the electrode is possible for the embodiment of FIG. 32, because of the relatively low voltage needed to begin a rollout and the relatively high voltage needed to substantially complete it. A possible arrangement of colors in an array of light modulating capacitors such as that illustrated in FIG. 32 is illustrated in FIG. 33. Here, because of the triangular configuration, each pixel is limited to three colors. In accordance with the disclosed embodiment, a black background is provided and only a pair of active electrodes, one on the front and one on the back of the substrate, are provided. The upper electrode may, for example, in the case of pixel 610*a* be white while the lower electrode may be yellow. Because of the symmetry of the driving bars, adjacent pixel 610*b* has the same color capabilities and is driven simultaneously with the same magnitude of signal.

However, magenta and cyan are provided by the next pixel 610*c* which has magenta on the top and cyan on the bottom as does its adjacent pixel 610*d* together with which it is driven simultaneously. However, it is noted that the matrix of FIG. 33 is somewhat limited in its capacity to receive various colors.

Insofar as the background of all pixels is black, it is possible to achieve an all black display. However, only a maximum white component of 50% is achievable with this structure. Likewise, for each of the various color components, only a maximum of 50% is possible. Thus, this structure will give a display which is somewhat lacking in brilliance as compared to the matrix arrangement illustrated in FIG. 29. Nevertheless, simplified manufacturing of parameters makes this display quite attractive for numerous purposes.

Finally, it is noted that the inventive system is disclosed as a reflective system. Naturally, the use of a light transmissive active electrode made of color filtering plastic covered with an interrupted layer of metal introduces the possibility of a transmissive system. The same can be achieved by etching small holes in the metal layer on the active electrode.

It is contemplated that in addition to dedicated programming for signs, and the like, that the inventive system will be useful in the manufacture of large television screens which could be driven with standard television signals. Naturally, insofar as standard broadcast television and standard television signals are based around the light emitting red, blue and green primary colors, a microprocessor would be necessary to implement a translation algorithm between the emissive color information of a standard television signal and a reflective color signal necessary to drive the inventive system in its reflective embodiment.

Figure 34:
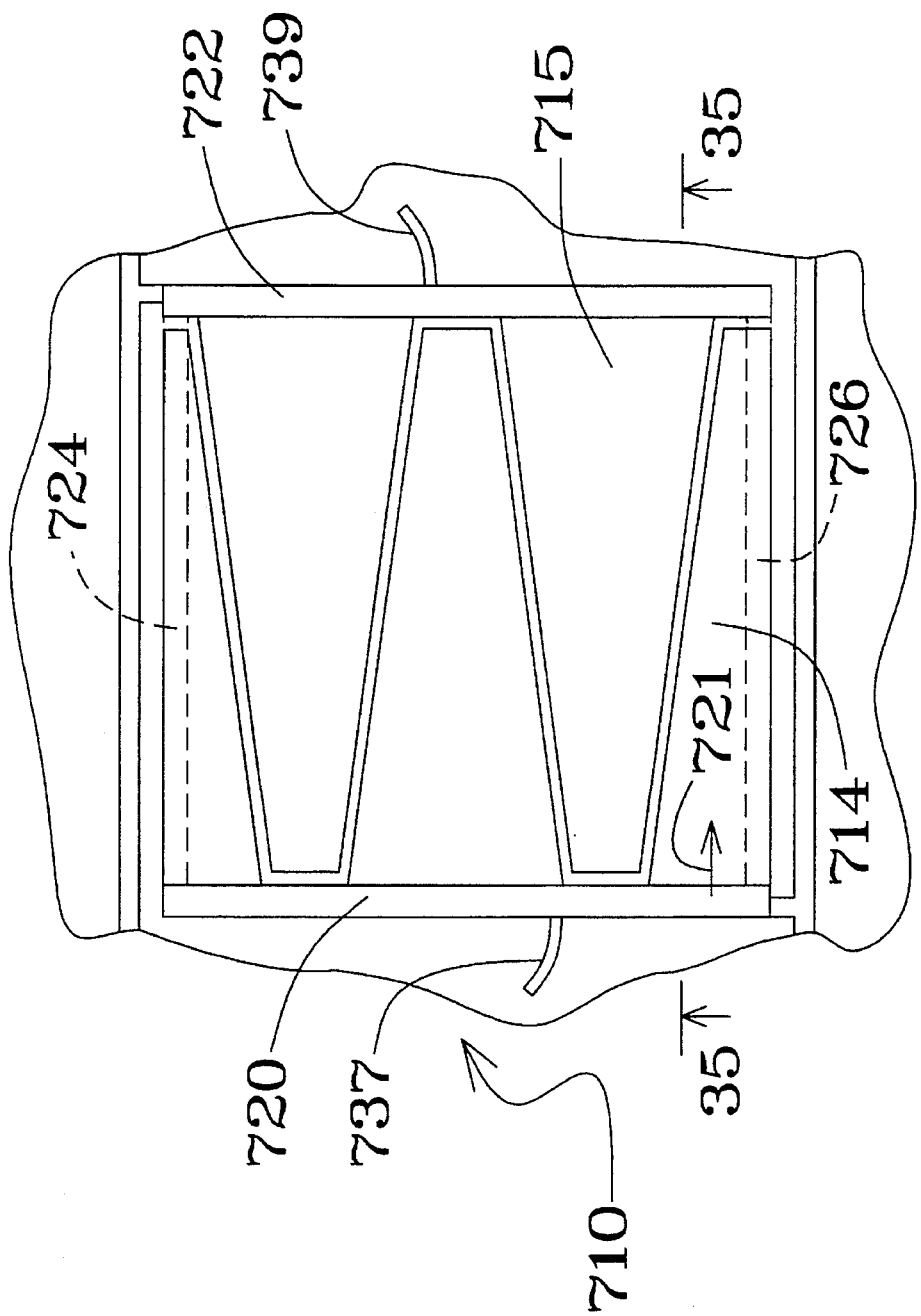
FIG. 34 is a view of a pixel constructed in accordance with the present invention and useful in an analog matrix of pixels.

Yet another alternative embodiment of a pixel 710 constructed in accordance with the present invention is illustrated in FIG. 34. Pixel 742 may be part of a large matrix or an individual discrete element or a part of a module of pixels configured to be a part of a larger display.

Figure 35:
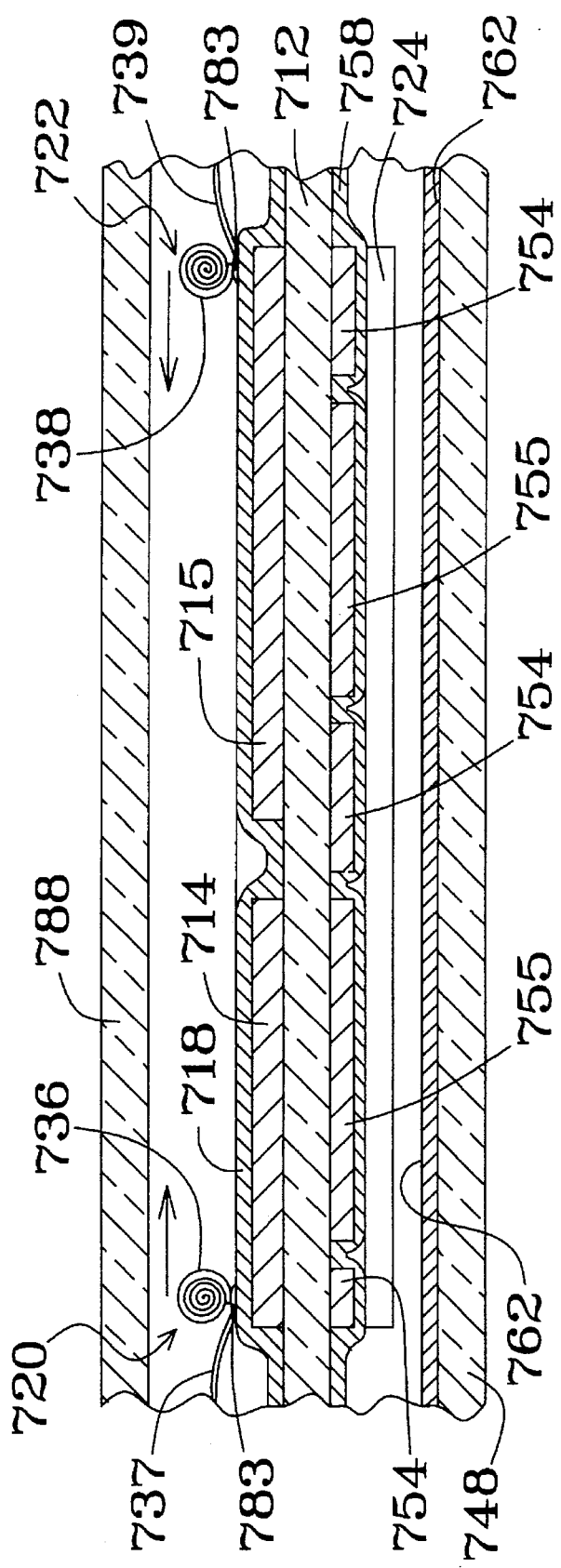
FIG. 35 is a view along lines 35—35 of FIG. 34 illustrating the construction of the inventive pixel.

Referring to FIGS. 34 and 35, pixel 710 comprises a light modulating capacitor which is built on a substrate 712. Substrate 712 is preferably made out of thin rigid transparent plastic in order to give the device rigidity, light weight, and strength while minimizing parallax between the front and back of the device. Suitable materials for substrate 712 include Plexiglass brand plastic or Mylar brand plastic transparent sheets. Fixed electrodes 714 and 715 are made of a thin layer of conductive transparent material such a indium tin oxide. A layer of transparent insulative dielectric material 718 such as poly propylene is disposed over fixed electrodes 714 and 715 to provide insulation between the fixed electrodes and the active electrodes.

Beginning with center plate 712 which is optically clear and has reasonable mechanical strength, assembly is done outwardly in either direction. A 7 mil film of mylar coated with ITO by Southwall Technologies is bonded with the mylar side to the center piece, using pressure sensitive adhesive. A non polar dielectric is bonded to the ITO layer. The rollouts are attached to the positions according to FIG. 35. The dielectric is bonded to the ITO layer first. Then the mylar side, which is not in the circuit is applied to the center panel. Most glues are highly polar and are therefore best left out of the electrical part of the circuit. The dielectric is usually applied by means of heat and pressure in order to keep polar charge out of the circuit. The boundary lines between triangles in the fixed electrodes must be etched, with no shorts between either side. Then connection structure is applied in order to apply driving voltage to the device.

Active electrodes 720 and 722 are disposed over a dielectric insulative layer 718. Electrodes 720 and 722 are made of a prestressed coil of thin plastic material which has been covered prior to stressing with a layer of metal, such as aluminum layers 736 and 738, respectively. Because the aluminum layers are on the underside of the electrodes, a conductive glue 783 may be used to adhere the electrodes to the dielectric layer 718 as well as to attach a pair of conductors 737 and 739. Thus, means for driving the active electrodes is provided by conductors 737 and 739, which are connected electrically to aluminum layers 736 and 738 by conductive glue 783.

On the reverse side of substrate 712, a second pair of electrodes are disposed with an orientation 90 degrees offset from the orientation of the active electrodes 720 and 722. Thus, one of these electrodes, namely, active electrode 724 appears as a rolled up coil in the view of FIG. 35. The electrode on the underside of the device not visible in FIG. 35 is driven by fixed electrode 754, while active electrode 724 on the underside of the device is driven by fixed electrode 755. The active electrodes on the underside of the device are insulated from their respective fixed electrodes 754 and 755 by dielectric insulative layer 758.

The plastic side of electrode 720 is, in accordance with the preferred embodiment, covered with an extremely thin layer of dye, pigment or other material mixed with a binder, resulting in the display of the pigment's color. In accordance with the preferred embodiment electrode 720 may be colored cyan.

In like fashion, electrode 722 has its plastic side colored magenta. A layer of yellow paint 762 is applied to the visible face of back housing member 748. Back housing member 748 together with transparent face plate 788 maintains the active electrodes sealed and thus safe from dust, humidity and other environmental factors.

Black and white are provided by electrodes 724 and 726. Electrode 724 may be made white by having its middle layer etched using a mild acid and coated with titanium dioxide, using a suitable binder. In similar fashion, the metal surface of active electrode 726 may be made black using graphite.

Figure 36:
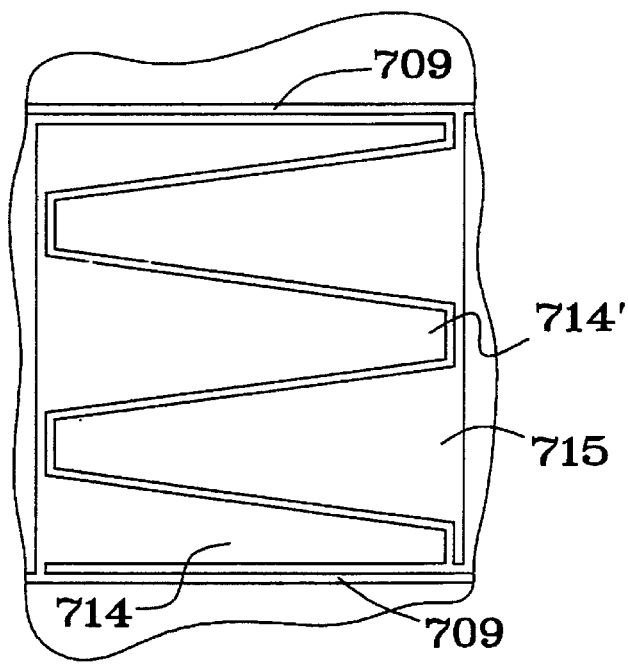
FIG. 36 is a view illustrating the configuration of the fixed electrodes and bussing conductors of the embodiment of FIGS. 34–35.

A more complete picture of the fixed electrodes 714 and 715 is provided in FIG. 36 and generally, it is noted that when electrode 720 is moving in the direction of arrow 721, initially the amount of electrode 714 facing rolled up electrode 720 is large but becomes increasingly smaller as the electrode rolls out, thus requiring greater voltage to continue the roll out procedure. This provides for analog control of the rollout. It is noted that the tip 714' of electrode 714 is flat and not pointed in order to provide enough area to keep the active electrode 720 completely unrolled without excessively high voltage which would be required if the fixed electrode came to a point. Indeed, lower peak driving voltages may be obtained by making the tips of the fixed electrodes even wider.

A line of fixed electrodes may be driven through the use of a bus bar conductor which may be made of ITO or, in larger arrays, other metal deposited in the form of a bus bar 709 as illustrated in FIG. 36.

In view of the fact that opposite fixed electrodes 714 and 715 both underlie both of the active electrodes 720 and 722, in accordance with the present invention, independent operation can be obtained by driving the electrodes associated with them at different times. In the context of a matrix display, and a standard television signal in particular, one could consider the possibility of the first field of a two field frame of a standard television signal being coupled to electrode 720 while the interlaced second field of the two field frame is coupled to electrode 722.

Figure 37:
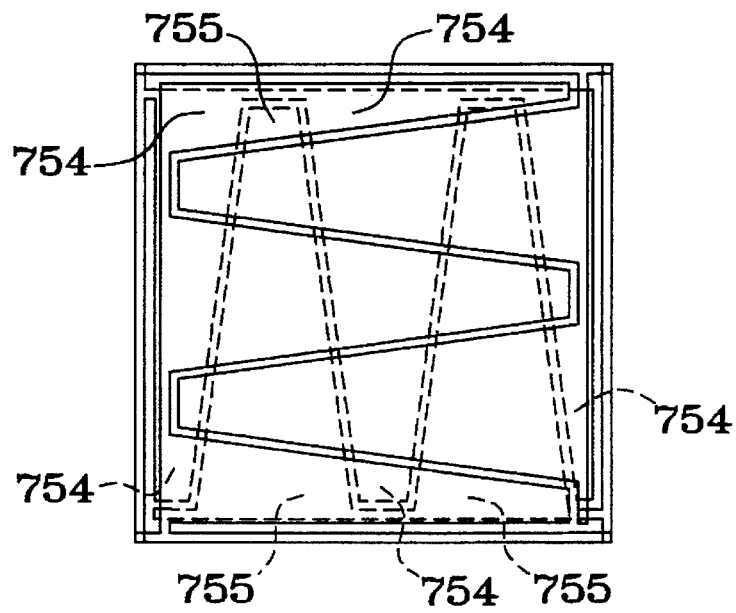
FIG. 37 is a view similar to FIG. 36 illustrating the fixed electrode and bussing conductor structure on the underside of the substrate.

Referring to FIG. 37, underside fixed electrodes 754 and 755 are illustrated in phantom lines thus showing their shape and orientation. It is noted that the underside electrode 754 and 755 are at a 90 degree angle to the two electrodes on the top in order to allow the underside active electrodes to move in orthogonal directions. In addition, it is noted that the asymmetrical configuration of the fixed electrodes is important. Because the electrodes are asymmetrical with respect to the center line of their respective active electrodes, the lateral forces on the active electrodes are balanced, thus improving the likelihood that the active electrodes will unfurl in a straight and flat fashion.

Figure 38:
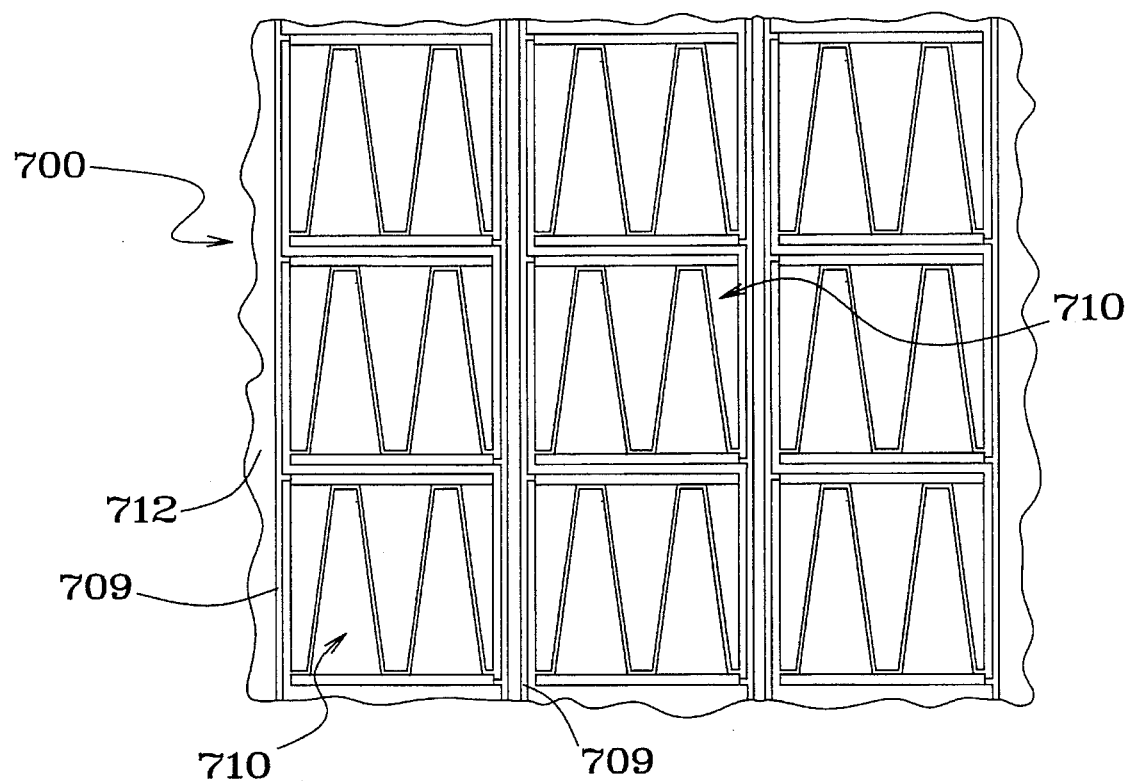
FIG. 38 is a view of a matrix of pixels constructed in accordance with the present invention and incorporating a device such as that illustrated in FIGS. 34–37.

Referring to FIG. 38, a matrix 700 of pixels 710 is illustrated. It is noted that bus conductors 709 may be used to individually address either side of any pixel on either side of substrate 712 individually.

Figure 40:
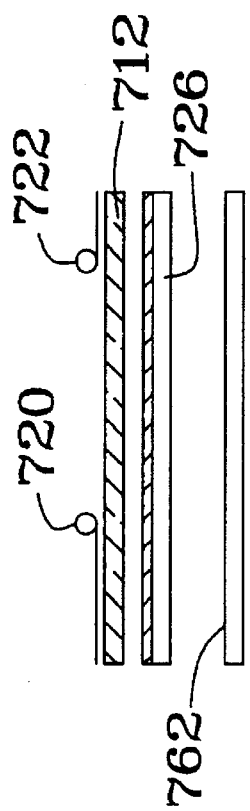
FIG. 40 is a diagrammatic view along lines 40—40 of FIG. 39.
Figure 41:
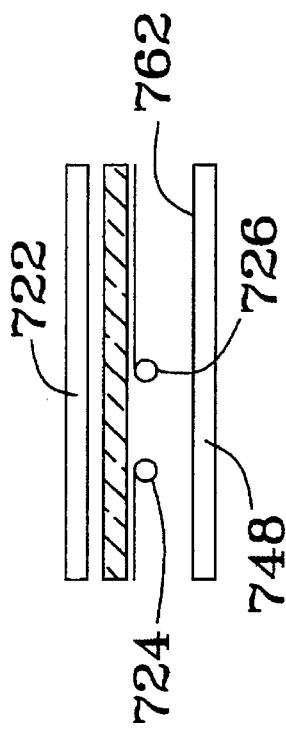
FIG. 41 is a view along lines 41—41 of FIG. 39 and diagrammatically illustrating the relationship of the various electrodes.
Figure 39:
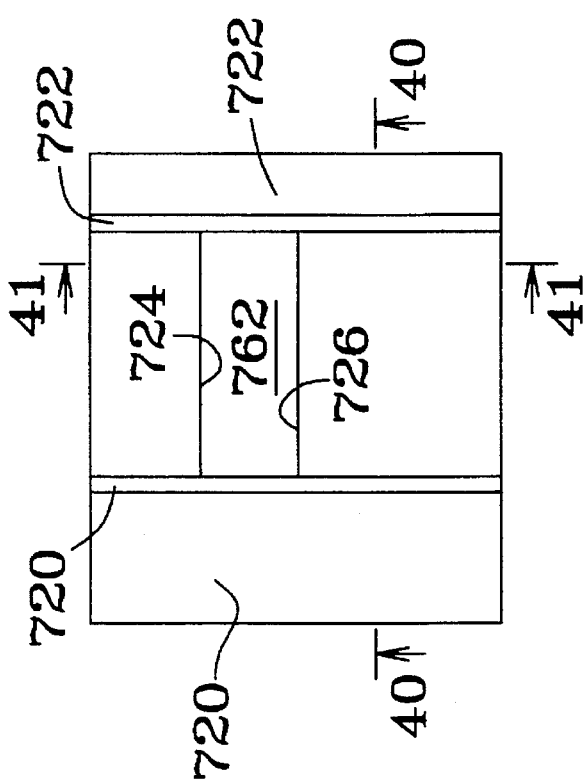
FIG. 39 illustrates the pixel of FIG. 34 with different amounts of the five color components of the pixel being presented for viewing.

The full color capability of the embodiment of FIGS. 34–38 is illustrated in FIGS. 39–41. Referring in particular to FIG. 39, active electrodes 720 and 722 are unfurled at amounts sufficient to achieve the desired amount of white and black. Electrodes 724 and 726 are also advanced to the extent necessary to present their reflective colors to the viewer. Finally, the background color is shown in the remainder amount by the colored surface 762 of backplate 748. The respective positions of the electrodes are illustrated in schematic cross-sectional form in FIGS. 40 and 41.

In the following embodiments, there is no direct correspondence between the components now referenced and the numerals used in previous embodiments, but it will be understood that the construction of individual components can be varied according to the teachings to be found herein, especially with regard to the construction of similar, but equivalent components and assemblies disclosed in other embodiments.

A Digitally Responsive Movable Electrode

FIG. 42 illustrates a fixed conductor pattern that can be used to render a movable electrode digitally responsive. A fixed electrode conductor pattern 800, for example has profile steps 802, enabling a movable electrode such as electrodes 20–26, 120–126, 320–326 etc., to advance or retract, from a spiral, rolled-up, closed configuration, in discrete increments, in response to changes in an applied potential difference. To this end, profile steps 802 have risers 804 along the direction of electrode movement so that small applied voltage changes produce a predictable magnitude of movement of the movable electrode from one step 802 to the next. This a forgiving construction enabling relatively imprecise crude analog control signals to be interpreted as fairly precise color intensity changes effected by incremental movements of a movable electrode. Provided the value of an analog control signal is close to a value that would move an electrode by a single step, i.e. close to the value for the center of the step, rather than being ambiguously close to a value bordering two steps, a discrete stepwise advance of known reflectance or other electromagnetic wave value, can be obtained.

A series of steps along the edges of a triangular or trapezoidal electrode 800 produces a christmas-tree-like pattern suitable for interdigitation with oppositely arranged such electrodes to provide a closely mosaicked pattern of light-modulating elements. The steps may be cut, stamped, scored or otherwise formed from a metallized plastic movable electrode material, but are preferably etched out of the metallized coat of a triangular or tapered electrode member.

The rectangular active movable electrodes 20–26 of the embodiment of FIG. 1, with their "on" or "off" response to applied voltages constitute a simple embodiment of a digitally responsive active movable electrode. The tapered active movable electrode is particularly well suited to control by digital, or pulsed, signals, i.e. computer control. Digital control of the proportion of the active movable electrode that is advanced becomes possible and with this control of excursion employing colored light-modulating movable active electrodes, control of color intensity by digital signals becomes possible.

The length of each riser 804 can be constant or the length may change along the conductor pattern 800, to modify the voltage response characteristics of the electrode. Increasing the length of the riser will increase the voltage required for the next incremental advance of the electrode. Accordingly, to be responsive to applied voltage pulses of equal magnitude, the riser length 104 may decrease towards the outer tip of the conductor pattern 800 corresponding with the furthest point of excursion of a movable electrode.

Those skilled in the art will also appreciate that a digital-character movement, or a discrete advance or retraction is obtained in response to a continuously variable, or analog, applied voltage, because the electrode will not move until the applied potential difference is adequate for a full step advance or retraction. Thus, an analog, electrical input is converted to a digital, optical output by means of the device shown in this embodiment.

Such stepped-edge fixed electrode control pattern 800 can be employed in any other embodiment described herein where the tapered shape can be accommodated and a digitally controllable pixel is required. It is particularly suitable for employment in triangular-, diamond-, and hexagon-shaped arrays where the triangular or tapered shape is of advantage. For example, the movable electrodes 420 in the embodiment of FIGS. 31–33 can be controlled digitally by employing a stepped "christmas-tree" conductor pattern 800 for the control electrode. Similarly, movable electrodes 720–726 of the embodiment of FIGS. 34–41 having a tapered shape can be rendered digitally controllable by employing correspondingly shaped stepped fixed conductors. In most cases, for better control of the movable electrode, its conductor layer will extend to the perimeter of the electrode. It will be appreciated that effects such as the digital control brought by stepped edge patterns depend primarily upon the conductor shape and, if desired, may be a characteristic of the conductor pattern only, while the plastic body of the electrode extends outwardly beyond the conductor pattern to some other shape. Any plastic areas overlying the conductor pattern can be coated with current-draining patches of conductor, preferably grounded through a high resistance and not contacting the main pattern, to prevent triboelectric sticking to the dielectric, if desired.

Figure 43A:
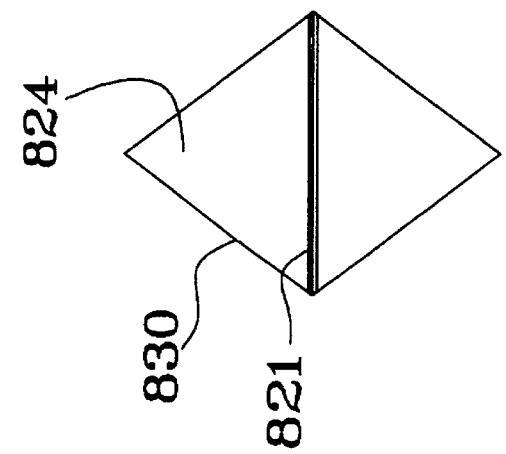
FIG. 43A is an enlarged view of a portion of the surface of the laminar sheet assembly of FIG. 43.
Figure 43:
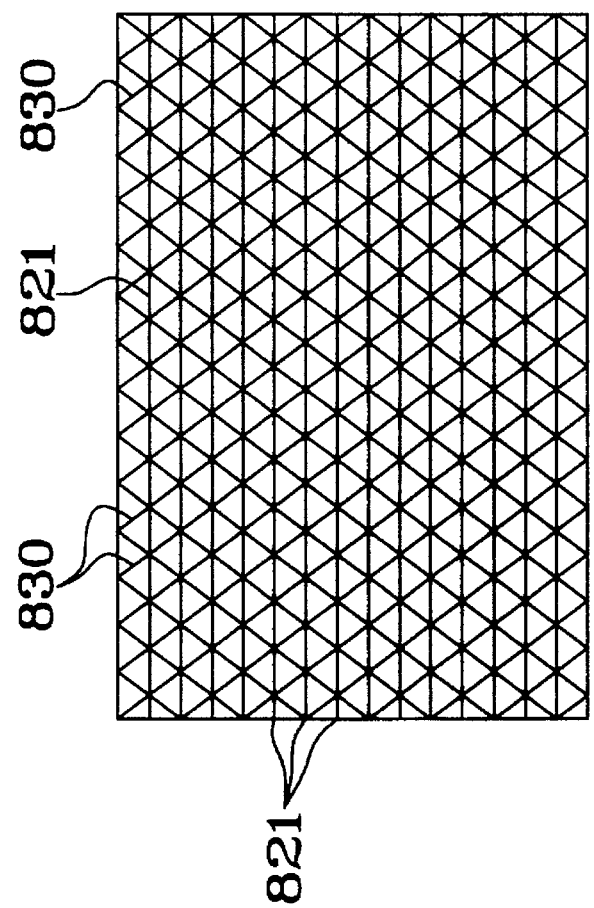
FIG. 43 is a plan view of a laminar, sheet assembly showing a stage in a method of manufacturing a display matrix of light-modulating capacitor pixels according to the invention.
Figure 44:
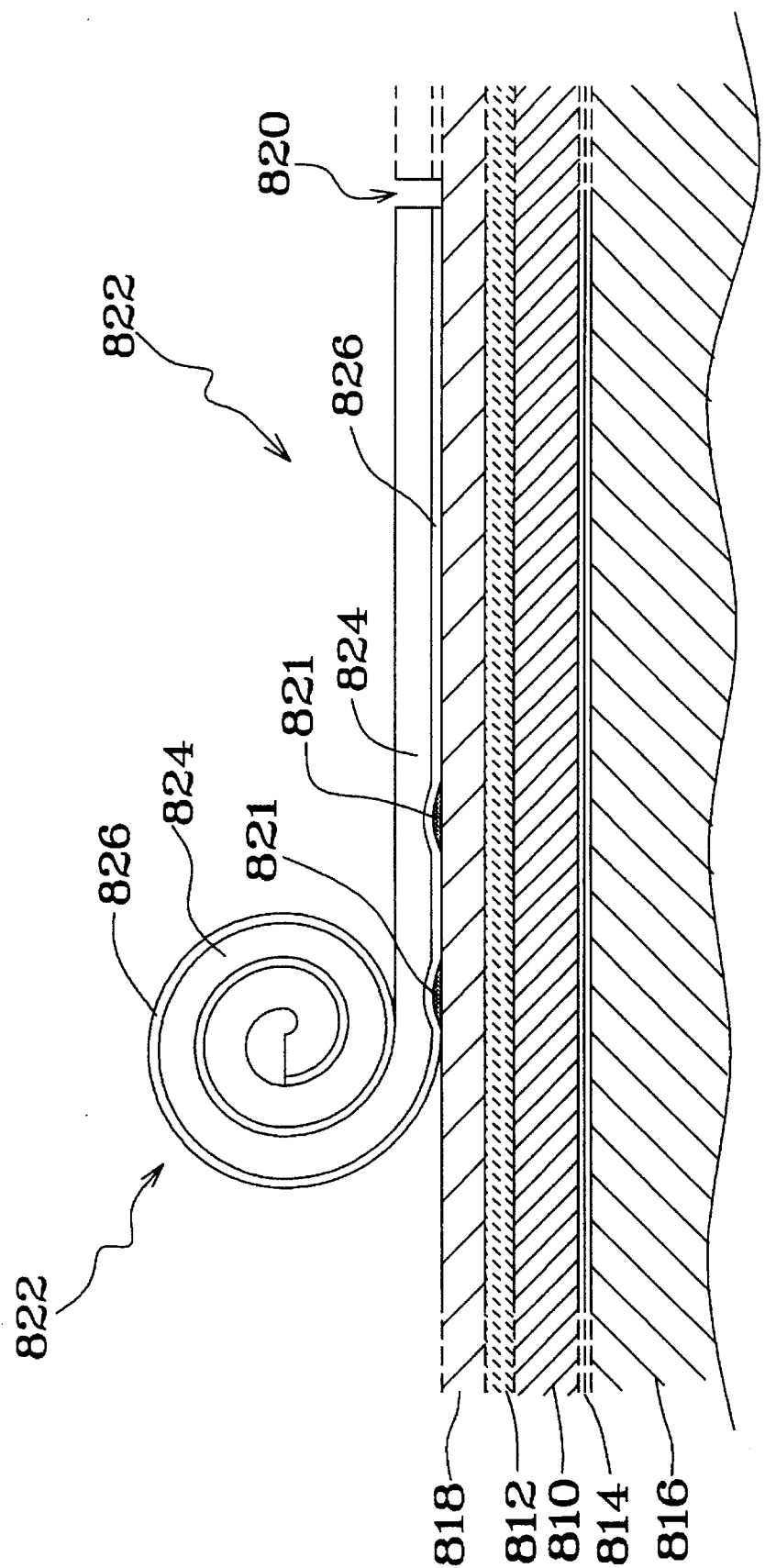
FIG. 44 is a partial sectional view of a display matrix manufactured according to the method described with reference to FIG. 43.

Theoretically, the digital-response characteristics could be obtained by stepping the edges of Manufacture of a Monochrome Display Matrix FIGS. 43, 43a and 44 illustrate some details and principles of a display matrix which can be economically produced as a monochrome display, especially for conveying information, for example as a relatively large scale "blue board" for educational and instructional use in classrooms and elsewhere. The inventive blue board can display text or images in blue on a white background or vice versa.

A preferred process for manufacturing a monochrome display matrix such as that shown in FIGS. 43, 43A and 44, employs a film of metallized plastic stamped or cut with a matrix of movable electrodes which are cut around most of their perimeter but have an open zone connecting to the sheet. The stamped or cut film is bonded to a dielectric and is heat treated to cause the plastic to shrink. The metal does not shrink, and each movable electrode portion breaks away from the sheet along the cut perimeter and curls into a tight roll or spiral.

Preferably, the process begins with a layer of thin polyester film 810 coated with an indium tin oxide transparent conductor 812 (Southwall Technologies or Courtaulds).

This process is well adapted for mass production, for example by employing continuous sheet materials drawn from rolls of stock and carried through a series of production steps by rollers, if necessary, with support from a conveyor belt, or backing sheet.

The underside of the polyester film 810 can be painted, or otherwise coated, with a desired background color, for example, with a blue coating 814, the indium tin oxide transparent conductor layer 812 being exposed upwardly, for assembly of electrical circuit components thereon. If desired, the painted polyester film 810 can be supported or mounted on a substrate 816 or can subsequently be mounted on a back board or assembled with a display housing.

A dielectric film 818 of polypropylene (or other suitable, film-forming, non-polar polymeric dielectric material) is laminated to the transparent conductor layer 812, for example, thermally adhering the polypropylene dielectric 818 to the conductor layer 812. One way of achieving this is by pressing the dielectric film 818 and the polyester film 810 together running a continuous sheet assembly between heated rollers prior to the next step. An alternative lamination method would be to use a very thin, patterned coat of a non-polar, insulative, pressure-sensitive adhesive, to constitute a part of the dielectric structure.

After thermally sealing dielectric film 818 to polyester film 810, a striated pattern of a pressure-sensitive, electrically conductive adhesive, for example DAG 109 (trademark) Acheson Colloids, is applied to the exposed, upper surface of the dielectric film 818 to provide base lines for anchoring what will become movable, coiled electrodes or "roll-outs". For the grid-like matrix shown in FIG. 43, this conductive adhesive is applied in a series of fine parallel lines 822, whose spacing is selected according to the desired pixel size. As shown in FIGS. 43–44, a single line, or track of conductive adhesive can secure the base lines of two triangular movable electrodes 824, in a diamond pattern. Other pixel shapes and matrix patterns, may employ different adhesive patterns. If desired, to improve conductivity of the adhesive phase, overlapping or sandwiching strips of a less adhesive graphitic material such as AQUADAG (trademark) Acheson Colloids.

Conductive adhesive lines 822 can be applied from solution, by any suitable production means having adequate precision, for example, one or more banded rollers equipped with doctor blades and extending across the moving laminar assembly so that each roller band applies a track of adhesive. Alternatively, jet applicators may be used, and the printing industry has such equipment which operates with some considerable precision. If necessary to control the thickness of deposition, an absorbent take-up roller can wipe off excesses. Use of a conductive adhesive provides a route for applying controllable drive voltages to the movable electrodes, in this case in pairs. Where other contact means are employed, non-conductive adhesion means can be used, for example fusing the surface of the dielectric film 818, preferably immediately before, or after applying the movable electrode material, using pressure to close the seal. Thermoplastic fusion can be effected, for example by laser or ultrasonic means.

This monochrome display matrix has been designed so that each active movable electrode has its own exclusive pixel reflectance area, so that all such pixel reflectance areas lie in a common plane, and the movable electrodes can accordingly be cut or otherwise manufactured from a single sheet of material. Other embodiments described herein, such as the full-color-capable embodiments of FIGS. 1–41, employ multiple movable electrodes along each light path, from a background to an observer, and accordingly require different means of manufacture, including the provision of multiple, movable-electrode-forming sheets or the addition of movable electrodes to pixel areas defined from a single sheet which anchors the ends of the movable electrodes to the dielectric.

Returning to the preferred, blueboard embodiment, its active movable electrodes 822 are created from a thin, or ultra-thin layer or film of metallized polyester 824, which may be drawn from a roll and is applied to the adhesive-patterned dielectric surface, pressing the metallized surface 826 on to the adhesive. The laminated assembly is warmed to drive off excess solvent and subjected to pressure to bond the adhesive. The upper, exposed polyester sheet 824 is then scored to define a multiplicity of movable electrodes 822.

Scoring can be effected in a number of ways as schematically suggested by a cutter-equipped scoring tool 828, such as shown in FIG. 45, which is designed to hold and score thin plastic sheeting without penetrating or tearing it. However, preferred production methods form non-perforating score lines by ablation with an excimer or ultraviolet laser, or equivalent means.

Scoring tool 828 comprises a circular blade 830 clamped between two hardened, polished rollers 832. As the scoring tool rolls across the polyester film 824, it is controlled to cut a precise, straight separation groove that penetrates into the polypropylene dielectric closely to one half its thickness, one half a mil for a one mil dielectric. FIG. 45 is accordingly quite schematic in its representation of circular blade 830 which projects only a very small distance beyond the periphery of rollers 832, perhaps half a mil from a one inch diameter roller.

This procedure is effected to generate a grid of intersecting, diagonal score lines 830 as shown in FIG. 43, either by repetition or by ganging multiple scoring devices. Alternatively, a full-width scoring roller extending across the laminate, may be equipped with multiple circular or helical knives, one for each diagonal that score by impression, or with some drag generated by a speed differential between the full-width scoring roller and the moving laminate. Accurate control of the spacing between score lines is necessary and may be effected, in the case of a scoring device that traverses the laminate from line to line, by any suitable means known to the machine tool arts, for example, screw indexing, motorized stepping, and the like. The results can also be effectively duplicated with laser means.

As shown more clearly in FIG. 43a, the diagonal score lines 830 define triangles with the conductive adhesive lines 821, which triangles will constitute the movable electrodes 822, and will substantially define individual pixel areas, one to each electrode 822, after the next process step has been completed. The size of movable electrodes 824 is accordingly defined by the spacing between adhesive lines 821 and score lines 830. For very small electrodes (of the order of 0.01–0.1 inches), more exotic scoring methods may be necessary, employing for example, laser beam patterns.

The triangular movable electrodes which constitute an outer visible surface of the display matrix are tightly packed with very small gaps 820 between adjacent triangles across the score lines 830. For example, quarter-inch triangles (referring to the shorter side) can be packed to a spacing, defined by the cut or scoring 830, which may be as low as one mil (0.001 inch).

The scored laminate is then heated in an oven to about 100° C. for polyester, causing the scored triangular areas of the metallized polyester film 810 to separate and curl into tightly rolled movable electrodes 824 which electrodes 824 are securely anchored to the dielectric by the now-cured adhesive lines 821. The oven's heat causes the polymer to shrink. The metal, however, does not shrink. Therefore, each pixel quickly makes a very tight spiral. As an alternative to oven heat, curing could be triggered by ultraviolet radiation, other heat-generating means or a chemical additive or the like.

Electrical connections to an electronic drive system are made, and the light-modulating capacitor array, or display matrix is completed with a housing including a front glass, microprocessor systems, external electrical connections and data ports, as desired.

In situ Electrode Material Thinning

Low operating voltages are desirable, for example in the range of from 1–20 volts, and a particularly attractive capability would be the ability to provide a pixel matrix that could be operated at about 3.5 volts, which is an emerging standard operating voltage for personal computer systems. Such low-voltage operation generates modest electrostatic forces and requires extremely sensitive movable electrodes which, in turn, should have a very low inertia, which is theoretically attainable with thinner, lighter, more flexible movable electrodes formed of thinner plastic. Such electrodes will be described in more detail hereinbelow. While extremely thin, sub-micron, plastic sheeting is available, it is also difficult to handle, especially in production processes such as those described herein.

A solution to this problem of the difficulty of working with such thin sheeting, is to reduce the thickness of the electrode plastic as an intermediate step in the pixel manufacturing process described herein. The intermediate thinning step can be effected after assembling the thin sheet material to a more substantial substrate, such for example as the dielectric film 818, preferably prior to scoring, stamping or otherwise processing the plastic sheet for the development of spirally rolled electrodes.

Thickness reduction of the electrode plastic backer material, such as the polyester film 818, is preferably effected by a laser ablation process, equivalent to mechanical planing, in which the film is selectively ablated, which is to say material is removed, to a desired thickness, for example, from 2.5 microns to 1.0 or 1.25 micron, or from 1.0 to 0.5 micron thickness, by advancing it past a precisely indexed laser cutting beam, especially, for example, by wiping the plastic surface with a broad focus excimer laser beam. Thinned polymer sheets can be produced with a high quality, flat, smooth and uniform surface and with a clean edge. Thus the material is handled while it is relatively thick and easy to handle and thinned while in place, partially assembled.

Coiled movable electrodes produced from thinned material are expected to curl tightly, and compactly, minimizing dead areas of a matrixed video display, and to be drivable by relatively low voltages.

Scoring, or cutting of the electrode outlines in the polyester film 824 can also be effected by non-mechanical or laser means, if desired.

Alternative thinning techniques such as vapor etching, or mechanical ablation methods employing heat, may be known to those skilled in the art. However an advantage of laser ablation is that, in keeping with the other process steps it is a dry process suitable for clean room manufacturing, under dust-free, preferably sterile conditions conducive to high standards of quality control. Ion etching is another sheet thickness-reduction technique that can meet these desirable requirements.

If desired, a colored coating can be added to the polyester sheet after thinning, by ink-jet, roller or other suitable means. Alternatively, dyed polyester film may be used, though such a dyed material will reflect color with less intensity an inked or coated material.

An attractive manufacturing advantage is the ability to hold the metallized film sheet in place in an assembly by what might be called an electrostatic clutch, that is to say by applying a suitable potential difference between the metallization and the transparent conductor 812, to generate an electrostatic positioning force while a manufacturing step such as scoring, thinning or curing is carried out.

A display matrix according to this embodiment can provide a large panel for class room or instructional use, for example, from one to eight feet across, of precise markings changeable on electronic command. Depending upon pixel size, this display matrix can be of video quality comparable with a conventional computer screen, when viewed at the intended distance.

One preferred embodiment of the just-described monochrome display matrix is computer-driven, to portray computer generated images, especially to remote display personal computer video output in real time. Alternative drives permit display of television or cassette-recorded video images.

Some exemplary dimensions are, for the movable electrode triangles, approximately 0.25×0.25×0.353 inch. Paired right triangles make quarter-inch squares. Adhesive lines 821 then require a spacing of about 0.177 inches. When electrostatically extended, the triangular movable electrodes 824 fit together very precisely, with excellent area coverage, having separation slits or imperfections of only about 0.001 inch. That is probably a little smaller than a healthy human eye could detect from a distance of about ten inches. Such a display could be expected to provide close to super VGA quality in a size about twenty feet wide (960 pixels) usable in theaters, stadia or auditoria.

Application of the just-described manufacturing process to three- and four-, or full-color embodiments requires the addition of light-modulating elements to each pixel, for example, each should be equipped with one or more additional movable electrodes, according to the teachings disclosed herein. The array can then be driven and controlled by suitable circuitry, for example diode decoding or active matrix, to display images generated from any suitable electronic source, including computers, television signals, and the like.

Techniques of scoring the plastic surface of a metallized plastic sheet, to manufacture active electrodes therefrom, can be extended to give the electrode itself structural features by contouring its surface, especially by exploiting the precise controllability and material ablating properties offered by excimer lasers. Such laser means are well adapted to provide closely spaced grooves across the polymer surface that can simulate thinning and facilitate low voltage curl. Furthermore, the grooves can be cut to an accurate depth. It is important that the thickness of the polymer in the bottom of a groove be accurate and reproducible. Multiple small cuts are more feasible than laser planing or machining a broad area.

Figure 44A:
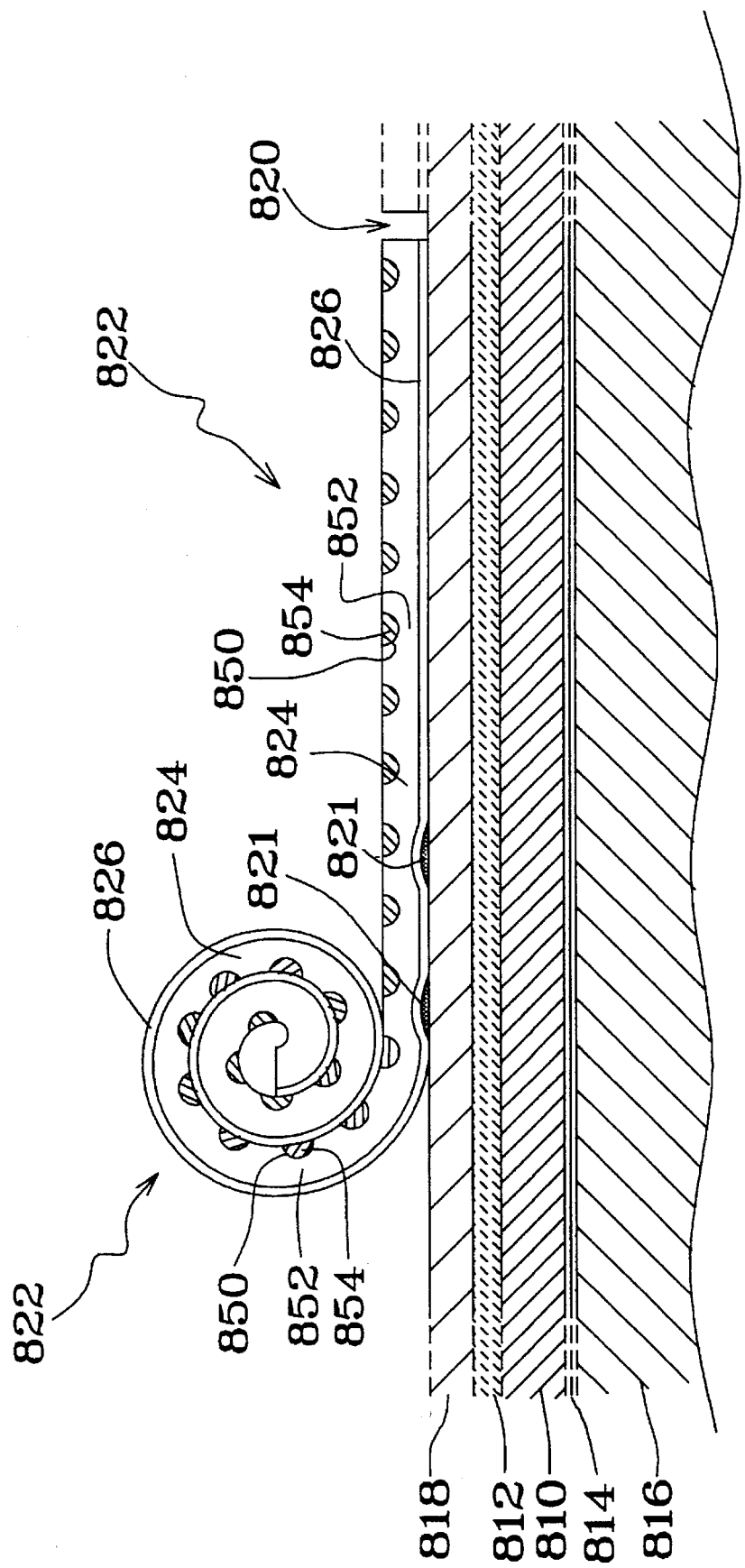
FIG. 44A is a view similar to FIG. 44 of a modified electrode construction.

A useful such contoured structure is to provide a series of parallel grooves across the sheet, in a direction perpendicular to, or nearly perpendicular to the intended direction of retraction of the formed active movable electrode, for example, grooves 850 shown in FIG. 44A.

The corrugations afforded by a series of grooves 850 extending across a metallized polyester (or other conductor-coated, or conductive plastic) film 824 provide the dual advantages of creating miniature hinges 852 assisting curling or rolling of the film 824 and of providing holding structures for colorant material 854. With small-scale structures, and employing thin layers of colorants, for example, inks, dyes or pigments, difficulties can be encountered in adhering a uniform colorant layer to the exposed plastic film surface. Grooves 850 are helpful in providing anchorage structures, and an enlarged surface area, to help retain and make a colorant layer more uniform, as viewed on a macroscopic scale, and in the idealized conception shown in FIG. 44A, can hold closely adjacent stripes of colorant that will have a continuous appearance at the desired viewing distance. Viewed close up, a grooved colorant-filled film will have the appearance of a corduroy fabric. Of course, in practice the colorant material 854 would not be likely to stay neatly within the grooves 852, but would also overlie the plastic film 824 between the grooves 852.

Color Selection

Those knowledgeable about color science will appreciate that whereas in my parent application Ser. No. 07/887,714 certain color selections for individual pixel components, including particularly an observer-facing surface of each movable electrode, that other color combinations can be used, depending upon the desired effect. They will also know that there are subtleties of color mixing according to which the visual appearance of a mixture may vary depending upon the particular physical arrangement of its components.

While there are similarities and useful parallels to be drawn between the full-color arrays of light-modulating capacitors described herein and the techniques of process color printing, there are also differences. Thus, where the colored surface of a light-modulating movable electrode incorporated in a pixel is opaque, then the color mixing phenomenon between that electrode and its surrounding color areas is additive, rather than subtractive. Because they are side-by-side reflective elements, small elements of balanced yellow and blue, intermixed in, for example, a mosaic-like array will, from a distance sufficient to mix the colors, create a visual impression of white or gray-white, not green. For this reason, a more appealing full-color range may be obtained by using the additive primary chromatic colors red, green and blue, as alternatives to cyan, magenta and yellow in the embodiments described herein.

A Primary-color Triangular Pixel

The embodiment of FIG. 46 shows another triangulated arrangement of movable electrodes on a reflective light path to an observer employing transparent elements in front of a reflective background, according to the inventive principles disclosed herein. The embodiment shown provides a full range primary color pixel capable of displaying all tints and shades of each of three primary colors that lie within the gamut of the reflective materials employed. A multiplicity of similar pixels can be assembled in arrays that, within the constraints of using opaque, non-overlapping image materials, will display full-range, full-color images. The equilaterally triangular pixels shown are assemblable into a hex pattern.

Referring to FIG. 46, a full-range primary color pixel comprises three chromatically colored movable electrodes of the coiled, metallized plastic type described herein, 840, 842 and 844, colored, on their plastic surfaces, red, green and blue, respectively. Movable electrodes 840 and 844 are fully coiled, or furled, in their "relaxed" states, while green electrode 842 is substantially, though not fully, extended electrostatically, by an applied voltage. These three electrodes 840–844 are on the observer side of the display matrix and share the pixel area on a selective basis, one or the other electrodes 840–844 being fully or partially extended at any one time.

In accordance with the inventive teachings of the double movable-electrode layer embodiments of FIGS. 4–25, one or more achromatically pigmented elements 846 is disposed on the underside of the pixel remote from the observer, modestly unfurled to reveal a corner of a background 848 in the window left by incomplete extension of the green electrode 842. Preferably, achromatically colored electrode 846 is black and the background is white, although these pigmentations can be reversed.

Varying the degree of opening of green electrode 842 by control of the respective electrostatic drive voltage, will vary the intensity or saturation of its hue. Adjusting the opening of black electrode 846 will vary the balance between white and black. This varies the tinting and shading of the hue displayed on the observer side of the pixel, when the compound pixel, or a group of pixels is viewed at a distance great enough to suppress perception of the individual pixel elements. The color of the pixel shown in FIG. 46 will be a strong, somewhat grayish green. Areas of strong primary colors can be displayed by activating a number of pixels to the same color. Blended colors such as orange and magenta, and also yellow, can be produced by additive combinations of adjacent pixels.

An Electromechanically Tunable Antenna

Figure 47:
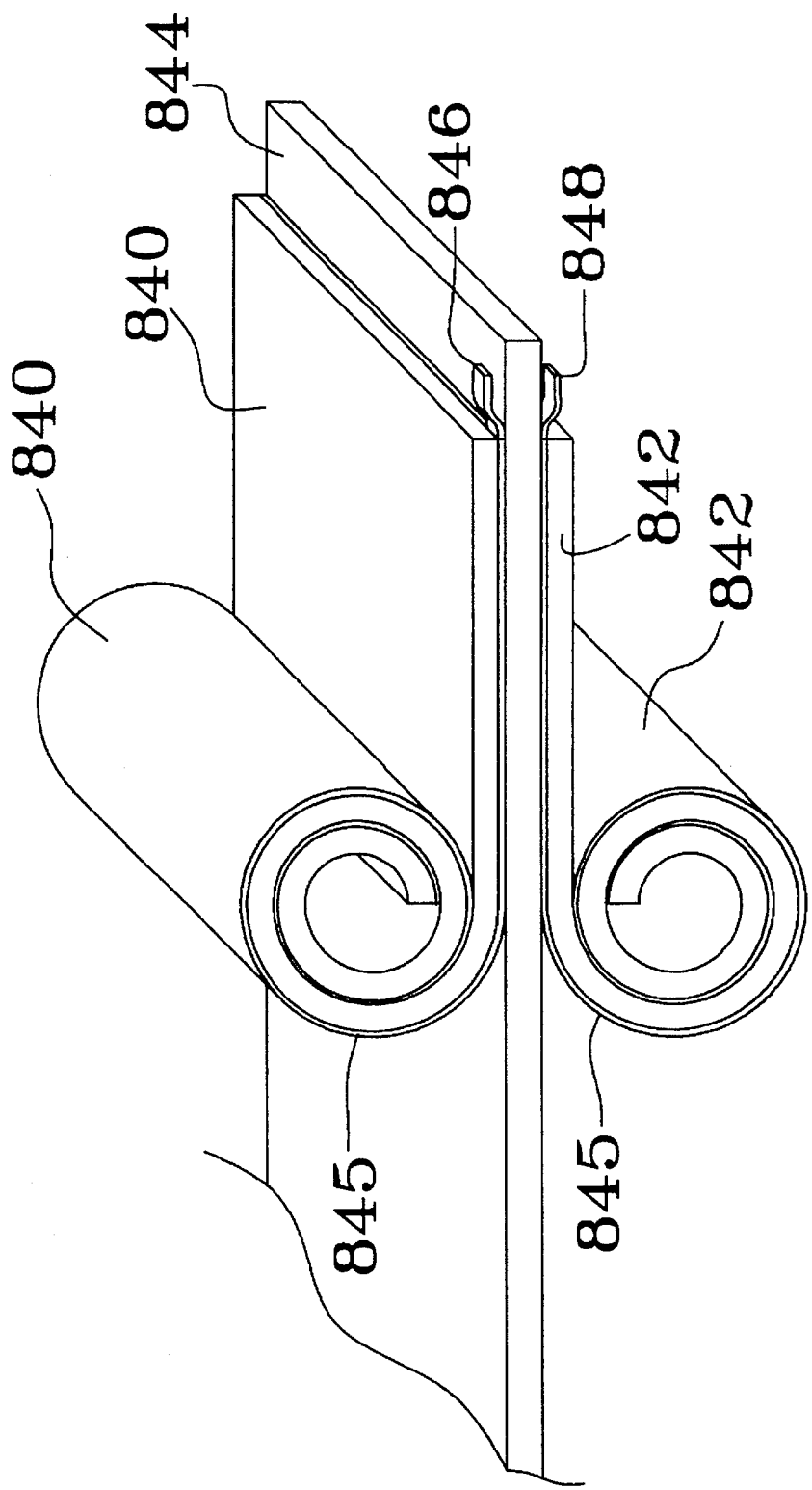
FIG. 47 is a schematic perspective view of a capacitative cell for an electromechanically tunable antenna embodiment of the invention.

The embodiment of FIG. 47 shows a novel form of construction useful as a tunable antenna, in which an antenna cell comprises twin movable electrodes traveling across opposite faces of a dielectric. Typically the electrodes unroll or unfurl from spirals or coils, although other mechanical configurations are possible. As the electrodes advance, in tandem, they create an increasing, effective antenna-area permitting tuning of the antenna.

Such a structure lends itself to diverse applications, for example, because the spiral movable electrode is a capacitive device, it may be used to tune any sort of resonant circuit and can usefully function as a remote micro-robotic tuner.

The extent of excursion of the movable electrode can be precisely controlled by a linear or digital signal without interfering with the main frequency of the circuit to be tuned.

A matrix antenna constructed of such cells can change its electrical antenna area, being shortened or lengthened electrically, without changing its physical dimensions. It can be tuned, lengthened or made directional by controlling the excursion of the movable electrodes. A large matrix of such twin movable electrode cells distributed over an extended, flat surface can readily be assembled. By controlling the extended area of each movable electrode, the overall capacitance of the matrix can be controlled.

For example, in space applications, a large antenna may be fielded by electrostatically unfurling very large electrode spirals one of which includes a dielectric layer, or is positioned to present a plastic film to a metallized surface of the other unfurling electrode.

Thus, in outer space, free from wind, water, and corrosive dirt, a large area antenna can be constructed which has an antenna surface in the form of a large spiral, working in tandem with another large spiral, such that the two, on command, roll out flat presenting a relatively large active antenna area for the mass of antenna material. Such an antenna has potential application for satellite-based signal transmission, reception and relaying or reflecting. Tunable space antennae with microrobotic control and, optionally, with built-in winding mechanisms, to expand and contract in outer space can provide antennae with very large ratios of area to mass.

Referring to FIG. 43 the tunable antenna shown comprises an upper movable electrode 840, a similar, lower movable electrode 842 and a dielectric member 844, both electrodes are preferably elongated rectangular elements formed of pre-stressed metallized plastic such as polyester, as described herein, and in a relaxed state, are coiled into spirals, analogously to the coiled electrodes 20–26 shown in FIGS. 1–4. Metallized layers 845 face the dielectric member 844 for contact therewith in an air-occluding, capacitative fashion. Contacts 846, 848 are provided to apply a potential difference between the movable electrodes 840 and 842.

A preferred plastic film material for the movable electrodes 840–842, is MYLAR (trademark) with a thickness of about 10 gauge, 2.5 micron, metallized with evaporated aluminum in a layer thick enough to measure at no more than 20 ohms per square and preferably, 10 ohms per square, which is equivalent to about 300 Angstrom thickness.

A preferred dielectric material for the dielectric member 844 is a non-polar polymer or copolymer such as a polyolefin, preferably polypropylene. An alternative dielectric polymer is TEFLON (trademark). The thickness of the dielectric may vary within wide limits, for example from 0.1 to 10 mil (2.5 to 250 microns), depending upon the desired mechanical and electrical characteristics of the antennna.

The movable electrodes 840–842 are mechanically and electrically attached to the dielectric member 844, for example by conductive adhesive (not shown). Such attachment, together with connections into an electrical drive circuit, is preferably effected prior to curling the movable electrodes in an oven. Also, with regard to the manufacture of this simple antenna element which, though simple, can be assembled into a sophisticated array antenna, any of the methods described herein that will produce the described antenna element construction may be used.

In particular the continuous production method described with reference to FIGS. 43–44 is largely appropriate insofar as it relates to the manufacture of coiled electrodes adhered to a dielectric member. In particular, an antenna matrix can be made from a multiplicity of closely adjacent movable electrodes cut in a grid-like manner, for example by scoring and heating, from a single, preferably continuous sheet for the electrodes on each side of the dielectric member 844. The necessary second layer of movable electrodes can be added by applying a second pattern of conductive adhesive lines such as 821 to the underside of a dielectric sheet and scoring electrode outlines on that second side prior to oven curing. Handling of the resultant antenna element array as the electrodes curl in the oven can be done by any means which does not interfere with such curling, for example rollers or spider wheels which grip the dielectric exposed beneath the curled up movable electrodes.

Surprisingly, I have found that by applying an appropriate potential difference, electrodes 840 and 842 will advance in tandem across the dielectric creating a trailing, laminate, capacitative portion that can function as an antennna. The effective electrical area of this antenna is defined by the unoccluded areas of contact between the electrodes 840–842 and the dielectric member 844. The attractive force that unrolls the coiled movable electrodes 840–842 is generated between the coils or spirals, with the dielectric member 844 transmitting the force from one unrolling spiral to the other.

As taught in my prior U.S. Pat. No. 3,989,357, the displacement of a coiled movable capacitor electrode can be related to, and controlled by, the applied voltage in a number of ways, depending upon the geometry and stress characteristics of the electrode.

As disclosed herein, the applied electromechanical driving or control voltage that positions the movable electrodes can be A.C. or D.C. in nature, and relatively stable or constant, with modulations to the applied voltage being made only when it is desired to change the antenna characteristics by repositioning one or more movable electrodes. In contrast, the antenna's working signal, whether transmitted or received, will be a fluctuating signal, probably alternating current, usually with a substantial frequency.

Whether the applied voltage, AC or DC moves the rollout electrode or not depends on the time constant of the electrode's movement cycle and the frequency of the applied voltage. The rollout electrodes are typically limited in velocity to operate in a range of from one to 100 milliseconds, depending on size, voltage, and other parameters. Voltage and current applied too slowly will have little effect in moving the electrode and creating an optical or other desired effect. An antenna can be tuned by DC, to be actuated to a predetermined excursion distance, and this tuning voltage will not affect its use as an antenna; but the frequency of most RF waves is so high that the period is too small appreciably to move the electrode. Also the order of magnitude of RF waves is too microscopic, to affect the mechanical properties of the tunable antennae described herein.

If desired, especially to facilitate control of the extension of the antenna, the movable electrodes can have shapes other than rectangular, for example, tapered or triangular, and may be stepped for digital control, as described with reference to FIG. 42. Using the production methods described herein, or other methods that may be known or developed, a large matrix antenna having rectangular or triangular electrodes can be produced in any shape suitable for an antennna.

Such a large matrix antenna can be controlled by means of suitable electronic signals to keep open or closed any portion of the matrix pattern. This novel construction provides new capabilities and flexibility in the design and manufacture of commercially useful antennae.

An alternative twin, movable-electrode, antenna-matrix element construction dispenses with the need for the dielectric to be a physically distinct element. Instead, the dielectric is incorporated in one of the coiled electrodes, which is manufactured for the purpose to be coiled in a reverse manner from that shown in FIG. 47 so that its metallized surface 845 is concave and innermost within the coil, and its plastic surface is convex and outwardly exposed for rolling engagement with the outermost metallized layer 845 of an opposing movable electrode 840. Such coiled electrodes would have to be manufactured by different methods from those described herein, for example, by mechanical rolling a metallized plastic and then tempering the stressed roll. If necessary, the plastic could be metallized after tempering.

Miniaturized Active Movable Electrode, Capacitative Pixel Construction

In my U.S. Pat. No. 3,989,357, I suggested (column 4, lines 37–45) that a coiled movable electrode could be formed from a metallized plastic, for example metallized MYLAR (trademark), with a thickness of from 0.0001 to 0.0005 inch, which is about 2.5 to 12.7 micron, one inch being $2.54 \times 10^4$ microns. Larger thicknesses up to 0.005 inch, 127 microns, were suggested for large or high voltage devices. A preferred embodiment (column 5, lines 3–10) employed a MYLAR plastic sheet with a thickness of about 0.0003 inch, about 7.6 micron, on which a 2,000 Angstrom (0.2 micron) layer of aluminum was deposited. This material was used to make a coiled electrode in excess of one inch long by wrapping it around a mandrel one quarter inch in diameter.

However, MYLAR® polyester is considered too polar to be an effective dielectric for the purposes of the present invention, tending to hang in one or another polarity, whereupon dielectric absorption slows down the pixel movement causing the display to hang.

A low cost, flat-screen, fast-response video display is a commercially very desirable objective. One of the many demanding characteristics such a video display should have, is a relatively low pixel control voltage.

Clearly the voltage required to move an active electrode, in a light-modulating capacitor pixel, will relate to the size of the pixel and of the electrode moved across the pixel. No specific guidelines were given in my U.S. Pat. No. 3,989,357 for preferring one thickness or another, beyond a general suggestion that a thicker insulation layer is desirable for higher voltage devices, MYLAR plastic film being used in a number of preferred embodiments as the dielectric member of the various disclosed light-modulating capacitors. Since the movable electrode itself provided the dielectric in embodiments such as that of FIG. 1, the electrode film thickness was relevant in determining the magnitude of the capacitative attraction force developed by a particular applied voltage.

In embodiments of the present invention where the movable electrode presents a metallized surface to a dielectric member, it is the thickness of that dielectric member, not the thickness of the movable electrode film, that determines the capacitative attractive force developed by a particular applied voltage. In such embodiments the plastic film serves as a carrier for the thin, non-self-supporting film of conductive metallization which constitutes the electrically active element of the electrode. It does not serve as a dielectric.

Thus, the operating voltage can be optimized to a low value, in one respect, by use of a thin dielectric member. Some limitations to the thinness of the dielectric member are constituted by the need to maintain dielectric strength while reducing film thickness. The need to provide structural support is another factor, especially as the preferred conductive portions of the electrodes are not self-supporting structures, but are coatings of materials such as vapor-deposited metal or indium tin oxide or other thin film transparent conductor.

The market for a low-cost, low-power, durable, substantially flat, video display with sufficient speed and definition to display television and computer video competitively with traditional bulky cathode-ray-tube, phosphor-emitting screens, is vast.

The matrixed, light-modulating capacitor, video displays described herein offer many key advantages and, in particular have an extremely low cost as compared with liquid crystal, light-emitting diode, gas plasma or other known forms of flat video display. However, there is nothing in the art to suggest that such displays could be adequately miniaturized to be competitive with phosphor or other light-emitting displays.

Conceptually, there is great difficulty for those skilled in the art of video displays, who are well versed in electronics, to envisage a successful electronically driven pixel system based upon a scaled-down, mechanically active, light-modulating element. Mechanical movement implies inertia, slow response times, significant power consumption and significant wear of moving parts. Furthermore, while micro-engineering of electronic components is a familiar and well-developed art, micro-engineered mechanical products are not familiar, or easily conceived items to specialists in most disciplines. For these reasons, practical limits to the scaling down of the size of electrostatically driven, active movable electrode, capacitative pixel displays, appear to be expressible in fractions of an inch or, perhaps, millimeters. Such sizes can provide excellent definition large displays, several feet across, but are not suitable for conventional computer and television displays, especially small-screen, portable displays.

Surprisingly, I have found that miniaturization of preferred embodiments of the active movable electrode, capacitative pixel displays described herein is not only possible, but that by means of an inventive construction of pixel, unexpected benefits are obtainable.

As will be described in general terms with reference to FIG. 44a, I have discovered that a very small pixel constructed with an ultra-thin, coiled movable electrode can function with surprising precision and speed and is susceptible to low-voltage operation.

While thicknesses as low as 2.5 micron, for movable electrodes such as referenced 822 in FIG. 44A, are envisaged for the foregoing embodiments, the surprising benefits of an ultra-thin movable electrode become attainable at thicknesses around 2.0 micron and preferably, below 2.0 micron, for example around 1 micron, or in the range of from about 1.5 to 0.5 micron. It is notable that such thin sheets of metallized polyester are commercially available. Subject to the ability to overcome manufacturing problems, even thinner sheets of metallized flexible insulator material may be used as they become commercially available.

Such ultra-thin movable electrodes are surprisingly sensitive and responsive to fluctuations in applied control voltages, even more so than their low mass would suggest. This sensitivity is of great value in permitting graduated operation, or partial opening, of small pixels, and of enabling their control by relatively low voltage control signals.

While the scope of the invention is not bound by, or dependent upon, any particular theory, mathematical considerations suggest that, in such a thin coiled element, the rigidity of the film or tape becomes substantially insignificant, leading to a reduction in the unfurling force needed to extend the movable electrode which is dramatically disproportionate to the reduction in mass.

The rigidity of the film, if considered as a simple beam, is proportional to the third power of the thickness, and consequently declines very rapidly for very small thicknesses. Countering this effect, the curling stresses induced in curing, which must be overcome to extend the electrode, are inversely proportional to the radius of the coil. Since the average radius of the turns of a tightly wrapped coil will be proportional to the film thickness, it follows that the curling stresses will, on average along the electrode, be inversely proportional to the film thickness. It follows that the net electrode-extending force can be expected to diminish in accordance with the square of its thickness, dramatically diminishing the net force required to extend a thin electrode.

The electrostatic attractive force generated by a movable electrode drive potential is proportional to the square of the voltage and inversely proportional to the square root of the dielectric thickness. Since the electrode-extending force will be at least equalled by the electrostatic attractive force and since the mechanical force varies with the square of the electrode film thickness, while the electrostatic force varies with the square of the applied voltage, it follows that there is, subject to the assumptions and approximations mentioned, a linear relationship between the film thickness and the applied voltage. Halving the film thickness will halve the voltage needed to extend the electrode. This however is an oversimplified theoretical model and while it is helpful in suggesting the value of reduced film thickness, in practice electrostatic effects become a controlling factor as the geometry gets smaller.

Another surprising characteristic of the metallized plastic coiled electrodes described herein is the large number of turns which can be accommodated in a tightly wound coil or spiral. More than just a few turns are achievable, with tens of complete turns and forty or fifty or more being possible. This capability is important in optimizing the ratio of active to passive pixel area, as determined by the ratio of the area occluded by the movable electrode to the area required to accommodate the retracted electrode and its drive circuitry, which will usually be masked at an edge of the pixel.

Such inventive, miniaturized pixels have great potential application in enabling economical, active, flat video screens for television, tape viewing, computer screens and the like can also find application in novel devices for example a small, handheld picture communicator. Fabricated as matrices with as many as a million or several million pixels capable of opening and closing faster than the naked eye can detect, out of low-cost materials, the invention provides high-quality, high-definition video display screens. Ultra-thin film metallized plastic movable elements have very fast time constants, which, if desired, can be capacitatively controlled to have extinguishing rates comparable with conventional phosphors.

Equipped with a shaft supporting a gear, a miniaturized movable electrode as described herein, can be incorporated as a drive mechanism for micromechanical engineering of systems such as stepping motors, geared servo devices, and the like. See, for example, G. Stix "Micron Machinations" Scientific American, November 1992, pages 106–117, especially the text on pages 112–117 relating to the work of K. Gabriel.

In summary, the movable electrode capacitative pixels disclosed herein lie at the core of a flexible and powerful image display technology ranging from one mil pixels to one foot pixels, from reflective to transmissive light displays, having very low power consumption, a high dynamic range, light weight, high contrast, and brilliant colors, as well as excellent control of colors, and wide angle viewing. While reference to colorants has been primarily in the context of conventional reflective inks, dyes, pigments and the like, those embodiments employing side-by-side colored elements which accordingly mix primary colors in an additive manner analogous to Maxwell spinning discs, when viewed at a suitable distance, these embodiments may use fluorescent inks or dyes to gain intensity without, in such a case, adding undue brilliance.

Some examples of display structures embodying the invention will now be briefly described.

EXAMPLE 1

A computer driven blueboard for instructional use is about four feet by eight feet (120 cm.×240 cm.) blue-on-white matrix display formed of 0.1 inch (0.25 cm.) pixels, with a definition of 480×960 pixels for a total matrix number of 460,800 pixels. This can be constructed from a single movable element layer, as described with reference to FIGS. 43–43A.

EXAMPLE 2

A full-color display matrix constructed in accordance with any of the full-color embodiments described herein can provide a high-definition television or video screen 18 in.×27 in. (46 cm.×69 cm.) with a resolution of 1,800×2,700 pixels for a total of 4,860,000 pixels employing 10 mil (0.01 in., 0.025 cm.) pixels, and operating with "video" speed and capabilities of up to 60 frames per second.

Indium tin oxide is one example of an adequately transparent conductive material for use in preferred embodiments herein. Thin layers of metals such as aluminum are too opaque or gray, to be useful in the embodiments of this invention that require light to traverse an electrode on its way to the viewer. Desired is a transmissivity of at least eighty percent in a conductive layer having a resistivity of no more than 100 ohms per square. However preferred values for the sake of good brightness, definition and color rendering, are a transmissivity of at least 90 percent with a film resistivity of no more than 70 ohms per square. A roughly 300 Angstrom film of indium tin oxide can be deposited by sputtering to have approximately 95 percent transmissivity and a film resistivity of approximately 50 ohms per square. While better conductivities of the order of 10 ohms per square would be desirable, they are not readily attainable with known methods employing indium tin oxide while retaining adequate transmissivity.

The pixels of this invention work very closely together when used in matrixed displays. Where surfaces touch one another in a movable manner one must be metal, or conductive, to avoid or remove any tribocharge which will cause insulators, for example, plastic to plastic, to adhere electrostatically hanging or freezing the desired electrostatically induced movement. Thus, preferred embodiments of this invention are designed to ensure that all movable pairs of surfaces employ a conductor and an insulator.

A Low-cost Reliable Accelerometer

Sensitive, economical, low-voltage- active, coiled movable electrodes, in addition to their great value in video displays, have unique applications as individual capacitative elements where the translation of a control voltage into a mechanical output is valuable. Alternatively, a mechanical input may be sensed by the movable electrode and output as a modulation of an applied electrostatic clamping voltage.

Figure 48:
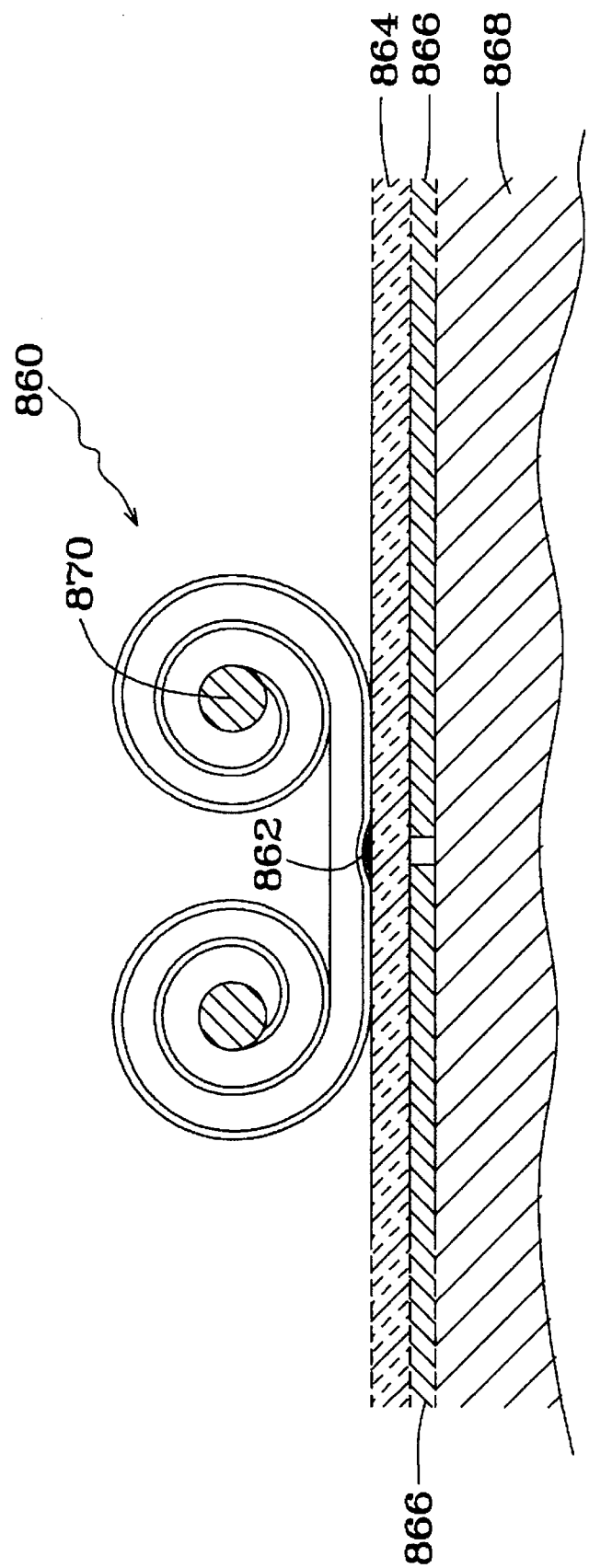
FIG. 48 is a transverse view of a further embodiment of a dual active electrode construction providing a small efficient bidirectional accelerometer.

Such an application is an accelerometer constructed with an electrostatically responsive, coiled movable electrode, constructed, for example, as described herein, mounted to extend or unroll oppositely to the direction of acceleration to be measured. When accelerated, the outrolling electrode will increase capacitance in response to and approximately proportional to acceleration. Supporting the electrode in a capacitative circuit, as described herein, which enables sensing of electrical changes of capacitance due to the movable electrode unrolling in response to acceleration. Such a rapid-response, acceleration-sensitive switch, readily capable of being miniaturized, has many potential applications, for example as a capacitive switch to switch automotive air bags, or to apply emergency brakes in free-falling elevators. By arranging opposed pairs of movable electrodes, both braking and acceleration, in a given direction, can be detected. One such accelerometer embodiment is illustrated in FIG. 48 which shows a pair of opposed metallized plastic movable electrodes 860 in a relaxed, coiled state, secured by a center line of adhesive 862 to a dielectric 864. The pair of electrodes 860 is made from a single piece of prestressed metallized polyester which in a relaxed state, as shown, takes the form of a double spiral. For voltage-dependent movement, movable electrodes 860 are tapered, but for a simple binary "on/off" output, they can be rectangular. Fixed conductors 866, which can have stepped edges if a digital response is required, oppose electrodes 860 on the other side of dielectric 864 and are electrically distinct to sense acceleration in opposed directions. Each spiral, movable electrode can be weighted with a small cylindrical mass 870 to increase its inertia and sensitivity. Aligned along the direction of travel of, for example an automobile protected with air bags, when the automobile undergoes sharp acceleration, or more probably, deceleration, one of the weighted spiral electrodes 860 moves away from center with a displacement which is a measure of acceleration. The capacitative accelerometer can be coupled in an oscillator circuit, either AC to DC, to conduct a continuous fluctuating current which is amplified and compared with predetermined values. If these are exceeded, indicating danger to the occupants, release of one or more air bags is triggered. This accelerometer is a simple, inexpensive and reliable device suitable for widespread use.

A preferred embodiment of an airbag accelerometer employs two pairs of opposed coiled sensing electrodes orthogonally disposed on axes, e.g. x-y axes, substantially coplanar with a vehicle's intended direction of movement, in order to respond to a range of occupant-threatening shocks including front, rear and side impacts. If desired, for response to downhill runaway or other vertical component motion, at modest additional expense, a third, z-axis pair of opposed movable coils can be included. Clearly, although airbag-triggering accelerometers are an important embodiment at the present time, other equipment can be activated by accelerometers, for example, an emergency brake system.

While any sensing circuitry capable of detecting the capacitative change due to displacement of the movable electrode, or due to a predetermined magnitude of displacement, and of providing a triggering output suitable for releasing an airbag, can be used, preferred circuitry comprises an oscillator circuit, and noting the electrical environment of most motor vehicles, a low-voltage DC oscillator circuit, for example, a Hartley or Colpitts oscillator is preferred. Such an oscillator circuit can be simply based upon a transistor and a pair of capacitors. The described accelerometer is incorporated as a capacitance-changing element in such a circuit. Preferably each pair of opposed movable electrodes on an axis is connected between ground and oscillator circuit in a direction-insensitive manner, so that activation of either electrode of a pair generates a triggering response. Further circuitry may provide for the output of two or three pairs of opposed electrodes to be summed so that a single triggering response is generated by significant displacement of any one movable electrode or by an equivalent vector addition of multiple such displacements, indicating a dangerous deceleration.

Three orthogonally arranged such pairs of accelerometers detecting acceleration in any direction and be used for tracking three-dimensional movement of objects and vehicles, providing a sensing system having uses for remote control. Such a movement-sensitive capacitative device could also be used as a gravity-sensitive switch, where displacement of the switch, for example by manual tilting, would gravitationally roll a movable electrode, triggering a capacitance-sensitive circuit whose output could drive any kind of electrical or electronic equipment.

Loading the movable electrode with a mass such as 870 at its tip or elsewhere, which mass 870 may be as simple as a small piece of adhesively attached wire, while not essential to sense acceleration, is valuable in enabling the response values or control parameters to be carefully trimmed, according to its application. Increasing the weight of the mass 870, up to the structural limits imposed by the need not to hinder the excursion and recoil of the electrode, will increase the speed and displacement of the response of a given construction of movable electrode, while slowing its recovery or retraction. Retraction is generally not important in a one-time triggered air bag application, especially as the accelerometers described herein are sufficiently economical to be replaceable when a released air bag is repacked.

Employment of the mass 870 renders the electrode tilt-sensitive, opening up a range of movement-sensing applications, including for example, intrusion or tampering sensing, especially for automobiles, and entry doors, and pin-ball machine tilt-sensing.

While illustrative embodiments of the invention have been described above, it is, of course, understood that various modifications will be apparent to those of ordinary skill in the art. Such modifications are within the spirit and scope of the invention, which is limited and defined only by the appended claims.

We claim:

1. A reflective display pixel for a reflective display constituted by a matrix of said reflective display pixels, said reflective display pixel having:
   i) a reflectance-controlled pixel area extending across a light path to a viewer;
   ii) a light-modulating capacitor comprising:
      a) a transparent dielectric member having opposed faces and extending across and throughout said pixel area;
      b) a transparent electrode extending across one face of said dielectric member throughout said display area, said transparent electrode having a light transmissivity of at least 80 percent and a conductivity expressed as a resistivity of not more than 100 ohms per square;

c) an active, light-modulating electrode movable to and from a position extending into said pixel area on the other face of said dielectric member said light-modulating electrode having a conductive electrode surface to contact said other face of said dielectric member;

said active, light-modulating electrode being movable in response to changes in an electric potential difference applied between said active movable electrode and said transparent electrode to extend across said light path and modulate light traveling therealong; and iii) reflectance means extending across said light path in said pixel area on an opposite side of said light-modulating capacitor remote from said viewer said reflectance means being visually related to said light-modulating active movable electrode for reflectance control of said pixel area;

wherein the appearance of said pixel area to said viewer can be selectively comprised by said light-modulating electrode in combination with said reflectance means, and wherein light reflected from said reflectance means traverses said transparent electrode two times, traveling therethrough on both an incident and a reflected path.

2. A reflective display pixel as claimed in claim 1 wherein said reflectance means comprises a reflective background and a second said light-modulating capacitor having a second active, light-modulating electrode movable to extend across said light path, said second active movable electrode and said background being cooperative to provide a variable reflectance, wherein said first and second active, light-modulating movable electrodes and said background have different visual characteristics one from another whereby said appearance of said pixel area can be selectively composed from said first and second active, light-modulating movable electrodes and said background.

3. A reflective display pixel as claimed in claim 2 further comprising a sheet-like, transparent substrate having one and another opposed substrate surfaces extending across said light path and supporting said first light-modulating capacitor to extend across one substrate surface and said second light-modulating capacitor to extend across said other substrate surface.

4. A reflective display pixel as claimed in claim 3 further comprising third and fourth said movable active electrode light-modulating capacitors disposed on said opposed surfaces of said transparent substrate to share said pixel area respectively with said first and said second active, movable electrodes.

5. A reflective display pixel as claimed in claim 4 further comprising active electrodes which are activatable selectively to display selected intensities of the achromatic colors black and white and three primary, chromatic, mixing colors.

6. A reflective display pixel as claimed in claim 2 wherein each said light modulating capacitor has a plurality of active, movable, light-modulating electrodes selectively movable to traverse said pixel area in response to applied electric potential differences.

7. A reflective display pixel as claimed in claim 6 wherein each said active movable electrode comprises a flexible plastic leaf having an anchored portion and a movable portion extensible across said pixel area, said plastic leaf having a metallized surface engageable with said dielectric member.

8. A reflective display pixel as claimed in claim 1 wherein said active movable electrode is tapered in its direction of movement to be displaceable, in a voltage controlled manner, by a distance related to the applied voltage.

9. A reflective display pixel as claimed in claim 1 wherein said transparent electrode comprises indium tin oxide.

10. A reflective display pixel as claimed in claim 1 wherein said fixed electrode light transmissivity is at least 90% and said conductivity is expressed as a resistivity of no more than 70 ohms per square.

11. A reflective display pixel according to claim 1 wherein said light-modulating electrode comprises a plastic lamina prestressed into a coiled configuration, said coiled configuration light-modulating electrode uncoiling into engagement with said other surface of said dielectric member when said potential difference is applied.

12. A reflective display pixel as claimed in claim 11 wherein each said active movable electrode comprises a flexible plastic leaf having an anchored portion and a movable portion extensible across said pixel area, said plastic leaf having a metallized surface engageable with said dielectric member.

13. A display pixel capable of displaying a selected one of at least three visually distinct color states, each said color state being selected from chromatic and achromatic colors, said display pixel having a plurality of light-modulating capacitive elements each said light-modulating capacitive element comprising:

a) a laminar translucent dielectric member having opposed first and second surfaces;

b) a fixed electrode engaged with said first dielectric member surface; and c) a movable light-modulating electrode having a conductive electrode surface to contact said second dielectric member surface;

wherein each said movable light-modulating eletrode is selectively movable into engagement with said second surface of said dielectric member in response to a potential difference between said movable electrode and said respective fixed electrode and is retracted in the absence of said potential difference, each said element being adapted to modulate light striking said element and wherein each said light-modulating capacitive element further comprises:

d) a further light-modulating element cooperative with said movable light-modulating element and capable of modulating light transmitted through said dielectric member;

each said light-modulating capacitive element displaying one of said visually distinct states.

14. A display pixel as claimed in claim 13 further comprising a sheet-like, transparent substrate having one and another opposed substrate surfaces extending across said display pixel and supporting a first one of said light-modulating capacitive elements to extend across one said substrate surface and said second light-modulating capacitive element to extend across said other substrate surface.

15. A reflective display pixel as claimed in claim 14 wherein each said movable electrode comprises a flexible plastic leaf having an anchored portion and a movable portion extensible across said pixel area, said plastic leaf having a metallized surface engageable with said dielectric member.

16. A reflective display pixel as claimed in claim 14 wherein said active movable electrode is tapered in its direction of movement to be displaceable, in a voltage controlled manner, by a distance related to the applied voltage.

17. A reflective display pixel as claimed in claim 14 further comprising third and fourth said movable active electrode light-modulating capacitors disposed on said opposed surfaces of said transparent substrate to share said pixel area respectively with said first and said second active, movable electrodes.

18. A reflective display pixel as claimed in claim 17 further comprising active electrodes which are activatable selectively to display selected intensities of the achromatic colors black and white and three primary, chromatic, mixing colors.

19. A reflective display pixel as claimed in claim 13 wherein said transparent electrode comprises indium tin oxide.

20. A reflective display pixel according to claim 13 wherein said light-modulating electrode comprises a plastic lamina prestressed into a coiled configuration, said coiled configuration light-modulating electrode uncoiling into engagement with said other surface of said dielectric member when said potential difference is applied.

21. A reflective display pixel as claimed in claim 20 wherein each said active movable electrode comprises a flexible plastic leaf having an anchored portion and a movable portion extensible across said pixel area, said plastic leaf having a metallized surface engageable with said dielectric member.

22. A generally flat, electronically driven, full-color moving video screen comprising a matrix of reflective display pixels, each said display pixel being capable of displaying a selected one of at least three visually distinct color states, each said color state being selected from chromatic and achromatic colors, said display pixel having a plurality of light-modulating capacitive elements each said light-modulating capacitive element comprising:
   a) a laminar translucent dielectric member having opposed first and second surfaces;
   b) a fixed electrode engaged with said first dielectric member surface; and
   c) a movable light-modulating electrode having a conductive electrode surface to contact said second dielectric member surface;
wherein each said movable light-modulating eletrode is selectively movable into engagement with said second surface of said dielectric member in response to a potential difference between said movable electrode and said respective fixed electrode and is retracted in the absence of said potential difference, each said element being adapted to modulate light striking said element and wherein each said light-modulating capacitive element further comprises:
   d) a further light-modulating element cooperative with said movable light-modulating element and capable of modulating light transmitted through said dielectric member;
each said light-modulating capacitive element displaying one of said visually distinct states.

23. A generally flat, electronically driven, monochrome moving video screen comprising a matrix of reflective display pixels, each said pixel comprising:
   i) a reflectance-controlled pixel area extending across a light path to a viewer;
   ii) a light-modulating capacitor comprising:
      a) a transparent dielectric member having opposed faces and extending across and throughout said pixel area;
      b) a transparent electrode extending across one face of said dielectric member throughout said display area, said transparent electrode having a light transmissivity of at least 80 percent and a conductivity expressed as a resistivity of not more than 100 ohms per square;
      c) an active, light-modulating electrode movable to and from a position extending into said pixel area on the other face of said dielectric member said light-modulating electrode having a conductive electrode surface to contact said other face of said dielectric member;
   said active, light-modulating electrode being movable in response to changes in an electric potential difference applied between said active movable electrode and said transparent electrode to extend across said light path and modulate light traveling therealong; and
      iii) reflectance means extending across said light path in said pixel area on an opposite side of said light-modulating capacitor remote from said viewer said reflectance means being visually related to said light-modulating active movable electrode for reflectance control of said pixel area;
wherein the appearance of said pixel area to said viewer can be selectively comprised by said light-modulating electrode in combination with said reflectance means, and wherein light reflected from said reflectance means traverses said transparent electrode two times, traveling therethrough on both an incident and a reflected path.

24. A digitally responsive, electromagnetic-wave-modulating capacitor comprising a movable active electrode, a dielectric member and a control electrode, said capacitor having an active condition in which said electrodes and said dielectric member are held in capacitative, laminar engagement by electrostatic attraction generated by a potential difference applied between said electrodes in a manner enabling said capacitor to extend across an electromagnetic wave path and modulate said electromagnetic wave and having a relaxed condition in which said potential difference is not applied, said movable electrode is retracted away from said electromagnetic wave path and said electromagnetic wave is not so modulated, wherein at least one of said electrodes has at least one lateral edge which is stepped to taper in a direction away from said retracted position to be digitally responsive to changes in said applied potential difference.

25. A digitally responsive, electromagnetic-wave-modulating capacitor according to claim 24 wherein said control electrode is fixed and has a pair of symmetrically disposed stepped lateral edges tapering in said direction away from said retracted position.

26. A low-cost, sensitive, reliable accelerometer for sensing acceleration and providing an electrical output, said accelerometer comprising a variable capacitance element having:
   a) a laminar dielectric member having opposed first and second surfaces;
   b) a control electrode engaged with said first dielectric member surface in activated condition of said capacitative element; and
   c) an active, movable, electrode having a conductor surface engageable with said second dielectric member surface in response to an activation potential difference applied between said electrodes;
said accelerometer being disposed in a movable or moving system to sense acceleration of said system, and being coupled in electric circuit to provide a control output responsive to a sensed acceleration.

27. An accelerometer according to claim 26, for activating an automobile airbag, comprising at least two pairs of said variable capacitative elements mounted for movement in opposed directions along an axis, said pairs of variable capacitative elements being mounted approximately orthogonally in a plane including an intended direction of travel of said automobile, said accelerometer including an oscillator circuit coupled with said variable capacitance elements to sense capacitances changes produced by acceleration and provide a control output.

28. A variable capacitative element comprising:
   a) a laminar dielectric member having opposed first and second surfaces;
   b) a control electrode capacitatively engaged with said first dielectric member surface in activated condition of said capacitative element; and
   c) an active, movable, electrode, having a conductor surface capacitatively engageable with said second dielectric member surface in response to an activation potential difference applied between said electrodes;
said active, movable electrode being selectively movable between an extended position for electromagnetic wave modulation and a retracted position and being formed of a flexible plastic material having a thin, metallized conductor surface, being said surface capacitatively engageable with said dielectric member, said active movable electrode being prestressed to adopt said retracted position in a relaxed state, and having a thickness not exceeding about 2 microns.

29. A variable capacitative element according to claim 28 wherein said movable electrode is a metallized plastic film heat-treated to form a coil, said metallized conductor surface being outwardly, convexly exposed from said coil for engagement with said dielectric member.

30. A method of manufacturing a video display matrixed from a plurality of light-modulating, capacitative pixels each having a light-modulating, movable active electrode, said method comprising:
   a) assembling a plurality of sheet-like layered materials into a laminated structure, said sheet-like layered materials including:
      i) a fixed electrode layer;
      ii) a dielectric layer capacitatively engaging said dielectric layer; and
      iii) an active, light-modulating, movable electrode layer having a plurality of adjacent, active electrodes each said active, movable electrode being pre-stressed to adopt a retracted, inactive configuration, said active movable electrodes being advanceable from said retracted position by application of a potential difference between said fixed electrode and said metallization;
   and:
   b) forming said active, light-modulating, movable electrode layer from a sheet of metallized plastic material supported on said laminated structure with said metallization toward said structure and said plastic material exposed outwardly, by:
      iv) cutting partial outlines of said movable electrodes in said metallized plastic sheet in a pattern providing a movable portion and a fixed portion of each said active, movable electrode, said cutting being only a partial incision along the cut outline, whereby the movable electrode portions of said sheet remains in place during said cutting step, and said cut outlines including a common outline between adjacent movable electrode portions,; and
      v) curing said laminated structure with said metallized plastic sheet bearing said cut electrode outlines exposed outwardly to be heated, in an oven to cause said plastic material in said movable electrode portions to shrink and break away along said outlines;
whereby, on cooling, said movable electrodes adopt said retracted configuration.

31. A method of manufacturing a video display according to claim 30 further comprising:
   c) applying an electrically conductive adhesive to said dielectric layer in predetermined areas for secural of said fixed portions of said active movable electrodes; and
   d) securing said sheet of metallized plastic material to said dielectric by means of said adhesive areas, said adhesive areas being registered with said fixed active movable electrode portions.

* * * * *